US006516337B1

(12) United States Patent
Tripp et al.

(10) Patent No.: US 6,516,337 B1
(45) Date of Patent: Feb. 4, 2003

(54) SENDING TO A CENTRAL INDEXING SITE META DATA OR SIGNATURES FROM OBJECTS ON A COMPUTER NETWORK

(75) Inventors: Gary W. Tripp, Bainbridge Island, WA (US); Michael D. Meadway, Snohomish, WA (US); Claude E. Duguay, Seattle, WA (US)

(73) Assignee: Arcessa, Inc., Seattle, WA (US)

( * ) Notice: Subject to any disclaimer, the term of this patent is extended or adjusted under 35 U.S.C. 154(b) by 0 days.

(21) Appl. No.: 09/419,405

(22) Filed: Oct. 14, 1999

(51) Int. Cl.[7] .............................................. G06F 13/00

(52) U.S. Cl. ...................... 709/202; 709/217; 709/223; 707/104

(58) Field of Search ................................. 709/202, 203, 709/217, 219, 223, 224; 707/10, 100, 102, 104

(56) References Cited

U.S. PATENT DOCUMENTS

| 5,694,593 | A | * | 12/1997 | Baclawski ...................... 707/5 |
| 5,748,954 | A | | 5/1998 | Mauldin |
| 5,864,863 | A | | 1/1999 | Burrows |
| 5,983,216 | A | * | 11/1999 | Kirsch et al. .................. 707/2 |
| 6,154,738 | A | * | 11/2000 | Call ............................. 707/4 |
| 6,256,622 | B1 | * | 7/2001 | Howard, Jr. et al. ............ 707/3 |
| 6,336,117 | B1 | * | 1/2002 | Massarani .................. 707/100 |

OTHER PUBLICATIONS

AltaVista Discovery—altavista.yellowpages.com.au/av/discovery/index.html; Oct. 1, 1999.
EWS Factsheet—Help visitors to your web site find what they're looking for fast–with Excite for Web Servers (EWS-);www.excite.com/navigate/factshee.html; Oct. 1, 1999.
Smarter Searches: Why Search Engines are Again the Webs Next Big Thing;http://chkpt.zdnet.com/chkpt/adem2fpf/www.ancordesk.com/story/story_2913.html, Dec. 1998.
Filters untangling the Web we Weave; Sep. 13, 1999;http://www.wired.com/news/news/politics/story/21719.html.
Filtering the Internet; Information Society Project at Yale Law School; Balkin, Noveck, Roosevelt; Jul. 15, 1999.
Introduction to Harvest; Duane Wessels; http://www.taradis.ed.ac.uk/harvest/docs/old–manual/node8.html; Jan. 31, 1996.
Viruses; Mike Meadway; Unpublished, undated.
Distributed Indexing/Searching Workshop; Agenda List, and Position Papers;Sponsored by the World Wide Web Consortium; May 28–19, 1996; http://www.w3.org/pub/WWW/Search/960528/cfp.html.

* cited by examiner

*Primary Examiner*—Viet D. Vu
(74) *Attorney, Agent, or Firm*—Graybeal Jackson Haley LLP

(57) ABSTRACT

A search engine utilizes a bottom-up approach to index the content of a network instead of relying on atop-down approach as used by conventional search engines. The network being indexed may be any network, including the global computer network, Internet, and the world wide web. Instead of using a central site including spidering software to recursively search all linked web pages and generate a search index of the Internet, independent distributed components or agents are located at each web site and report meta data about objects at the web site to the central server. A central catalog of object references is compiled on the central site from the meta data reported from each web site. One or more brochures file may also be created and stored on each web site to provide conceptual or non-keyword data about the site, such as demographics and categorization information. This conceptual information is then utilized in constructing the central catalog so that more accurate search results may be generated for search queries applied to the catalog.

26 Claims, 34 Drawing Sheets

SENDING TO A CENTRAL INDEXING SITE META DATA OR SIGNATURES FROM OBJECTS ON A COMPUTER NETWORK

TECHNICAL FIELD

The present invention relates generally to data distributed within a network, and more particularly to a method and system for generating and updating an index or catalog of object references for data distributed within a network such as the Internet.

BACKGROUND OF THE INVENTION

In the last several years, the Internet has experienced exponential growth in the number of Web sites and corresponding Web pages contained on the Internet. Countless individuals and corporations have established Web sites to market products, promote their firms, provide information on a specific topic, or merely provide access to the family's latest photographs for friends and relatives. This increase in Web sites and the corresponding information has placed vast amounts of information at the fingertips of millions of people throughout the world.

As a result of the rapid growth in Web sites on the Internet, it has become increasingly difficult to locate pertinent information in the sea of information available on the Internet. As will be understood by those skilled in the art, a search engine, such as Inktomi, Excite, Lycos, Infoseek, or FAST, is typically utilized to locate information on the Internet. FIG. 1 illustrates a conventional search engine 10 including a router 12 that transmits and receives message packets between the Internet and a Web crawler server 14, index server 16, and Web server 18. As understood by those skilled in the art, a Web crawler or spider is a program that roams the Internet, accessing known Web pages, following the links in those pages, and parsing each Web page that is visited to thereby generate index information about each page. The index information from the spider is periodically transferred to the index server 16 to update the central index stored on the index server. The spider returns to each site on a regular basis, such as every several months, and once again visits Web pages at the site and follows links to other pages within the site to find new Web pages for indexing.

The index information generated by the spider is transferred to the index server 16 to update a catalog or central index stored on the index server. The central index is like a giant database containing information about every Web page the spider finds. Each time the spider visits a Web page, the central index is updated so that the central index contains accurate information about each Web page.

The Web server 18 includes search software that processes search requests applied to the search engine 10. More specifically, the search software searches the millions of records contained in the central index in response to a search query transferred from a user's browser over the Internet and through the router 12 to the Web server 18. The search software finds matches to the search query and may rank them in terms of relevance according to predefined ranking algorithms, as will be understood by those skilled in the art.

As the number of Web sites increases at an exponential rate, it becomes increasingly difficult for the conventional search engine 10 to maintain an up-to-date central index. This is true because it takes time for the spider to access each Web page, so as the number of Web pages increases it accordingly takes the spider more time to index the Internet. In other words, as more Web pages are added, the spider must visits these new Web pages and add them to the central index. While the spider is busy indexing these new Web pages, it cannot revisit old Web pages and update portions of the central index corresponding to these pages. Thus, portions of the central index become dated, and this problem is only being exacerbated by the rapid addition of web sites on the Internet.

The method of indexing utilized in the conventional search engine 10 has inherent shortcomings in addition to the inability to keep the central index current as the Internet grows. For example, the spider only indexes known Web sites. Typically, the spider starts with a historical list of sites, such as a server list, and follows the list of the most popular sites to find more pages to add to the central index. Thus, unless your Web site is contained in the historical list or is linked to a site in the historical list, your site will not be indexed. While most search engines accept submissions of sites for indexing, even upon such a submission the site may not be indexed in a timely manner if at all. Another shortcoming of the conventional search engine 10 is the necessity to lock records in the central index stored on the index server 16 when these records are being updated, thus making the records inaccessible to search queries being processed by the search program while the records are locked.

Another inherent shortcoming of the method of indexing utilized in the conventional search engine 10 is that only Standard General Markup Language (SGML) information is utilized in generating the central index. In other words, the spider accesses or renders a respective Web page and parses only the SGML information in that Web page in generating the corresponding portion of the central index. As will be understood by those skilled in the art, due to the format of an SGML Web page, certain types of information may not be placed in the SGML document. For example, conceptual information such as the intended audience's demographics and geographic information may not be placed in an assigned tag in the SGML document. One skilled in the art will appreciate that such information would be extremely helpful in generating a more accurate index. For example, a person might want to search in a specific geographical area, or within a certain industry. By way of example, assume a person is searching for a red barn manufacturer in a specific geographic area. Because SGML pages have no standard tags for identifying industry type or geographical area, the spider on the server 14 in the conventional search engine 10 does not have such information to utilize in generating the central index. As a result, the conventional search engine 10 would typically list not only manufacturers but would also list the location of picturesque red barns in New England that are of no interest to the searcher.

There are four methods currently used to update centrally stored data or a central database from remotely stored data: 1) all of the remotely stored data can be copied over the network to the central location, 2) only those files or objects that have changed are copied to the central location, 3) a transaction log can be kept at the remote location and transmitted to the central location and used to update the central location's copy of the data or database, and 4) a differential can be created by comparing the remotely stored historic copy and the current remotely stored copy, this differential can then be sent to the central location and incorporated into the centrally stored historic copy of the data to create a copy of the current remotely stored copy. All of these methods rely on duplicating the remote data when in many cases the only thing needed is a reference or a link to the remote data.

Some Internet search engines, such as Infoseek, have proposed a distributed search engine approach to assist their spidering programs in finding and indexing new web pages. Infoseek has proposed that each web site on the Internet create a local file named "robots1.txt" containing a list of all files on the web site that have been modified within the last twenty-four hours. A spidering program would then download this file and from the file determine which pages on the web site should be accessed and reindexed. Files that have not been modified will not be indexed, saving bandwidth on the Internet otherwise consumed by the spidering program and thus increasing the efficiency of the spidering program. Additional local files could also be created, indicating files that had changed in the last seven days or thirty days or containing a list of all files on the site that are indexable. Under this approach, only files in html format, portable data format, and other file formats that may be accessed over the Internet are placed in the list since the spidering program must be able to access the files over the Internet. This use of local files on a web site to provide a list of modified files has not been widely adopted, if adopted by any search engines at all.In addition to their search engine sites maintained on the Internet, several search engines, such as AltaVista® and Excite, have developed local or web server search engine programs that locally index a user's computer and integrate local and Internet searching. At present, a typical user will use the "Find" utility within Windows to search for information on his personal computer or desktop, and a browser to search the Internet. As local storage for personal computers increases, the Find utility takes too long to retrieve the desired information, and then a separate browser must be used to perform Internet searches. The AltaVista® program is named AltaVista® Discovery, and generates a local index of files on a user's personal computer and provides integrated searching of the local index along with conventional Internet searches using the AltaVista® search engine.

The AltaVista® Discovery program includes an indexer component that periodically indexes the local set of data defined by the user and stores pertinent information in its index database to provide data retrieval capability for the system. The program generates a full indexing at the time of installation, and thereafter incremental indexing is performed to lower the overhead on the desktop. In building the local index, the indexer records relevant information, indexes the relevant data set, and saves each instance of all the words of that data, as well as the location and other relevant information. The indexer handles different data types including Office'97 documents, various types of e-mail messages such as Eudora, Netscape, text and PDF files, and various mail and document formats. The indexer also can retrieve the contents of an html page to extract relevant document information and index the document so that subsequent search queries may be applied on browsed documents.

A program offered by Excite, known as Excite for Web Servers ("EWS"), gives a web server the same advanced search capabilities used by the Excite search engine on the Internet. This program generates a local search index of pages on the web server, allows visitors to the web server to apply search queries, and returns a list of documents ranked by confidence in response to the search queries. Since the program resides on the web server, even complex searches are performed relatively quickly because the local search index is small relative to the index created by conventional search engines on the Internet.

The local search engine utilities just described are programs that execute on a web server or other computer to assemble information or "meta data" about files or other objects on that computer. The assembled meta data is retained and used at the computer. There are other programs that execute on a computer, assemble information about files or other objects on the computer, and then send the information across a network where it is assembled into a database, in the form of "viruses". A virus is a piece of software designed and written to adversely affect your computer by altering the way it works without your knowledge or permission. Most virus programs are built either to prove a point (that security could be breached), display an annoying if harmless message that the author felt was important, or to destroy data. Very rarely are they designed to collect or transmit data, due to the complexity of inter-networking communications. Information on viruses is understood by those skilled in the art, and is readily available from prominent virus protection software firms such as Symantec/Norton, McAffee, and Dr. Solomon.

Several types of virus programs collect and transmit information obtained from files on a computer that are accessed by the virus. One such virus, though not necessarily categorized as a virus, is a program which is loaded without the user's knowledge and reports information about the user, the programs installed on the computer, or the user's usage habits to another computer across the Internet for data collection purposes. There have been several well-publicized cases of major software companies including code in application programs which perform this sort of function when a computer is attached to the Internet. Usually (though not always), the software companies in question have published information which informs users of means by which this activity may be halted. Technically, these "viruses" are an original part of the application program and so are not generally considered a virus.

Another of this type of virus that has recently appeared affects only Internet servers, usually UNIX based, which have lax security administration. This type of virus is known as a "mail relay virus", and is designed to use system resources for forwarding bulk unsolicited email. The virus program is loaded by a person who manages to pierce the root account security and copy a series of programs to a hidden directory on the system. These programs contain a list of machines which are known to have the same program installed and their TCP/IP addresses. The program then discovers (via system configuration files) what the upstream email server is for the local system, and begins accepting and forwarding bulk email through the system. Typically, most Internet service providers do not allow incoming mail from someone outside of the subnet that the mail server is on, hence the need to infect a machine on that subnet. Once the programs are loaded, the TCP/IP address of the infected machine is sent back to the developer of the virus and is incorporated in future versions.

Another virus of this type is known as the "W97M/Marker.C." This Word 97 macro virus affects documents and templates and grows in size by virtue of tracking infections along the way and appending the victim's name as comments to the virus code. Files are written to the hard drive on infected systems: one file prefixed by C:\HSF and then followed by random generated eight characters and the .SYS extension, and another file named "c:\netldx.vxd". Both files serve as ASCII temporary files. The .SYS file contains the virus code and the .VXD file is a script file to be used with FTP.EXE in command line mode. This ftp script file above is then executed in a shell command sending the virus code which now contains information about the infected computer to the virus author's web site called "CodeBreakers."

There is a need for a method and system of indexing or cataloging remotely stored data that eliminates the need to copy the remote data to a central location and for indexing the world wide web that eliminates the need for spiders to be utilized in updating the index so that an up-to-date index is provided for performing searches, and that allows conceptual information to be utilized in generating the index to make search results more meaningful.

SUMMARY OF THE INVENTION

The present invention utilizes a bottom-up approach to index or catalog objects on a network instead of relying on a top-down approach as used by conventional search engines. The network that is indexed may be any network, including the global computer network which is known as the Internet or the World Wide Web. The result of indexing is a catalog of object references. Each object reference is a pointer which specifies a location or address where the object may be found. For purposes of the following discussion, each object consists of both contents (meaning only the essential data itself and not a header) and associated "meta data". The meta data includes all information about the contents of an object but not the contents itself. The meta data includes any information that has been extracted from the contents and is associated with the object, any header information within the object, and any file system information stored outside of the object such as directory entries. The term "object" is used only to refer to anything stored on a site of interest to a person who might access the site from the network and its associated meta data. To avoid confusion, the term "object" is not used more broadly.

According to one aspect of the present invention, instead of using a central site including spidering software to recursively search all linked web pages and generate an index of the Internet, independent distributed components are located at each web host that report meta data about objects at the web host to the central server. A web host is the physical location of one or more web sites. A central catalog of object references is compiled on the central site from the meta data reported from each web host. According to another aspect of the present invention, one or more brochure files are created and stored within each web site to provide conceptual or non-keyword data about the site, such as demographics and categorization information, related to one or more parts of the web site. This conceptual information is then utilized in constructing the central catalog so that more accurate search results may be generated in response to search queries applied to the catalog.

According to one aspect of the present invention, a method constructs a searchable catalog of object references to objects stored on a network. The network includes a plurality of interconnected computers with at least one computer storing the catalog. Each computer that stores the catalog is designated a cataloging site. The other computers on the network store a plurality of objects and are each designated a source site. The method includes running on each source site a program that processes the contents of, and meta data related to, objects stored on the source site, thereby generating, for each processed object, meta data describing the object. The generated meta data is then transmitted from each source site to at least one cataloging site. The transmitted meta data is then aggregated at each cataloging site to generate the catalog of object references. Each source site may also be a cataloging site, and each item of transmitted meta data may also include a command to the cataloging site instructing the cataloging site what to do with the item of meta data.

According to another aspect of the present invention, a method constructs a searchable catalog of file references on a cataloging computer on a computer network. The network includes a plurality of interconnected source computers each having a file system for identifying files. The method includes running on each source computer a program that accesses the file system of the source computer, thereby identifying files stored on the source computer and collecting information associated with the identified files. The collected information is then transmitted from the source computer to the cataloging computer. The transmitted collected information is then processed at the cataloging computer to generate a catalog of file references. The collected information may be a digital signature of each identified file, information from meta data for the file such as file names or other directory entries, or any form of object reference. The collected information may be transmitted responsive to a request from the cataloging computer or at the initiation of each source.

According to a further aspect of the present invention, a method constructs a searchable catalog of object references on a cataloging computer on a computer network. The computer network further includes a plurality of interconnected source computers. The method includes running on each source computer a program that accesses a file system structure of the source computer and creates a data set specifying the file system structure. At the initiation of each source computer the data set is transmitted from the source computer to the cataloging computer. The transmitted data sets are then processed at the cataloging computer to generate the catalog of object references. The file system structure may include a plurality of directory entries for files stored on the corresponding source computer.

According to another aspect of the present invention, a method constructs a searchable catalog of object references from objects stored on a network. The network includes a plurality of interconnected computers with one computer storing the catalog and being designated a cataloging site and each of the other computers storing a plurality of objects and being designated a source site. The method includes running on each source site a program that assembles meta data about objects stored on the source site. The assembled meta data is then transmitted from each source site to the cataloging site at a scheduled time that is a function of resource availability on one or both of the source site and the cataloging site. The transmitted data is then processed at the cataloging site to generate a catalog of object references. According to another aspect of the present invention, the source site program may be scheduled to run at times that are determined by resource availability on the source site and the assembled meta data may be transmitted independent of resource availability. The assembled meta data may be differential meta data indicating changes in current meta data relative to previous meta data.

According to a further aspect of the present invention, a method constructs a searchable catalog of rankings from objects stored on a network. The network includes a plurality of interconnected computers with a cataloging site and plurality of source sites as previously described. The method includes running on each source site a program that assembles data relating to objects stored on the source site. The assembled data is then ranked, in whole or in part, as a function of a set of ranking rules and rankings are then assigned to the assembled data. The rankings are transmitted from each source host to the cataloging host, and aggregated at the cataloging host to generate the catalog of rankings. Each ranking may have a value that is function of human input data about one or more objects with which the ranking is associated. The assembled data may include data from the content of objects stored at the host as well as meta data relating to objects stored at the host.

According to another aspect of the present invention, a method rates objects stored at a site on a network and constructs a searchable catalog of ratings. The network includes a plurality of interconnected computers with access to the objects. The method includes running on the host a program that processes objects stored on the site and assembles values found in a least one of the objects for comparison to a list of rating values. A rating is then generated for each object by relating the values found in the object to the list of rating values. The ratings are then aggregated to generate the catalog of ratings. In the list of rating values, each rating value may be a word or a pattern in other data which is recognized. In generating a rating for each object, the values found in the objects may be compared to a list of human input rating values supplied by an owner of the site and to a second list of human input rating values supplied by a host of the site.

A further aspect of the present invention is a method of monitoring objects stored on a network to detect changes in one or more of the objects. The network includes a plurality of interconnected computers with one computer assembling the results of monitoring and being designated a central site. Each of the other computers stores a plurality of objects and is designated a source site. The method includes running on each source site a program that assembles meta data about objects stored on the source site. The assembled meta data is compared on the source site to meta data previously assembled to identify changes in the meta data. Portions of the assembled meta data that have changed are then transmitted from each source site to the central site. The changes may be transmitted according to a predetermined schedule, and the meta data may include object references and/or a digital signature for each object.

Another aspect of the present invention is a method for monitoring objects stored on a network to detect changes in one or more of the objects. The network includes a plurality of interconnected computers with one computer assembling the results of the monitoring and being designated a central site and each of the other computers storing a plurality of objects and being designated a source site. The method includes running on each source site a program that processes objects stored on the source site and generates for each processed object a digital signature reflecting data of the object where the data consists of the contents or meta data of the object. The generated signatures are transmitted from each source site to the central site. Each transmitted signature is then compared at the central site to a previously generated signature for the object from which the signature was derived to determine whether the data of the object has changed. Either the source site or the central site may initiate running of the program on the source site. The objects on the source site that are monitored may be accessible only from the source site and not accessible by other sites on the network. The digital signature for each object may consist of information copied from a directory entry for the object, or may consist of a valve generated as a function of the contents of the object or any other set of information that reflects changes to the object. This method may be implemented with traditional spidering so that only objects which have changed need to be respidered and parsed.

Another aspect of the present invention is a method of constructing a catalog of object references to objects on a site in a network having a plurality of sites. The objects on the site are not accessible to other sites in the network. The method includes running on the site a program that generates meta data from the contents of objects on the site and assembling the meta data to construct the catalog of object references. The catalog may be stored on the same site as the objects, or the catalog may be assembled on a central site that is not the same site where the objects are located. The object references may remain in the catalog even though the object relating to a particular object reference no longer exists on the corresponding site in the network.

According to a further aspect of the present invention, each of the previously recited methods is performed by a program contained on a computer-readable medium, such as a CDROM. The program may also be contained in a computer-readable data transmission medium that may be transferred over a network, such as the Internet. The data transmission medium may, for example, be a carrier signal that has been modulated to contain information corresponding to the program.

DETAILED DESCRIPTION OF THE INVENTION

Figure 1:
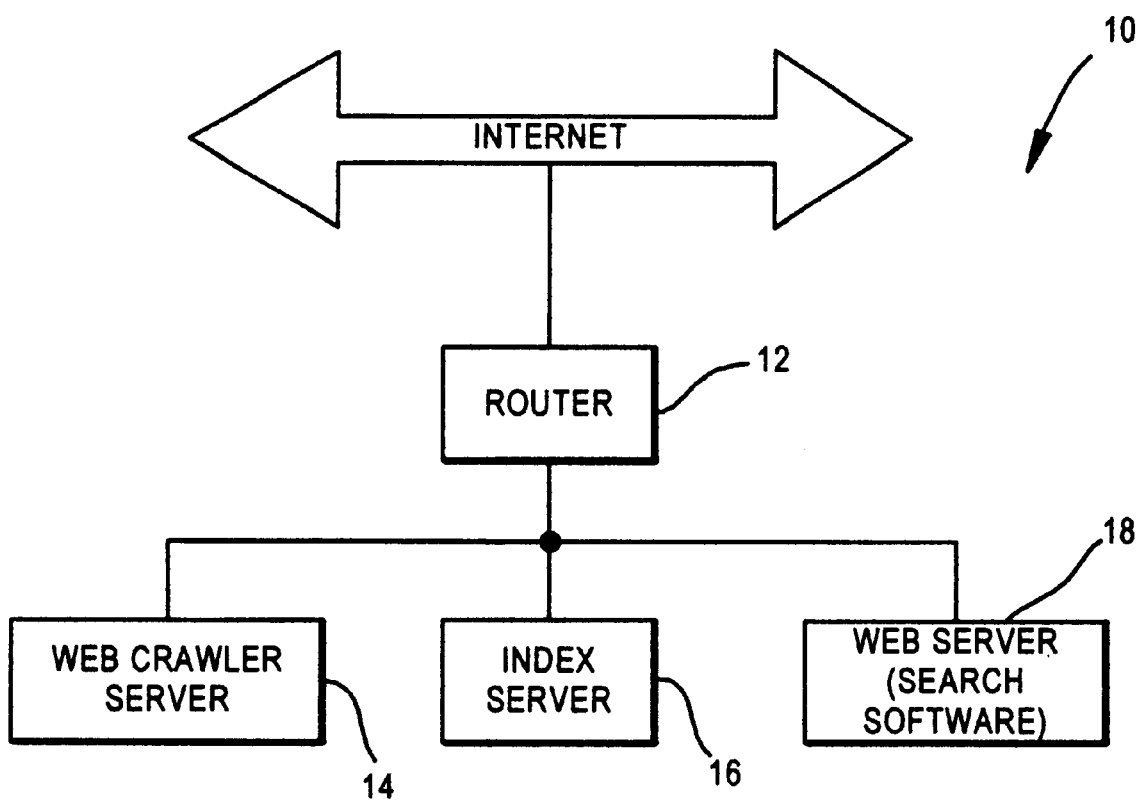
FIG. 1 is a functional block diagram of a conventional search engine for the world wide web.
Figure 2:
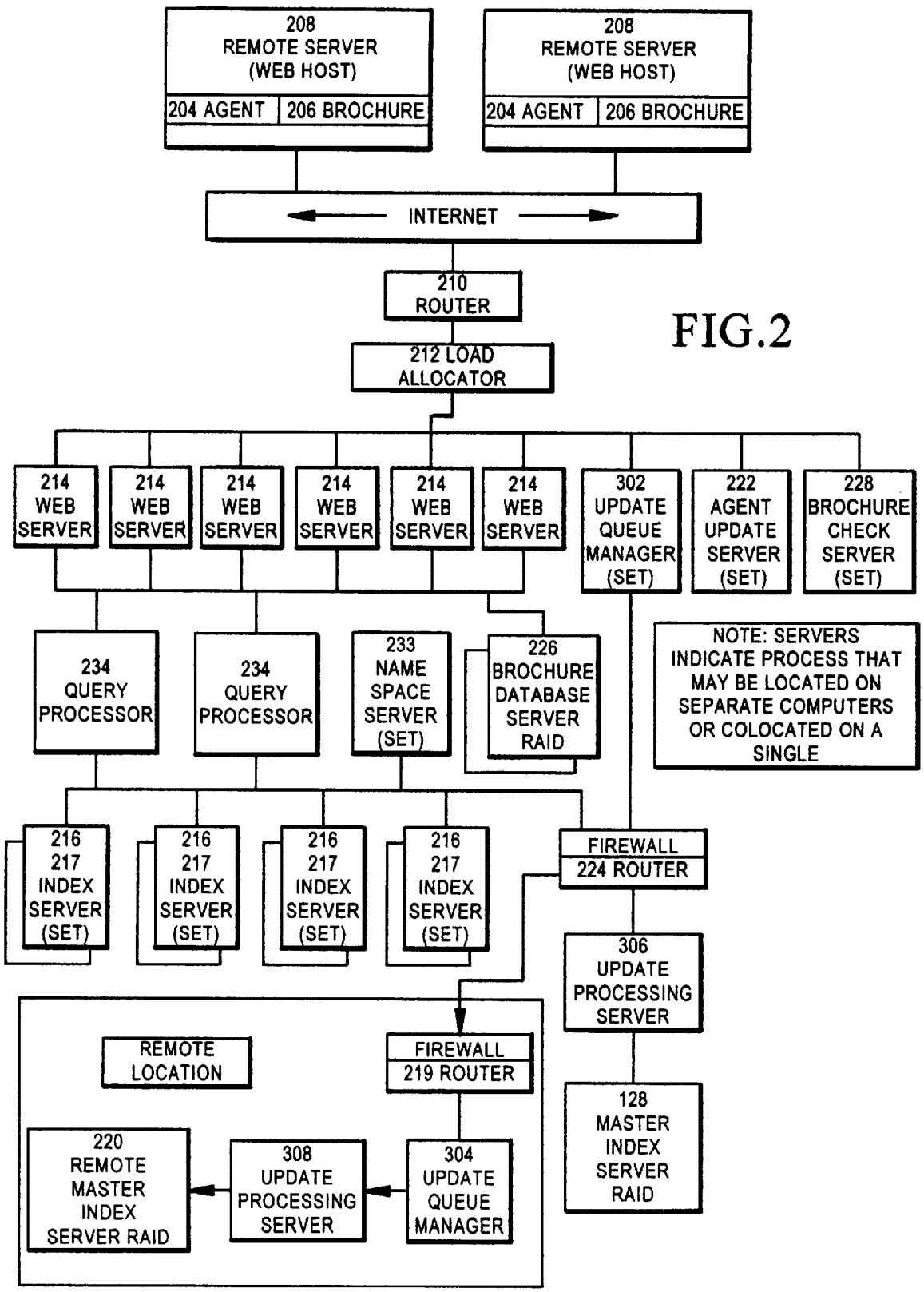
FIG. 2 is block diagram showing the architecture of a search engine for actively indexing the world wide web according to one embodiment of the present invention.

FIG. 2 is a block diagram of an indexing system 200 for actively indexing the Internet according to one embodiment of the present invention. The system 200 includes a central server 202 that stores a central index and processes search queries received over the Internet and also includes agent programs or agents 204 that reside on respective remote servers 208 and operate to provide periodic index updates to the central server 202, as will be described in more detail below. The system 200 also includes brochure files or brochures 206 residing on respective remote servers 208, each brochure file containing non-HTML or conceptual information about the Web site for use in generating the central index on the server 202, as will also be explained in more detail below. For the sake of brevity, only two remote servers 208 and the corresponding agents 204 and brochures 206 are shown in FIG. 2. The system 200, however, includes numerous such remote servers 208, agents 204, and brochures 208, as will be understood by those skilled in the art.

Each of the components in the central server 202 will now be described generally, with these respective components being described individually in more detail below. The central server 202 includes a router 210 that directs packets comprising search requests and update transactions through a load balancing switch 212 to an appropriate set of servers 214, 230 and 222. The switch 212 balances traffic to all web servers 214 to prevent overloading respective web servers and improve overall performance of the central server 202. The router 210 also functions to allow offline updates of index server sets 216 and as a dispatch point to prevent searches from being applied to an index server currently receiving updates, as will be explained in more detail below. The web servers 214 receive and preprocess index queries and receive and process brochure 206 generation or modification requests. In addition, the web servers 214 generate the parallel queries necessary to perform a search using the index servers 216. In one embodiment of the central server 202, there are twenty web servers 214.

The central server 202 further includes a master index server 218 containing a master copy of the entire central search index or catalog. In the embodiment of FIG. 2, the master index server 218 has a redundant array of independent disks or RAID 5 to provide protection against disk failures and loss of the central search index. In addition, the central index stored on the master index server 218 is also stored on a remote master index server 220 at a different physical location to provide backup of the central search index.

A number of update servers 222 each receive updates from the agent programs and store the current version of the agent program for download and update of the local agent programs, as will be described in more detail below. In addition, the update servers store the digital signature of the agent program and also store the remote web hosts' last local index, which are utilized during the updating of the remote agent program and during updating the local index, as will also be discussed in more detail below. Each of the update servers 222 applies all index change transactions through a firewall/router 224 to the master index server 218 which, in turn, updates the central search index and then distributes those changes to the various index servers sets 216. The master index server 218 also sends instructions to the Name Space/Directory Server 233 to dynamically determine which set of index servers 216 is to remain on-line to service search requests, and which set is to receive the updates.

The central search engine 202 further includes a brochure database server 226 and brochure check server 228. The brochure database server 226 stores a brochure database as a list of brochures and their associated data fields for each web site. The web servers 214 may request records from or add records to this brochure database depending on the actions taken by web site administrators while maintaining their brochure entries. The brochure check server 228 periodically checks for valid new brochures as defined within the brochure database server for web sites that are not being processed by a local agent program, as will be described in more detail below. If the defined brochure in the brochure database server 226 is not found by the brochure check server 228, a notification is sent to the administrator of the site where the brochure was supposed to be found.

When a brochure file is requested for a site which is not served by an agent 204, a message is sent to the Internet Service Provider ("ISP") or system administrator for the site hosting the web site, indicating that users of the system are requesting brochures. This server also periodically checks the validity of existing brochures on all sites and notifies the web site administrator if a brochure file is missing. If a brochure is missing and remains missing for a given number of check cycles, the brochure check server 228 sends a request to the brochure database server 226 to delete the entry for the brochure. The brochure check server 228 detects any changes in brochures, such as additions or removals, and converts these changes to transaction batches that are forwarded to a queue manager which, in turn, applies these changes to update the central index on the master index server 218, as will be described in more detail below. The brochure check server 328 periodically verifies the status of all brochures at sites that are not being indexed by an agent 204.

The components of the central server 202 and their general operation have been described, and now the operation of the agent 204 and brochure 206 will be described in more detail. The agent 204 and brochure 206 may both be present at a remote server 208. A brochure 206 and agent can function independently of each other, as will be discussed in more detail below. The agent 204 is a small local program which executes at the remote server 208 and generates an incremental search engine update for all of the participating web sites on the web host 208. These index updates are transmitted by the agent 204 to the central server 202, where they are queued for addition to the central index.

The agent 204 runs on a system, such as a web host server, at the site of an organization, and processes content (objects) for all web sites available via mass storage from that system. The agent 204 processes all web sites located within the mass storage area to which it has access, unless configured to exclude some portion of a site or sites. The agent 204 uses the local web server configuration (object catalog or file system information) data to determine the root directory path (or other location information for the particular file system) for all web site file structures available. The agent 204 reads files directly from local mass storage, and indexes the keywords from the files and meta data about the files. In contrast, a spider program, as previously discussed, is located on a server remote from the local site and renders each web page file before tokenizing and parsing each page for indexing. The agent 204 follows the structure of the local mass storage directory tree in indexing the files, and does not follow uniform resource locators ("URLs") stored within the HTML files forming the web pages. Since the agent 204 is present at the remote server 208 and has access to files stored on the server's mass storage, the agent is potentially capable of retrieving non-html data for indexing from these locally stored files, such as database files and other non web-page source material. For example, a product catalog stored in a database file on the remote mass storage may be accessed and indexed by the agent 204.

While indexing the web sites at the remote server 208, the agent 204 recognizes brochures 206 stored at web sites on the server and provides index updates based on the contents of the brochures found. Once the agent 204 has indexed the web sites at the remote server 208, the agent transmits a transaction list to the central server 202, and this transaction list is stored on one of the update servers 222. The transaction list is referred to as a batch, and each batch contains a series of deletion and addition transactions formatted as commands. More specifically, each batch represents an incremental change record for the sites at the remote server 208 serviced by the agent 204. The update server 222 thereafter transfers each batch to the master index server 218 which, in turn, updates the master index to reflect the index changes in the batch. It should be noted that the agent 204 transmits only "incremental" changes to the central server 202. Conversely, a conventional spider program requests the entire rendered HTML page from the remote web site via the remote server 208, and then parses the received page for keyword information.

The brochure 206 is a small file that may contain conceptual and other non-HTML information which would be useful to improve the indexing of sites or parts of a single site on the remote server 208. A brochure 206 may contain any information pertinent to the web site, including but not limited to keywords, phrases, categorizations of content, purpose of the site, and other information not generally stored in a web page. The brochure 206 is generated manually by individual web site administrators. The administrator fills out a form at the central server 202, and receives an email containing the brochure 206 or downloads the brochure after submitting the form contents. Upon receiving the brochure 206, the administrator stores it within the file structure of the web site on the remote server 208. There may be multiple brochures 206 at the same web site, each describing specific portions of the site. Each brochure 206 may refer to a single web page or a group of web pages stored within a specific subdirectory at the web site. All information stored in each brochure 206 is applied to the pages referenced in the brochure.

Figure 3:
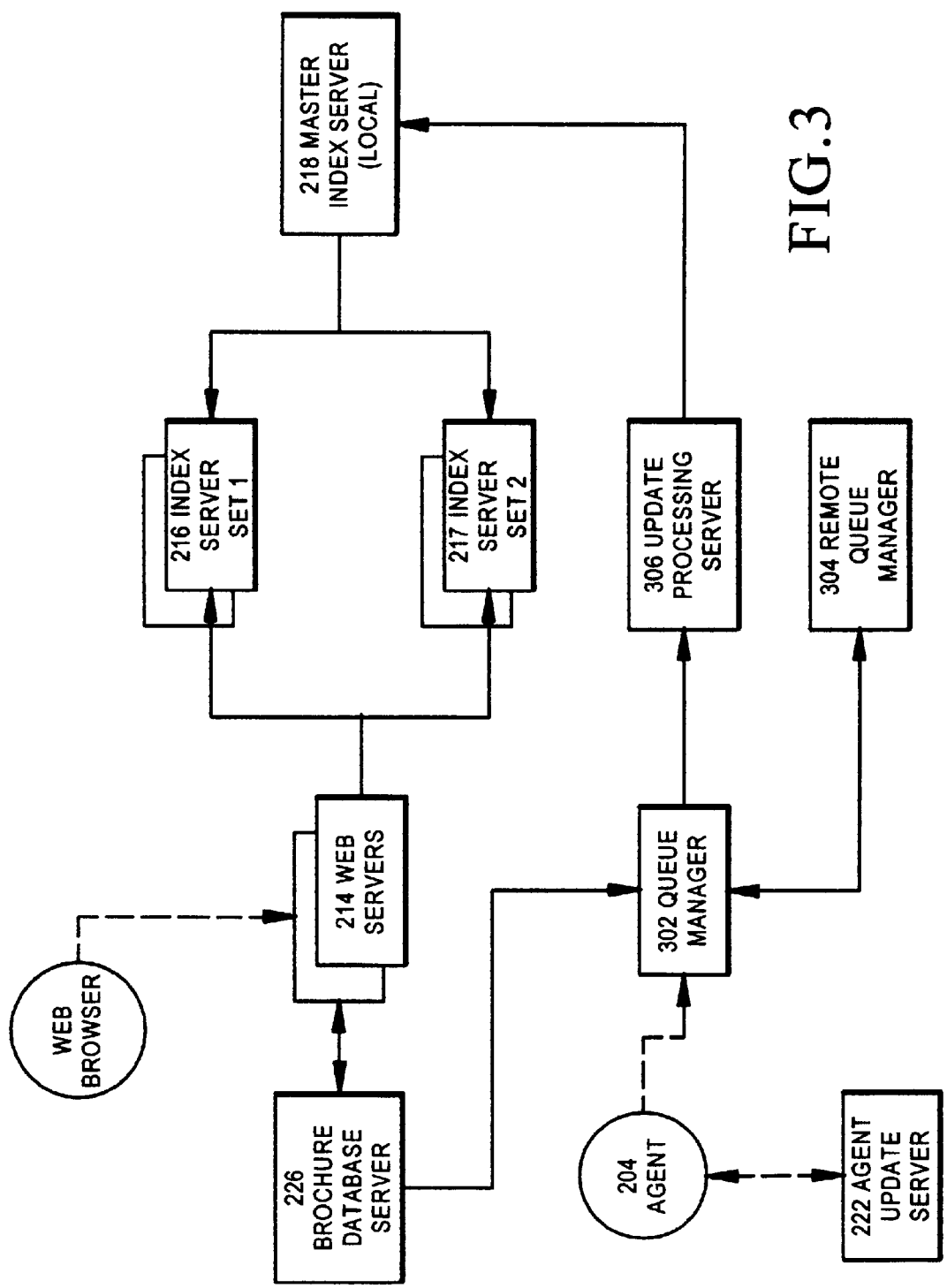
FIG. 3 is functional block diagram of the central server of FIG. 2.

The overall operation of the central server 202 will now be described in more detail with reference to the functional block diagram of FIG. 3. In FIG. 3, many components previously discussed with reference to FIG. 2 are shown, and for the sake of brevity the detailed operation of each such component will not again be described in detail.

In operation, the central server 202 performs three primary functions: 1) processing search queries from remote users; 2) brochure generation and verification; and 3) index update processing. In processing search queries from remote users, the Web servers 214 receive search queries from remote user browsers. A router, which corresponds to the routers 210 and 212 in FIG. 2, directs the search query to the appropriate web server 214. The web server send the query to a Query Processor 234 which parses the query and sends it to the available index server set 216 or 217 as listed in the Name Space Server 233 for appropriate segment of the index. The selected index server sets 216 or 217 thereafter return search results to the query processor in response to the applied search query, and these search results are sent to the Web server 214, which, in turn, returns the search results to the remote user browser.

The central server 202 also allows remote users to generate and download brochures 206 to their remote site, and also verifies the validity of brochures 206 on Web sites not serviced by an agent 204, as will now be explained in more detail. The Web servers 214 receive and process brochure 204 generation or modification requests from user browsers. Once the brochure 204 has been generated or modified, the brochure is transferred to the brochure database server 226, which stores all existing brochures. The brochure check server 228 periodically checks for new brochures 206 stored on the brochure database server 226 for Web sites that are not served by an agent 204. When a brochure 206 is requested for a Web site which is not served by an agent 204, the brochure check server 228 sends a message to the system administrator or Internet service provider for the server hosting a Web site telling them that site administrators on their server are requesting brochures 206. The brochure check server 228 also periodically verifies the validity of existing brochures 206 on all sites not serviced by an agent 204. If a brochure 206 is missing for a predetermined number of verification cycles, the brochure check server 228 instructs the brochure database server 226 to delete the entry for that brochure. The brochure check server 228 also converts any modifications, additions, or deletions to brochures 206 to transaction batches, and forwards these transaction batches to a queue manager 302. The queue manager 302 receives brochure update transaction batches from the brochure check server 228 and also receives agent update transaction batches from the agent update server 222, as will be described in more detail below.

The central server 202 also performs index update processing to update the central index stored on the master storage server 218 and the segmented central index stored on the index servers 216, 217, as will now be described in more detail. As described above, the queue manager receives update transaction batches from the brochure check server 228 and the agent update server 222. The agent update server 222 receives queries from the agent as to the current state of the agent's version and the status of the last index updates of the site. If the agent is not of a current version, a current version is automatically transmitted and installed. If the state of the site indexing is not consistent as indicated by a match of the digital signatures representing state of the site and the state of the central index the last time an update was received and successfully processed and added to the central index, then the agent will roll back to previous state and create the necessary additions and deletions to the state of the site and the central index into agreement. The agent 204 will then sent the additions and deletions along with a current digital signature to the queue manager 302 The queue manager 302 receives incremental index updates from the agents 204 present on the remote servers 208 and converts these updates into update transaction batches which, in turn, are transferred to the update processing server 306. The queue manager 302 stores the received update transaction batches, and periodically transmits a copy of the stored transaction batches to a remote queue manager 304 for processing by update processing server 306 and being applied to the remote master storage server 220. The queue manager 302 also periodically transmits a copy of the stored transaction batches to and update processing server 306. The queue manager 302 stores update transaction batches received from the agent 204 during a predetermined interval, and upon expiration of this interval the update batches are transferred to the update processing server 306. Upon receiving the update transaction batches the update processing server 306, applies all the batches to update the central index stored on the master storage server 218. Once the central index stored on the master storage server 218 has been updated, the master storage server 218 applies the update transaction batches through the router to update the segmented central index stored on the index server sets 216, 217.

During updating of the segmented central index stored on the index server sets 216, 217, the update transaction batches are directed to only one set of index servers 216, 217 while the other set remains online to handle search queries, and thereafter places the updated set of index servers 216, 217 online and updates the set previously online. For example, assume the index servers 216 are the primary set of index servers and the servers 217 are the secondary set. Each index server set 216, 217 can contain all or a portion of the central index 218. As seen from the above example, the primary and secondary index server sets 216 and 217 eliminate the need for record locking of the segmented central index to which search queries are applied. Thus, all records of the segmented central index are always available for search queries. Moreover, if one server of the primary index server set 216 or 217 fails, the remaining servers of that set will continue to serve queries. If the entire server set fails, the corresponding secondary index server set is made the primary so that the entire segmented central index is available for applied search queries. It should be noted that in the unlikely event that both the primary and secondary index server sets 216, 217 for a particular segment of the central index simultaneously fail, the remaining segments of the central index remain available for applied search queries, and only the segment of the central index stored on the failed index servers becomes unavailable. In other words, search queries are still applied to the vast majority of the central index so that reasonable search results may are still obtained. In a case were both server sets fail, queries for the segment that had failed could be sent to central index.

The index server set or sets are used to provide query results for searches submitted by the Web Servers. Each set of servers is identical, and each set of servers contains a portion of the overall index. Initially, the division will be alphabetical and numerical, for a set of 36 servers. Server "A" would contain the index for all words beginning with "A". Only one set of servers is updated at a given time, while the other set remains on-line to service search requests. This permits the system to be run without file-locking constraints and allows for fail over should a server become inoperative.

Figure 4:
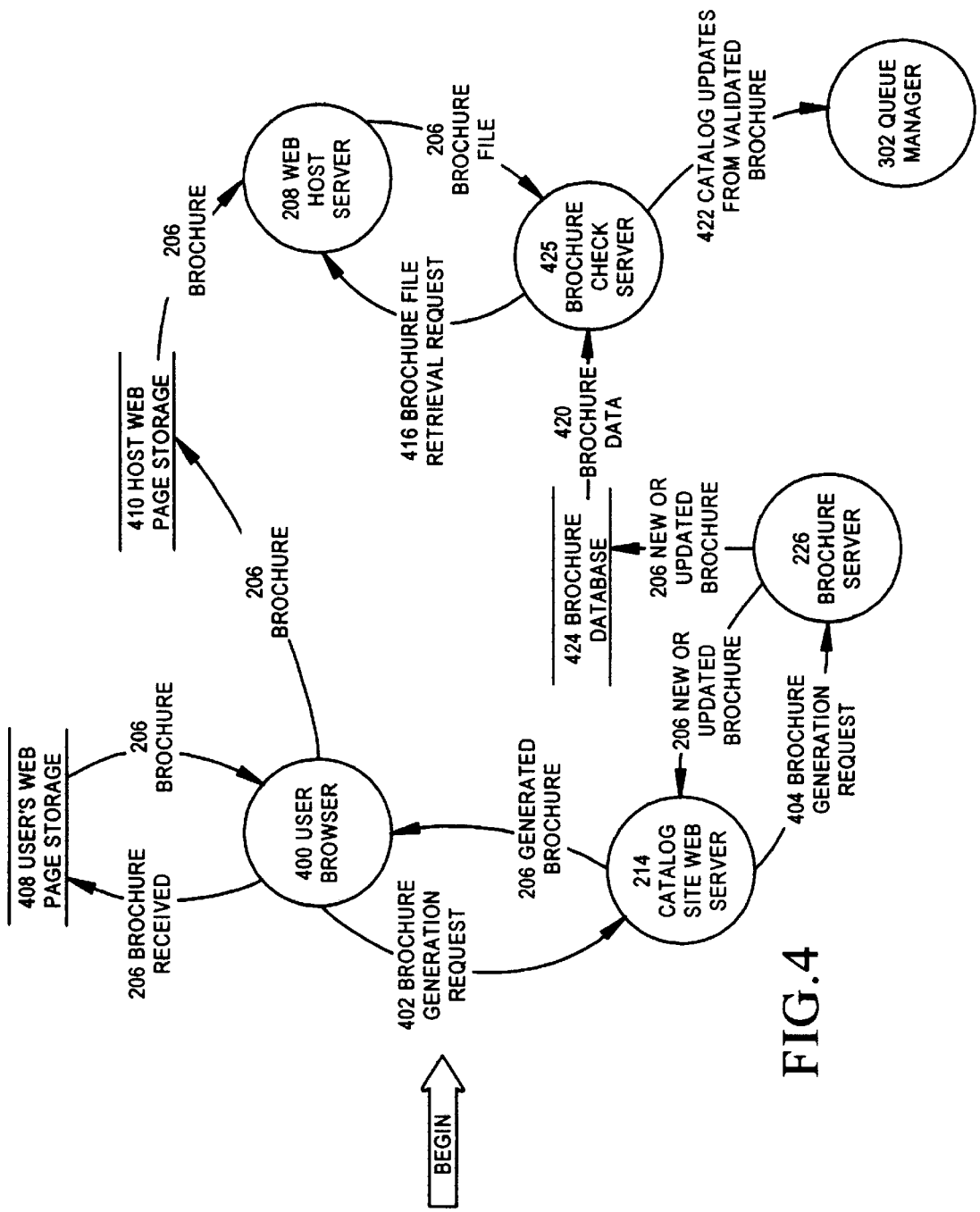
FIG. 4 is a bubble chart illustrating the generation and processing of a brochure file in the indexing system of FIG. 2.

FIG. 4 is a bubble chart illustrating the generation and processing of a brochure 206 in the indexing system 200 of FIG. 2. As previously mentioned, the purpose of the brochure 206 is to allow the web host 208 and the web site to provide specific non-HTML information, which will help the central server 202 in indexing the site and in order to provide more relevance to query results. The brochure 206 can be created in two ways. First, as part of the installation program for the agent 204, the administrator of the remote server 208 completes a form that is converted to an encoded brochure file 206, and then copied into the web directory on the remote server 208. This method of generating the brochure 206 will be discussed in more detail below. The second method of generating the brochure 206 utilizes a brochure creator interface on the web servers 214 at the central server 202. This method will now be described in more detail with reference to FIG. 4.

To create a brochure 206 using the brochure creator interface, a user's browser 400 applies a brochure generation request 402 to the associated central site web server 214. In response to the request 404, the brochure creator interface generates a form which the user completes, and then sends a brochure request 406 to the brochure server 226, which generates an encoded brochure file that is then sent to the central site web server 214. The central site web server 214 then sends the encoded brochure file to the user's browser 400. The encoded brochure file 206 is then stored in local storage 408. Subsequent to receiving the encoded brochure file 206, the user sends the encoded brochure file 206 via the user's web browser 400 to the web host site storage 410 (e.g., the web site host computer).

The brochure server 226 stores the brochure data 407 in a brochure database 424 on the central server 202 once it has been generated as a result of a brochure generation request 404. To verify proper storage of encoded brochure files 206, the brochure check server 425 retrieves brochure data 420 from the brochure database 424 and sends a request 416 to the web host server 404 to retrieve the encoded brochure file 206 from the web host site storage 410. Upon successful retrieval of the brochure file 206, the brochure check server generates and transmits object references 422 created as a function of the brochure data 420 to the queue manager 302. The queue manager 302 thereafter updates the central index to include the generated object references.

The directory structure of the host and web site are used to determine the relevance of the information in the brochure. Information in a brochure located the root directory will apply to all sub-directories unless superceded by another brochure. Information in a directory brochure will apply to all subdirectories unless superceded by information in a subdirectory brochure. Where a brochure is placed determines for which content the information applies. A web site owner can have as many brochures as there are pages or directories in his site. A site owner can request that their site be excluded from the Index by checking the EXCLUDE box next to the URL and copying the brochures into the directory to be excluded. An example of a host brochure is shown below in Table 1:

TABLE 1

Host Brochure

Company Information:

1. IP number
2. Domain Name Server
3. Type of Domain Name Server

HOST - Name _____
Company - Name _____
Individual - Name _____
4. HOST name
5. Company Name if different
6. Contact Name
7. Address
8. Phone
9. Fax
10. Technical Contact name:
11. Technical Contact's direct phone number
12. Technical Contact's email address
13. Would you like the Technical Contact to receive email notification that of every successful site index update.
14. Business Contact name:
15. Business Contact's direct phone number
16. Business Contact's email address
17. Site Languages
18. Site Rating
19. URL/Sites to be indexed
20. URL/Sites to be excluded
    General Information: (optional)

1. Area served
2. Number of email boxes hosted _____
3. Number of Domain Names hosted _____
4. Number of Web sites hosted. _____

The host uses the configuration section of the agent program to create site brochures, and can create site brochures for an entire IP address or for any subsection of the site.

In addition to the host brochure, a web site owner may also place a site brochure on his web site. The purpose of the site brochure is to allow the web site owner to provide specific conceptual or non-html information, which will help in indexing their site. A sample site brochure is shown below in Table 2.

TABLE 2

Site brochure

Site Information:

1. URL for the Site directory for which this information applies
2. Top URL for this Site
3. INCLUDE or EXCLUDE URL
4. Language
5. Site Name _____ (RealName)
6. Site Description _____ (limited to 25 words)
7. Name of the site Host _____
8. Contact Name
9. Address
10. Phone
11. Fax
12. Technical Contact name:
13. Technical Contacts' direct phone number
14. Technical Contacts' email address
15. Would you like the Technical Contact to receive email notification of every successful site index update.
16. Business Contact name:
17. Business Contacts' Direct phone number
18. Business Contact's email address
19. Type of site
20. Company - Name _____
21. Organization Name _____
22. Individual - Name _____
23. Category General
   Specific Category
   Special interest
24. Related categories 1, 2, 3, 4, 5, 6, 7, 8, 9 & 10
25. Demographics Site's intended audience Age
   Sex
   etc.
26. Location of Site's intended audience:

World
   Country
   State or Province
   City
   District
27. Key words (repeated words will not be indexed)
28. Key Phrases (repeated phrases will not be indexed)
29. Related Site's
30. Comments
31. Type of products for sale _____
32. Location of products database _____
33. Type of database _____ SQL or ? or ?
34. Rating
35. Rating Descriptors
36. Others to be added.

The web site owner can create a different site brochure for each page or directory on the site. For example, if the web site includes pages in different languages, the web site owner should create a site brochure for each language with keywords and categories that match the language. Once the web site owner has filled in the brochure form, they will click a button on a web page from the web server at the central server, and a web server creates an encoded html file that is then sent or downloaded to the site owners computer. Each encoded brochure file could be given a particular name, such as brochure-domainname-com-directory-directory-directory.html, and the site owner is instructed to copy the encoded file into the specified web directory on the site.

At anytime, the web site owner can visit the central server site, update their brochure, and download a new encoded brochure. When updating an existing brochure, the current brochure information for the URL entered will be displayed to reduce input time. Any site brochure will supercede the host brochure information, and information contained in the site brochure will be assumed to be more current and accurate and will be used by the agent for indexing purposes. A site brochure that is farther down in the directory tree from the root directory will supercede a site brochure that is above it in the directory tree. A site owner can request that their web site be excluded from the index by checking the EXCLUDE box next to the URL and copying the brochures into the directory to be excluded.

If the host or web site URL is not currently being indexed, the web server performs the following operations. First, an automatic email is sent to contacts at the host to encourage the host to install the agent. An automatic email is also sent to a contact person for the web site with a "Thank You" and a request that they ask their host to install the agent. In addition, a retrieval order is generated for the central server to retrieve the brochure file from the web site in one hour. If the retrieval order is unsuccessful, it will be repeated 2, 4, 8, 24 and 48 hours later, until successful. If still unsuccessful after 48 hours, the retrieval order is canceled. By verifying the presence of the site brochure in the specified location, unauthorized information about a site may not be created by a third party in an attempt to have their site indexed along with a more popular site. This is a common problem with existing search engines where a third party copies the keywords from a meta tag in a popular site. The bogus site with copied keywords is then submitted to a search engine for indexing, and when search queries are applied to the search engine that produce the popular site the bogus site is also produced. This may not be done with the site brochure because the brochure is not an html page available to outside persons and because it is encrypted so even if the file is obtained the information contained therein is not accessible.

Software to create brochures and agent programs will be distributed free to software publishers for inclusion in their web authoring software and to web server manufacturers, publishers and OEMs for pre-loading on or inclusion with their products.

Figure 5:
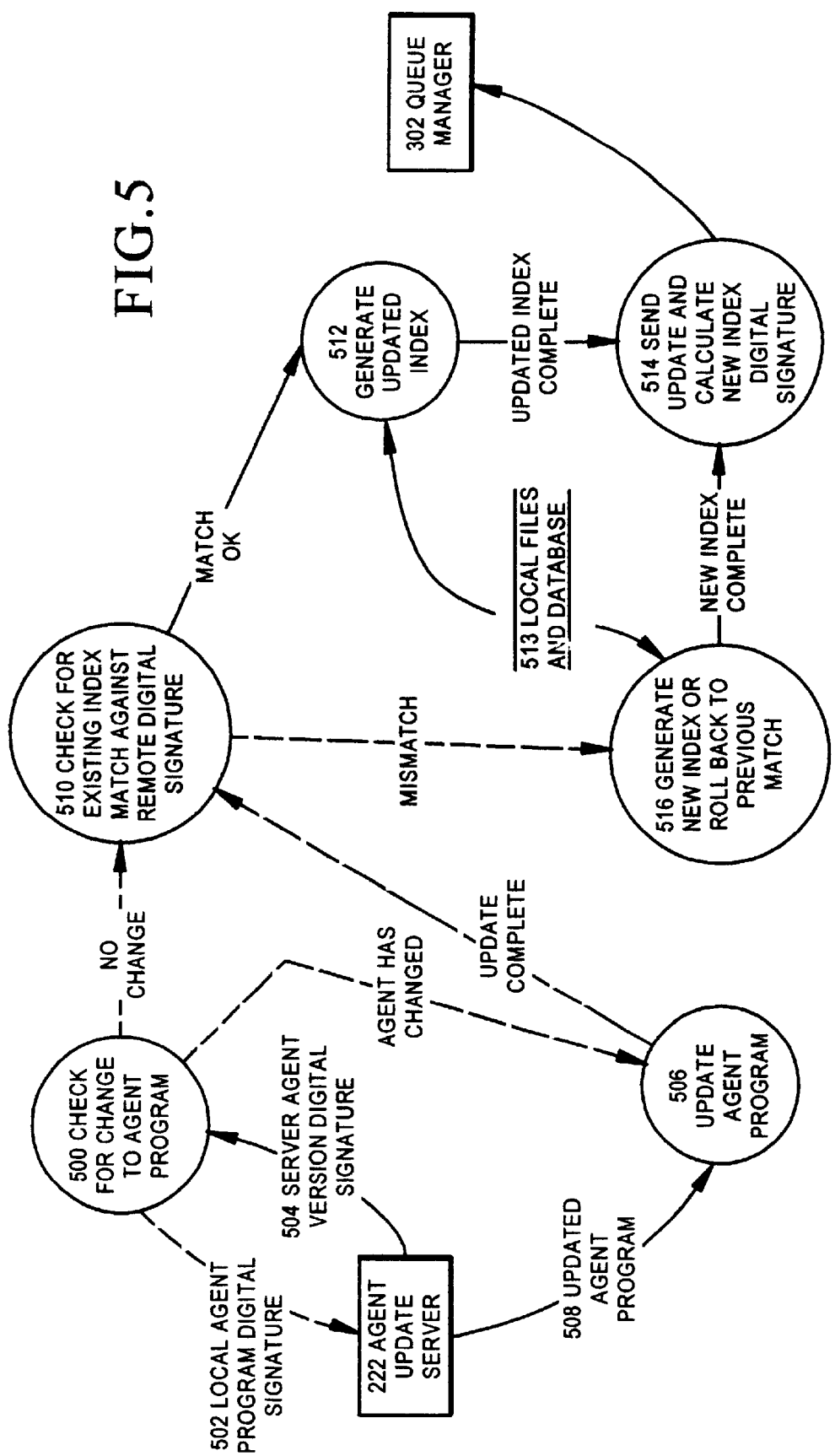
FIG. 5 is a bubble chart illustrating the process of the agent program in updating itself along with the local index generated by the agent program.

FIG. 5 is a bubble chart of the process executed by the agent 204 according to one embodiment of the present invention. As previously mentioned, the agent 204 periodically executes the illustrated process to update itself and to update the corresponding local index, as will now be described in more detail. The process begins in step 500 in which the agent verifies that it is the most current version of the agent program. More specifically, in step 500 the agent sends a request 502 to one of the update servers 222 for the digital signature of the current version of the agent program. The update servers 222 returns the digital signature 504 for the most current version of the agent. In step 500, the digital signature hash of the local agent is compared to the returned digital signature hash to determine whether the local agent is the most current version. In other words, if the two digital signatures are equal, the local agent is the most recent version, while if the two are not equal the local agent is an outdated version of the agent program and must be updated. When the two digital signatures are unequal, the program goes to step 506 in which the most current version of the agent program 508 is received from the update server 222. Once the local agent program has been updated, the program proceeds to step 510. Note that if the digital signature of a local agent program is equal to the digital signature 504 of the most recent version of the agent, the program proceeds directly from step 500 to step 510.

In step 510, the agent program compares the digital signature hash for the existing local index previously generated by the agent program to the digital signature hash stored on the central server 202 for the existing local index.

The agent program performs this step to synchronize the local index and the remote local index stored on the central server 202 by ensuring the digital signature of the existing version of the local index matches the digital signature for the existing version of the remote local index. If the two digital signatures are equal, the agent program goes to step 512 and generates and updated local index by evaluating, such as by tokenizing and parsing, local files 513 on the web host serviced by the agent. Once the updated local index has been generated, the agent program proceeds to step 514 where the updates along with the digital signature of the new local index are transferred to the agent update server 222 on the central server 202.

If step 510 determines the two digital signatures are not equal, the agent program goes to step 516 to roll back to a previous state that matches the local files 513 or to generate a completely new local index for the web host serviced by the agent. After the complete new local index is generated, the agent program once again proceeds to step 514 and the updates are transferred to the agent queue manager 302. As previously mentioned, comparing the digital signatures in step 510 synchronizes the local index and remote local index. Furthermore, this step enables the agent program to rebuild a completely new local index for the site serviced by the agent program in the event the index is lost at the central server 202. Thus, should the central server 202 crash such that the central index is corrupted and non-recoverable, the agent programs at the each remote web host will rebuild their respective local indices, and each of these local indices will be transferred to central server 202 so that the entire central index may be reconstructed.

As mentioned above, the agent 204 is a software program that a web host downloads from the web servers 214 and installs on the host's server. To install the agent 204, the host runs an agent installation program, which collects information about the web site host and about the site itself, and also creates the web site host's brochure 206 of non-HTML information. As part of the installation, the site host schedules a preferred time of day for the agent 204 to automatically index the web site and transfer index updates to the central server 202. The agent and the queue manager can work independently or together to reschedule when to perform and transmit the site update. Resource availability is the primary and any other factor, which may effect the quality or efficiency of the operation may be used by the agent and the queue manager in rescheduling updates.

In the preferred embodiment the agent 204 initiates all communications with the central server over a secure socket authorized and setup by the site host. But the central server 202 could also initiate communications or trigger actions of the agent or retrieve data process by the agent. All data and program updates sent between the site host and the central server are sent in compressed and encrypted form. During the normal index updating process, the agent 204 is automatically updated, as will be explained in more detail below. The site host may receive a daily email saying the site had been properly updated or that no update was received and no action is required. The agent 204 also maintains a log of indexing activity and errors encountered, and this activity log can be viewed by the site host by opening the agent 204 and accessing the log. Although the agent 204 automatically indexes the sites on the host at scheduled times, the host can at anytime initiate an indexing update by opening the agent 204 and manually initiating an index update.

In operation, the agent 204 verifies that the agent program is current and that the site index matches the last update received and successfully added to the central index on the central server 202. After verification and updating of the agent 204 if required, the agent checks the site for new, modified or deleted files. The new or modified files are indexed and the information added to or deleted from the site index or a list of additions and deletions transactions are created. The incremental changes to the site index along with a digital signature of the entire site index are sent to the central server 202 and the results logged in a site activity log maintained by the agent 204. The agent 204 is run by either being manually started by the site host or automatically started by a scheduler component of the agent.

It is not necessary that a local index be maintained at the site but only that a list of digital signatures representing the site at the time of the last update be maintained. The digital signature could be used to determine whether the local site and the central index are properly synchronized and which portion of the site had changed since the last successful update. Then instructions to delete all references from the central index 218 to files located at the web host that have changed or which no longer exist would be sent by the agent to the queue manager. New references would then be created for all new or modified files and would be sent by the agent to the queue manager as additions to the central index 218.

The process executed by the agent 204 will now be described in more detail. The agent 204 first checks with the central server 202 for the current version of the agent program. More specifically, the agent 204 calculates a digital signature of the agent program files and contacts the central server 202 over a secure socket. The agent 204 then requests a digital signature of the current version of the agent program files located at the central server 202, and compares the two digital signatures. If the two signatures match, the version of the agent 204 is current and no update is required. When the two signatures do not match, the current version of the agent 204 is downloaded from the central server 202. Once the current agent 204 is successfully downloaded, the new agent program files are installed and the agent restarted.

At this point, the agent 204 begins the process of updating the index of the local site. First, the agent 204 determines whether the last index update was completed and transmitted successfully. If not, the agent 204 renames the Old-Site-Index file to Site-Index and the Old-Site-File-List to Site-File-List. The agent 204 then calculates a digital signature for the Site-Index file and a signature for the Site-File-List file and compares each to the digital signatures created at the end of the last successful update for Site-Index and Site-File-List files. If the digital signatures match, the agent 204 sends them to the central server 202 for comparison and waits for confirmation.

If the central server 202 does not confirm the match of the digital signatures (i.e., the signatures for the Site-Index and Site-File-List files on the central server 202 do not match those on the remote site), the agent 204 deletes the Site-Index and Site-File-List files, and notifies the central server 202 to delete all site records. Next, if the agent 204 was updated and Fields were added or deleted from the Site Index file, then the agent updates the Site-Index file to include the updates. The agent 204 then determines if the Site-File-Lists file exists, and renames the Site-File-List file to Old-File-List and create a text file named Site-File-List. If no Site-File-List exists but Old-File list exists, the agent 204 copies the Old-File-List file to Site-File List. If no Site-File-List and no Old-File-List files exist, the agent 204 creates a text file named Site-File-List. The agent 204 then calculates a digital signature hash for each file on the site and the host brochure and records the file name including full path and digital signature hash of all files.

If the central server 202 verifies that the digital signature hash of the Site-Index file and the digital signature hash for the Site-File-List file match, the agent 204 verifies the brochure files. More specifically, the agent 204 determines if the file brochure.html file name does not match the directory in which it is located. If the file brochure.html is not in the expected directory, the agent 204 sends a warning email to the site contact listed in the brochure, and then renames brochure.html to WrongDirectorybrochure.html.

If the agent 204 determines that all brochure.html files match the directory in which they are located, the agent 204 deletes a file named Exclude-File-List, creates a text file named Exclude-File-List, checks brochures for EXCLUDE sites flags, and adds file names of files to be excluded from the index to the Exclude-File-List file. The agent 204 then creates a Deleted-File-List file containing a list of files that no longer exist on the site in their original location. More specifically the agent 204 deletes the old Deleted-File-List file, creates a text file called Deleted-File-List, compares the Site-File-List file to Old-File-List file and records in the Deleted-File-List any files in the Old-File-List that are not in Site-File-List.

The agent 204 then creates a New-File-List file containing a list of files that where created or modified since the last update. To create the New-File-List file, the agent 204 deletes the current New-File-List file, creates a new text file called New-File-List, .compares the file Site-File-List to the file Old-File-List and the file Exclude-File-List, and records in the New-File-List file any files in Site-File-List that are not in the Old-Site-File-List or in Exclude-File-List files.

Next, the agent 204 indexes the corresponding site and creates a new Site-Index file. More specifically, the agent 204 determines if the Site-Index file exists, and, if yes, copies the Site-Index file to an Old-Index file. If the Site-Index file does not exist, the agent determines if the file Old-Site-Index exists, and if yes copies the Old-Site-Index file to Site-Index file. If Old-Site-Index file does not exist, the agent 204 copies a Sample-Site-Index file to the Site-Index file.

The agent 204 then creates a New-Records-Index file and a Deleted-Records-List file. The agent 204 next removes records of deleted or modified files from the Site index. More specifically, the agent 204 deletes all records from Site-Index for files in New-File-List, deletes all records from Site Index for files in Deleted-File-List, and records the Host IP, URL, and record ID Numbers for each record deleted into Deleted-Records-List.

The agent 204 then runs an indexing program against all files in the New-File-List file and creates a record for each new key word, phrase, MP3, Video, Movie, Link and brochure information and adds these to the Site-Index file. The agent 204 then copies each new record created to the New-Records-Index file. If new fields were added to the Site Index, the agent 204 runs the indexing program against all files for new field information and creates records in Field-Update-Index for all information found. The agent 204 then updates the Site-Index file from the Field-Update-Index file.

At this point, the Site-Index file has been updated, and the agent 204 calculates a digital signature for the Site-Index file. More specifically, the agent determines if the Update-Status file exists, and if so opens this file. If the Update-Status file does not exist, the agent 204 creates a text file called Update-Status and opens this file. The agent 204 then calculates the digital signature of the Site Index file, and records the Site-Index digital signature along with the date and time in the Update-Status file. Next, the agent 204 calculates the digital signature of the Site-File-List file, and records the Site-File-List digital signature along with the date and time in Update-Status file.

Finally, the agent 204 creates a Site-Map file for the sites serviced by the agent. More specifically, the agent 204 determines whether the Deleted-File-List or New-File-List contain files, and, if yes, the agent deletes the Site-Map file. The agent 204 then generates a site map for the Site-Map file from the Site-File-List. Once the Site-Map file has been generated, the agent 204 sends New-Records-Index and Deleted-Records-List files to the central server 202. More specifically, the agent 204 opens a secure connection and contacts the central server 202. The agent 204 then compresses the files to be sent, encrypts these files, and sends the compressed and encrypted files in the New-Records-Index, Field-Update-Index, Deleted-Records-List, digital signature for the Site-Index, Site-Map, and the Site-File-List to the central server 202, which the uses these files to update the central index. Once the agent 204 has successfully sent this information to the client server 202, the agent 204 records the digital signature of the Site-Index file, the time of the successful transfer, the date and size of the files transferred in the Update-Status file, and thereafter deletes the sent files. The agent 204 then closes the secure connection to terminate the update process.

The agent 204 generates a site index, which is a database. The database includes a number of tables, each table consisting of records (rows) and fields (columns). Each table in the database includes similar records to speed searches. All Tables may be sorted alphabetically and then by category. In one embodiment of the agent 204, the agent generates Tables 3–12 as shown below.

TABLE 3

Agent Created Keywords Table Fields

| | |
|---|---|
| 1. | i. Keyword |
| 2. | Category - General, Specific, Special Interest Categories |
| 3. | Related categories 1, 2, 3, 4, 5, 6, 7, 8, 9 & 10 |
| 4. | Host IP address, |
| 5. | Site URL, |
| 6. | Unique Record Identifier |
| 7. | Location of first occurrence of word |
| 8. | URL for first occurrence of word |
| 9. | Number of occurrences of word |
| 10. | Does word appear in meta header |
| 11. | Does word appear in brochure keywords |
| 12. | Does word appear in brochure phrases |
| 13. | Demographics restrictions (Y or N) |
| 14. | Location restrictions (Y or N) |
| 15. | Date file containing Key Phrase was created |
| 16. | Link to Site brochure |
| 17. | Link to Host brochure |
| 18. | Link URL Link Table |
| 19. | Html tag information |
| 20. | XML tag information |
| 21. | Ranking |

TABLE 4

Agent Created Key Phrases Table Fields

| | |
|---|---|
| 1. | ii. Key Phrase |
| 2. | Category - three letters representing General, Specific Special Interest, and Categories |
| 3. | Related Categories 1, 2, 3, 4, 5, 6, 7, 8, 9 & 10 |
| 4. | Host IP address, |
| 5. | Site URL, |
| 6. | Unique Record Identifier |
| 7. | Location of first occurrence of Phrase |

TABLE 4-continued

Agent Created Key Phrases Table Fields

8. URL for first occurrence of Phrase
9. Number of occurrences of Phrase
10. Does Phrase appear in meta header
11. Does Phrase appear in brochure phrases
12. Demographics restrictions (Y or N)
13. Location restrictions (Y or N)
14. Date file containing Key Phrase was created
15. Link to Site brochure
16. Link to Host brochure
17. Link URL Link Table
18. Html tag information
19. XML tag information
20. Ranking

TABLE 5

Agent Created Products Catalog 1. iii. Type of product
2. Category - three letters representing General, Specific, and Special Interest Categories
3. Related Categories 1, 2, 3, 4, 5, 6, 7, 8, 9 & 10
4. Product description
5. Site URL,
6. Unique Record Identifier
7. iv. Product Number
8. v. Product price
9. vi. Feature or option
10. Feature or option
11. Feature or option
12. Link URL Link Table

TABLE 6

Agent Created Articles & Documents Table 13. vii. Type of Articles or Documents
14. Category - three letters representing General, Specific, and Special Interest Categories
15. Related Categories 1, 2, 3, 4, 5, 6, 7, 8, 9 & 10
16. Subject of Articles or Documents
17. Site URL,
18. Unique Record Identifier
19. viii. Date
20. ix. Author
21. x. Source of Articles or Documents
22.
23.
24. Link URL Link Table

TABLE 7

Agent Created MP3 Table Fields 25. xi. Title of Song
26. Category - three letters representing General, Specific and Special Interest Categories
27. Related Categories 1, 2, 3, 4, 5, 6, 7, 8, 9 & 10
28. Host IP address,
29. Site URL,
30. Unique Record Identifier
31. xii. Name of Group
32. xiii. Name of Artist
33. xiv. Name of Artist
34. Name of Artist
35. Name of Album
36. Name of Record label
37. Name of producer
38. Name of MP3 file
39. Size of MP3 file

TABLE 7-continued

Agent Created MP3 Table Fields

40. Year produced
41. Link to Site brochure
42. Link to Host brochure
43. Link URL Link Table

TABLE 8

Agent Created Video Table 1. xv. Name of Video
2. Category - three letters representing General, Specific Special Interest Categories
3. Related Categories 1, 2, 3, 4, 5, 6, 7, 8, 9, & 10
4. Host IP address,
5. Site URL,
6. Unique Record Identifier
7. Artists name 1
8. Artists name 2
9. Artists name 3
10. Name of director
11. Year produced
12. Name of Studio
13. Name of producer
14. Size of file
15. Link to Site brochure
16. Link to Host brochure
17. Link URL Link Table

TABLE 9

Agent Created URL Link Table 1. xvi. URL link
2. Category - three letters representing General, Specific Special Interest Categories
3. Related Categories 1, 2, 3, 4, 5, 6, 7, 8, 9 & 10
4. Host IP address,
5. Site URL,
6. Unique Record Identifier
7. URL link to other links in the Link Table.
8. Other desired information
9.
10.
11.

TABLE 10

Agent Created Site Brochure Table Fields

1. Site URL
2. Site Name _____ (RealName)
3. Site Description (limited to 25 words)
4. Name of site Host _____
5. Contact Name
6. Address
7. Phone
8. Fax
9. Contact person for technical related issues:
10. Contacts' direct phone number
11. Contacts' email address
12. Contact person for business related issues:
13. Contacts' Direct phone number
14. Contact's email address
15. Type of site
16. Company - Name _____
17. Organization Name _____
18. Individual - Name _____
19. Category
20. General
21. Specific Category

TABLE 10-continued

Agent Created Site Brochure Table Fields

| | |
|---|---|
| 22. | Special interest |
| 23. | Related Categories 1, 2, 3, 4, 5, 6, 7, 8, 9 & 10 |
| 24. | Demographics Site's intended audience |
| 25. | Age |
| 26. | Sex |
| 27. | Location of Site's intended audience: |
| 28. | World |
| 29. | Country |
| 30. | State or Province |
| 31. | City |
| 32. | District |
| 33. | Key words (repeated words will not be indexed) |
| 34. | Key Phrases (repeated phrases will not be indexed) |
| 35. | Related Site's |
| 36. | Comments |
| 37. | Others to be added. |

TABLE 11

Agent Created Company Information from Host Brochure

| | |
|---|---|
| 1. | IP number |
| 2. | Domain Name Server |
| 3. | Type of Domain Name Server |
| 4. | ISP - Name _____ |
| 5. | Company - Name _____ |
| 6. | Individual - Name _____ |
| 7. | ISP name |
| 8. | Company Name if different |
| 9. | Contact Name |
| 10. | Address |
| 11. | Phone |
| 12. | Fax |
| 13. | Contact person for technical related issues: |
| 14. | Contacts' direct phone number |
| 15. | Contacts' email address |
| 16. | Contact person for business related issues: |
| 17. | Contacts' Direct phone number |
| 18. | Contact's email address |
| 19. | General Information: (optional) |
| 20. | Area served |
| 21. | Number of email boxes hosted _____ or N/A |
| 22. | Number of Domain Names hosted(?) _____ or N/A |
| 23. | Number of Web sites hosted. _____ or N/A |
| 24. | Other Desired Information |

TABLE 12

Agent Created Site Map

| | |
|---|---|
| 1. | Site Map |
| 2. | IP number |

Figure 6:
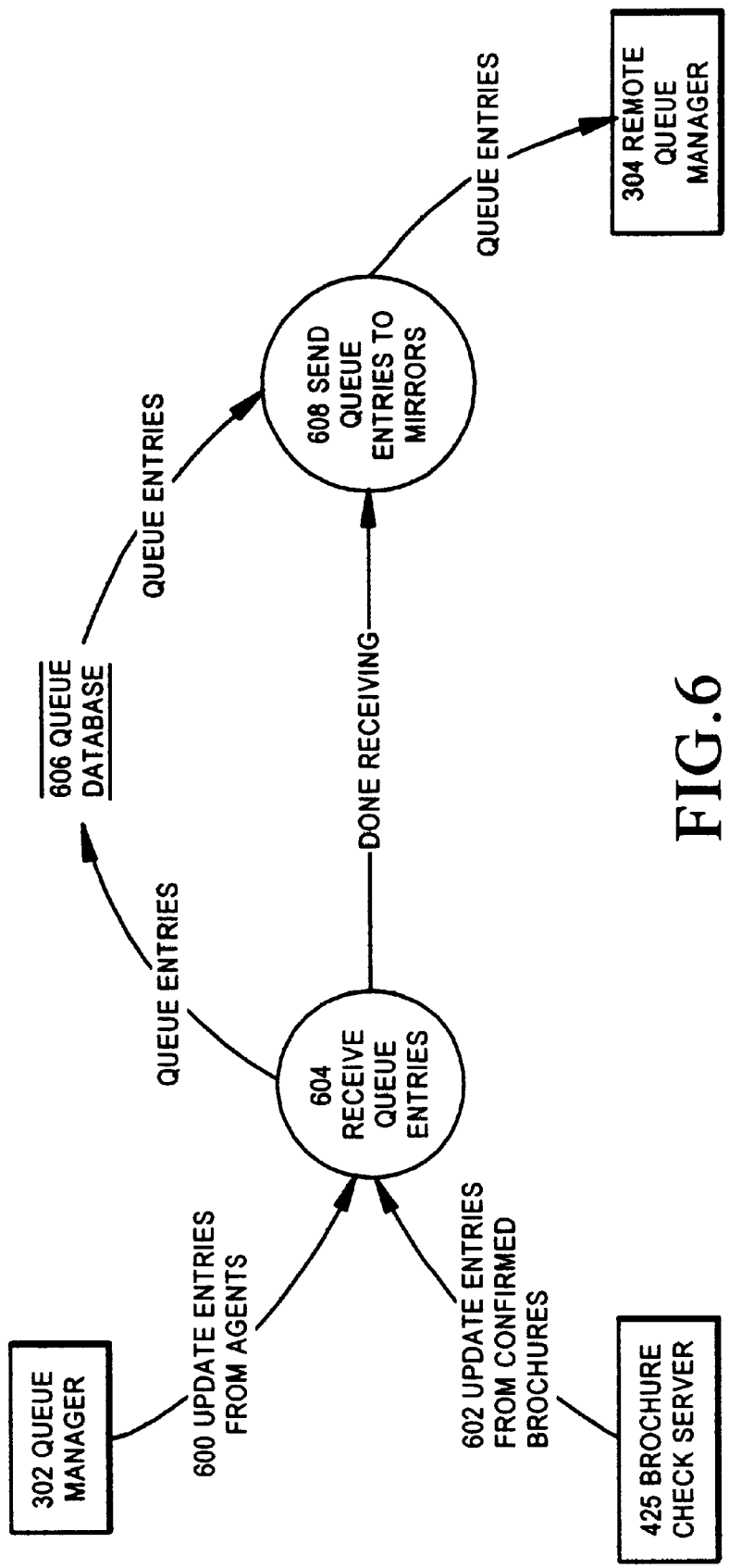
FIG. 6 is a bubble chart illustrating the process executed by the queue manager of FIG. 3 in queuing update entries and transferring these entries to the remote queue manager of FIG. 3.

FIG. 6 is a bubble chart illustrating the process executed by the queue manager 302 of FIG. 3 in queuing update entries and transferring these entries to the remote queue manager 304. The queue manager 302 receives update entries 600 from the agent update server 222 and update entries 602 from the brochure server 228, and places these update entries in an update queue 604. The entries in the queue 604 are transferred to a queue database 606. Once the queue 604 is done receiving update entries 600, 602, which may be when the queue is full or at predetermined intervals, the queue manager 302 goes to step 608 and retrieves the queue entries from the queue database 606 and sends them to the remote queue manager 304. As previously described, the update entries stored in the queue database 606 are thereafter processed by the update processing server 306 (see FIG. 3) to update the local master index on master index sever 218 (see FIG. 3). The queue manager 302 also receives a deletion request (not shown) from the update processing server 306 and deletes update entries stored in queue database 606 in response to this deletion request, as will be explained in more detail below with reference to FIG. 7.

Figure 7:
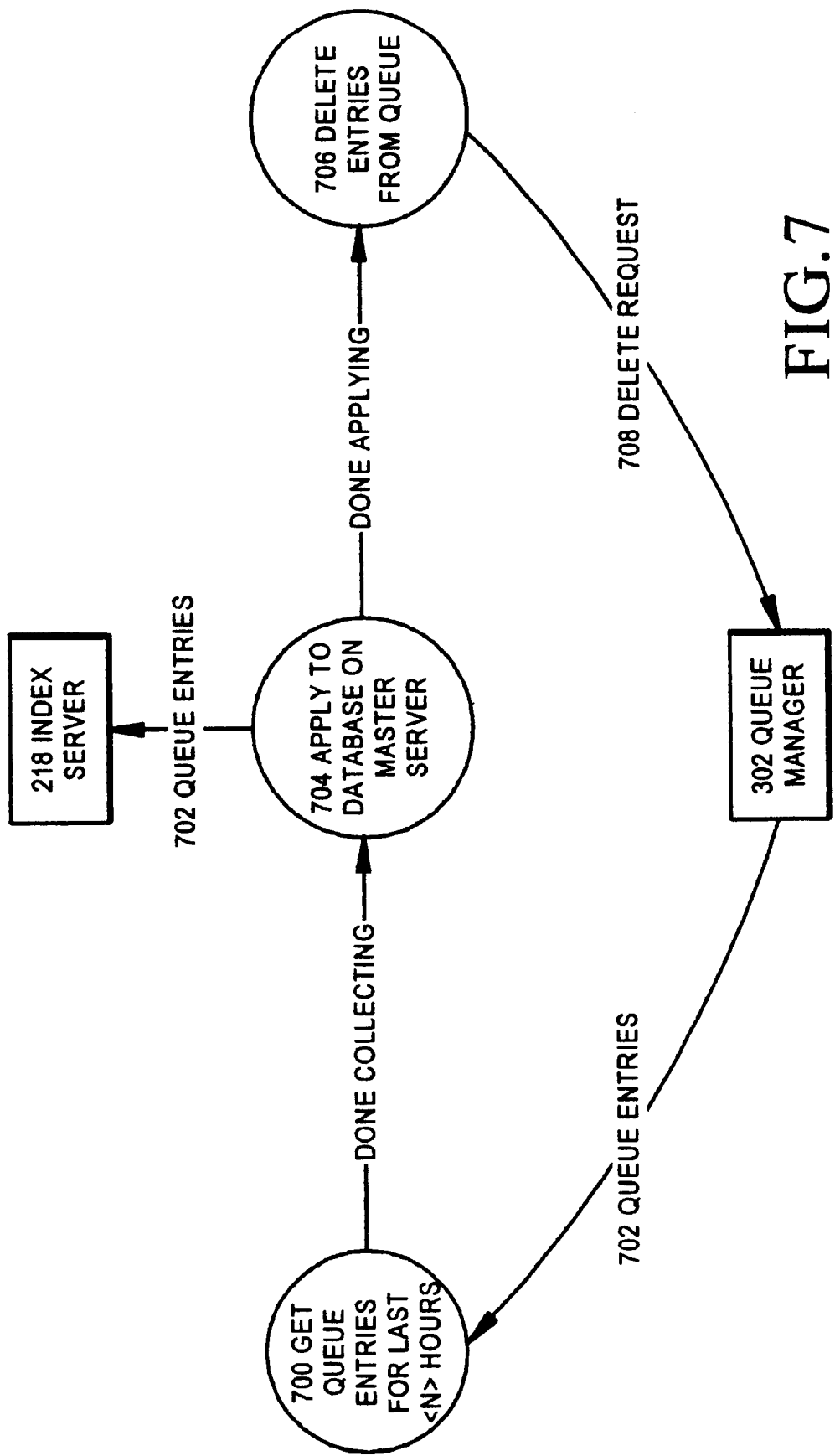
FIG. 7 is a bubble chart illustrating the process executed by the update process server of FIG. 3.

FIG. 7 is a bubble chart showing the process executed by the update processing server 306. The process begins in step 700 with the update processing server 306 retrieving queue entries 700 from the queue manager 304. In the embodiment of FIG. 7, the queue entries 702 are retrieved periodically so that in step 700 the queue entries for the last N hours are retrieved. From step 700, the process proceeds to step 704 and the update processing server 306 applies the queue entries to the master index server 218 which, in turn, utilizes the queue entries in updating the master index, as previously described. Once the queue entries 702 have been applied to the server 218, the process proceeds to step 706 and the update processing server 306 applies a deletion request 708 to the queue manager 302 (see FIGS. 3 and 6). In response the deletion request 708, the queue manager 302 deletes the update entries stored in the queue database 606 that have now been applied to the master index server 218. The central index on the master index server 218 has now been updated to include entries in the queue database 606, so these entries are deleted since they are now reflected in the central index and thus no longer needed.

Figure 8:
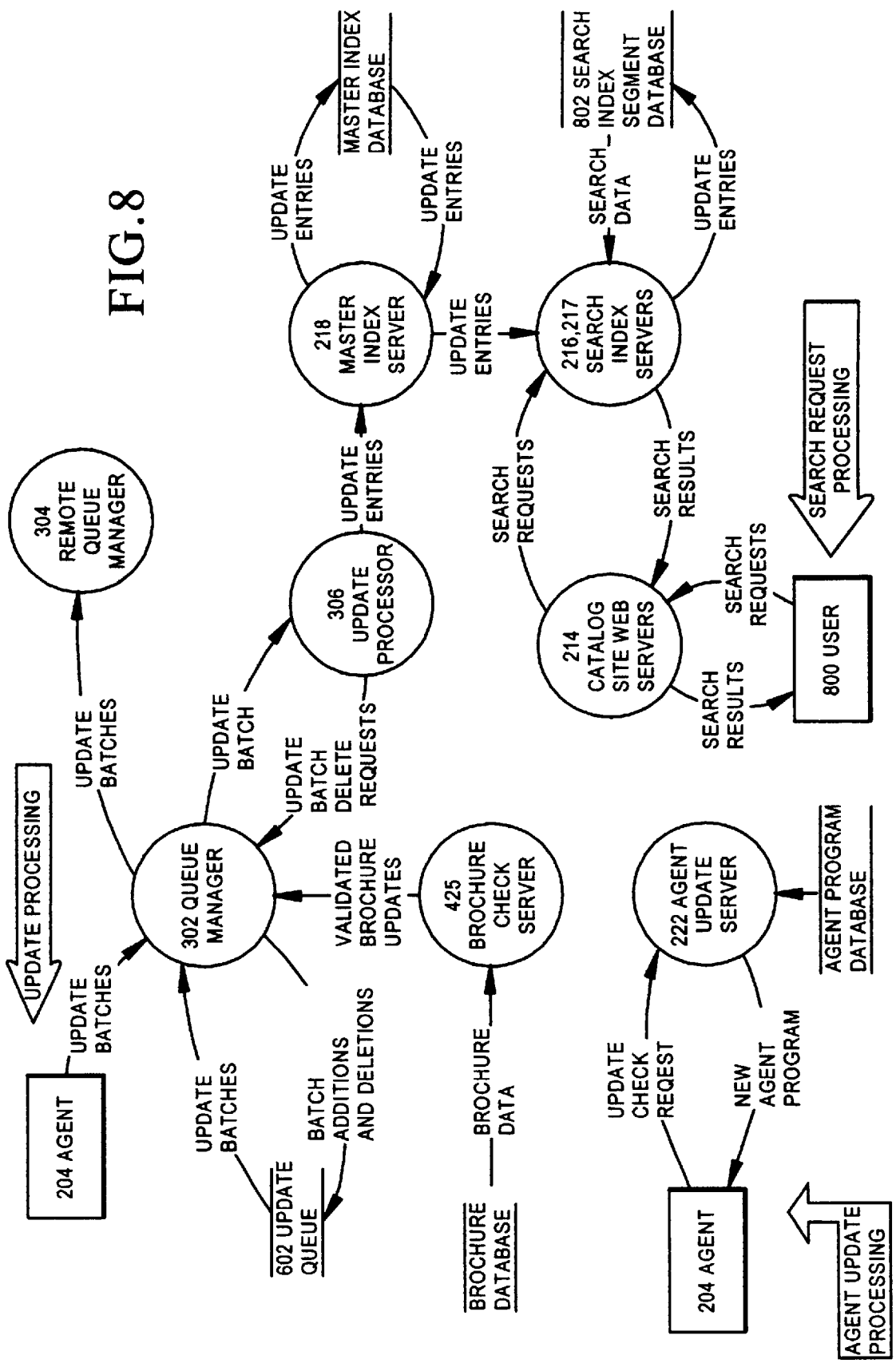
FIG. 8 is a bubble chart illustrating the overall data flow in the search engine of FIG. 3.

FIG. 8 is a bubble chart illustrating the overall data flow between the search engine 202, agent, and brochure components of the active indexing system 200. Each aspect of the overall data flow has already been described in a corresponding section above, and thus FIG. 8 will now be described merely to provide a brief description of the overall data flow of the indexing system 200 according to one embodiment of the present invention. The components of the process in FIG. 8 may logically broken into two functional groups, an indexing group and a searching group. In the searching group, a user 800 applies a search request to one of the web servers 214, which processes the search request and applies it to selected ones of the index servers 216, 217. In response to the applied search request, each of the search index servers 216, 217 queries its corresponding local index segment 802 and generates search data. The index servers 216, 217 then return the search results to the web server 214, which, in turn, provides the user 800 with the search results corresponding to his applied search request.

The web servers 214 also handle version queries from agents 204 on source sites. Each agent 204 sends a version check 804 that is processed by one of the web servers 214. In response to the version check 804, the web server 214 returns the digital signature of the most recent version of the agent 204, and also supplies the updated version 806 of the agent 204 to the source site if an update is required.

The remaining components in the FIG. 8 are in the indexing group. The queue manager 302 receives updates from each of the agents 204 and from the brochure check server 228, which services sites without an agent 204 as previously described. The queue manager makes update and deletions to the queue database 602 corresponding to the received updates, and also provides a mirror copy of these updates to the remote queue manager 304. The update processing server 306 retrieves the update entries from the queue manager 302, and applies the updates to the master index servers 218. The server 218 updates the master index to include the applied updates, and the update processing server 306 then sends a deletion request to the queue manager 302 to delete the corresponding entries from the queue database 602.

Once the master index server 218 has updated the master index, the server updates the segmented index stored on the search index servers 216, 217 as previously described. Each of the search index servers 216, 217 updates its corresponding portion of the segmented index in response to the updates from the master index server 218. As previously mentioned, the entire segmented index stored on the index servers 216 is continuously available for processing search requests even during updating of the segmented index. The entire segmented index is available due to the redundant architecture of the servers 216, 217, as previously described.

Figure 9:
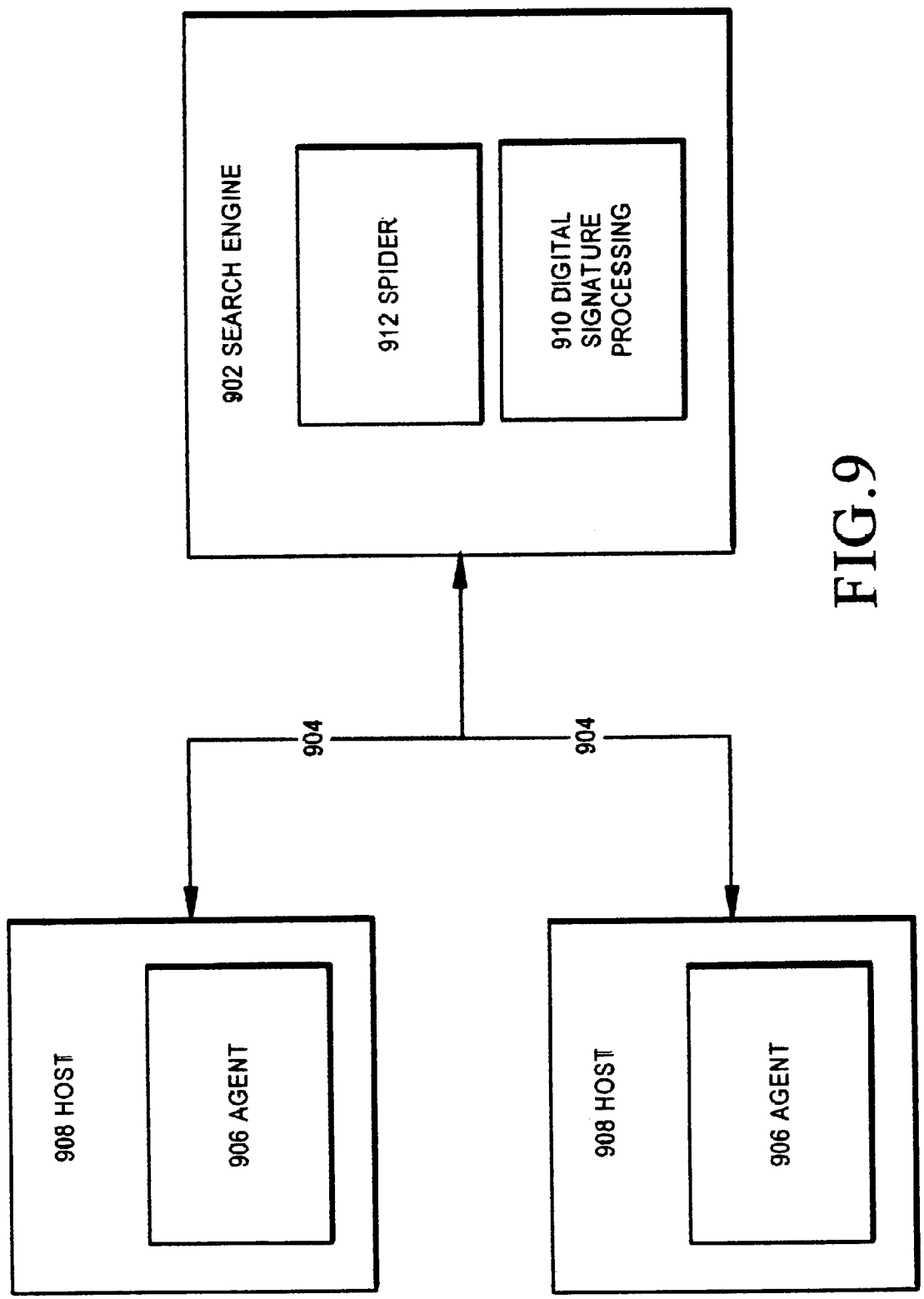
FIG. 9 is a functional block diagram of a distributed search engine according to another embodiment of the present invention.

FIG. 9 is a functional block diagram of a distributed search engine 900 according to another embodiment of the present invention. The search engine 900 includes a central search engine 902 connected over a network 904, such as the internet, to a plurality of agents 906, each agent being resident on a respective server 908. Each agent 906 generates a list of digital signatures related to retrievable information on the corresponding server 908 and provides these signature to the search engine 902 which determines which files to access for updating its index, as will now be explained in more detail. In the following description, the server 908 is a standard web server, but one skilled in the art will appreciate that the distributed search engine 900 can be implemented for a number of other services available on the internet, including but not limited to email servers, ftp servers, "archie", "gopher" and "wais" servers. Furthermore, although the agent 906 is shown and will be described as being on the web server 908, the agent 906 need not be part of the program which processes requests for the given service.

In operation, the agent 906 periodically generates a list of signatures and accessible web pages, which are then stored on the local web server 908. The digital signature generated by the agent 906 could be, for example, an digital signature of each file on the server 908. The list of digital signatures is then transmitted by the agent 906 to the search engine 902, or the search engine 902 may retrieve the list from the servers 908. A digital signature processing component 910 in the search engine 902 then compares the retrieved digital signatures against a historic list of digital signatures for files on the server 908 to determine which files have changed. Once the component 910 has determined which files have changed, a spider 912 retrieves only these for indexing.

The digital signatures may be stored in an easily accessible file format like SGML. Alternatively, the digital signatures could be generated dynamically when requested on a page by a page or group basis. This would insure that the signature matches the current state of the file. In addition, several new commands would be added to the standard http protocol. The new commands perform specified functions and have been given sample acronyms for the purposes of the following description. First a command GETHSH retrieves the digital signatures for a given URL and sends the signatures to the search engine 902. A command CHKHSH checks the retrieved digital signature for a given URL against a prior digital signature and returns TRUE if the digital signatures are the same, FALSE if not the same, or MISSING if the URL no longer exists. A command GETHLS retrieves a list of the valid URLs available and their associated digital signatures, and a command GETLSH retrieves the digital signature of the URL list.

Using the above command set, the search engine 902 need not request the entire contents of a page if that page has already been processed. Furthermore, there is no need to "spider" a site. Instead, the web server 908 provides the valid list of URLs which can then be directly retrieved. As an example, consider the following programmatical steps from the point of view of a search engine. First, given a web host 908, fetch the digital signature of the URL list. If the digital signature does not match a prior digital signature for the list, fetch the list of URLs from the web server. Thereafter, compare the list of URLs at the client web server 908 just retrieved to those stored locally at the search engine 902. From this comparison, a list of changed URLs is determined. The URLs that have changed are then retrieved and parsed for keyword and other indexing information. Once the indexing information is obtained, all URL's which do not appear in the retrieved list and the prior list are deleted from the search index on the search engine 902.

From the above description, one skilled in the art will appreciate that it is not necessary to retrieve all pages on the web site for every indexing process. Full retrieval of all web pages is necessary only once or if the entire site changes. This has several effects, the most important being that the amount of information transmitted is drastically reduced. The above method is but one possible implementation or embodiment. In another embodiment, a list of URLs on the search engine could be used and the individual checking of web pages done using the commands given. For example, the search engine 902 could tell if a page was current by simply retrieving its signature. If current, no other activity is required. Otherwise, the page might be deleted if no longer present or re-indexed if it has changed.

In a conventional search engine, the search engine normally requests that a web server deliver HTML documents to the search engine, regardless of whether the contents of the page have changed since the last recursive search. This is wasteful not only of CPU resources, but very wasteful of bandwidth which is frequently the most valuable resource associated with a web site. Thus, current search engines and content directories require regular retrieval and parsing of internet-based documents such as web pages. Most search engines use a recursive retrieval technique to retrieve and index the web pages, indexing first the web page retrieved and then all or some of the pages referenced by that web page. At present, these methods are very inefficient because no attempt is made to determine if the information has changed since the last time the information was retrieved, and no map of the information storage is available. For example, a web server does not provide a list of the available URLs for a given web site or series of sites stored on the server. Secondly and most importantly, the web server does not provide a digital signature of the pages available which could be used to determine if the actual page contents have changed since the last retrieval.

Another alternative embodiment of the process just described is the automated distribution of a single web site across multiple servers. For example, a web site would be published to a single server. Periodically, a number of other servers would check the original server to see if any pages have been added, removed or changed. If so, those pages would be fetched and stored on the requesting server. Another alternative embodiment is the construction of meta indexes generated as lists of URLs from many different web servers. Such a meta index would be useful as a means of providing central directory services for web servers or the ability to associate sets of descriptive information with sets of URLs. The method could also be used to create directory structure maps for web sites, as will be appreciated by one skilled in the art.

The indexing system 200 may be used not only on the global communications network but on corporate Intranets as well. A typical corporate intranet includes a central location, such as a corporate headquarters, at which a central searchable database is maintained, and a number of remote locations, such as regional offices or stores, coupled to the central location through a network of intranet. Each remote location transfers data to the central location for storage in the central database. The remote locations may also search the central database for desired information.

In transferring data from each remote location, data is typically stored at the remote location and then transferred to and replicated at the central location. One of four methods is generally used to update the central database, as previously discussed above under the Background section. First, all remotely stored data is copied over the intranet to the central location. Second, only those files or objects that have changed since the last transfer are copied to the central location. Third, a transaction log is kept at the remote location and transmitted to the central location, and the transaction log this then applied at the central location to update the central database. Finally, at each remote location a prior copy of the local data is compared to the current copy of the local data to generate a differential record indicating changes between the prior and current copies, and this differential record is then transferred to the central location and incorporated into the central database.

Each of these methods relies on duplicating the remote data, which can present difficulties. For example, redundant hardware at the remote and central locations must be purchased and maintained for the storage and transfer of the data over the intranet. Data concurrency problems may also arise should transmission of differential data from the remote locations to the central location be unsuccessful or improperly applied to the central database. Furthermore, if the intranet fails, all operations at remote locations may be forced to cease until communications are reestablished. A further difficulty is the author's loss of authority over his document and the responsibility for retention and data management decisions. In a centralized intranet, unregulated retrieval of objects from the central database to local storage can creates version control problems. Difficulty in handling revisions to an object may also arise in such a centralized system, with simultaneous revision attempts possibly causing data corruption or loss. Finally, in centralized system the size of the central database can grow to the point where management of the data becomes problematic.

With the architecture of the indexing system 200, everything, including each field in a local database, is treated as an object. Instead of copying each object to a central location, an object reference is created at each local site and sent to a cataloging location or locations. The objects are not duplicated in a monolithic central database. One advantage to this architecture is that the decision of whether to expose the existence and classification of local objects becomes the responsibility and choice of the author, rather than a generic decision. In the system 200, the implementation of retention rules and the physical location of the objects remain with the author. The searchable central catalog merely references the distributed objects, eliminating the need to make full copies and therefore manage a large storage system. Each local site generates and transfers information to the central server 202, or to a plurality of central servers for use in a searchable catalog.

Figure 10:
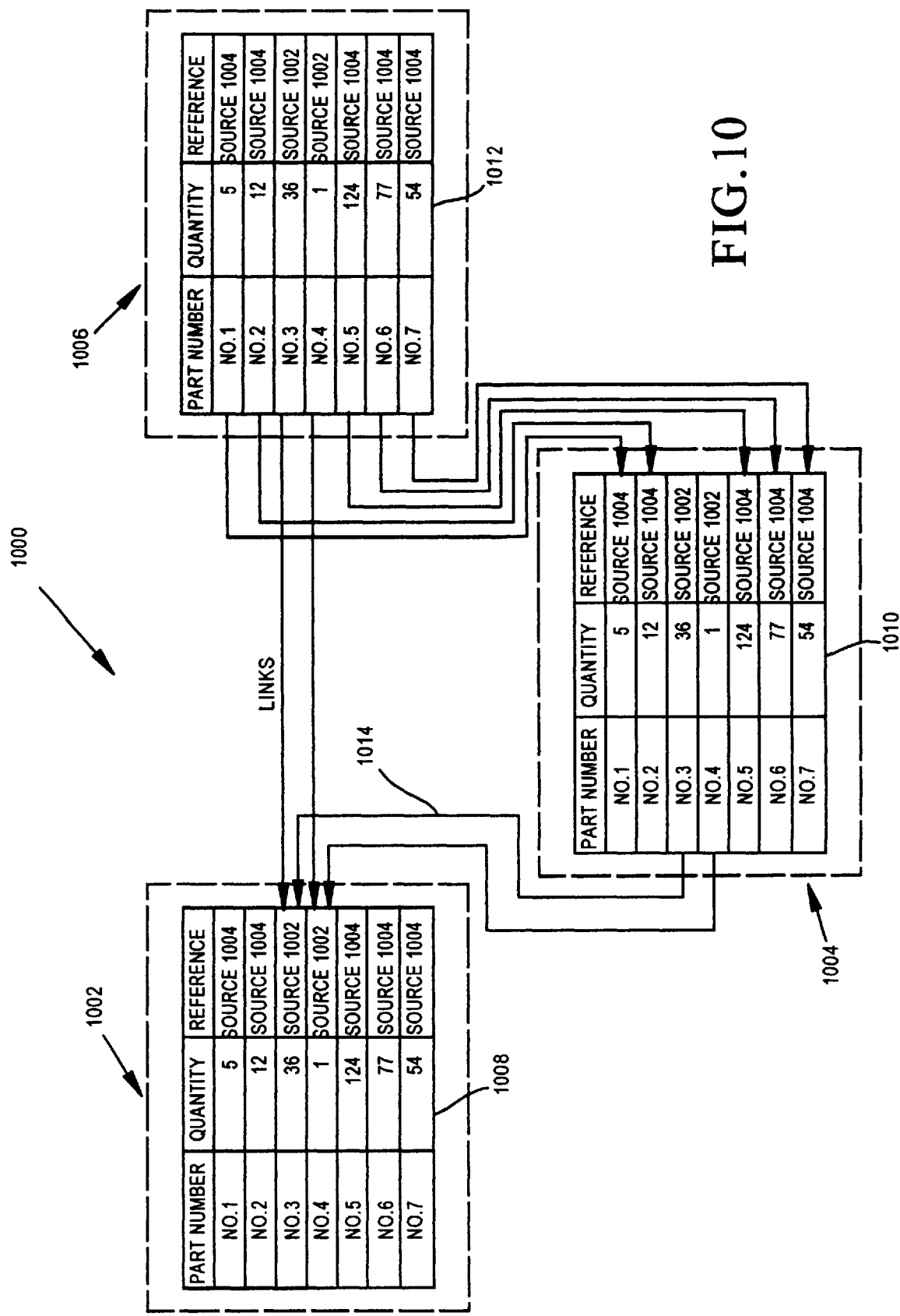
FIGS. 10 and 11 are diagrams illustrating operation of a distributed accounting and inventory system on an intranet according to one embodiment of the present invention.
Figure 11:
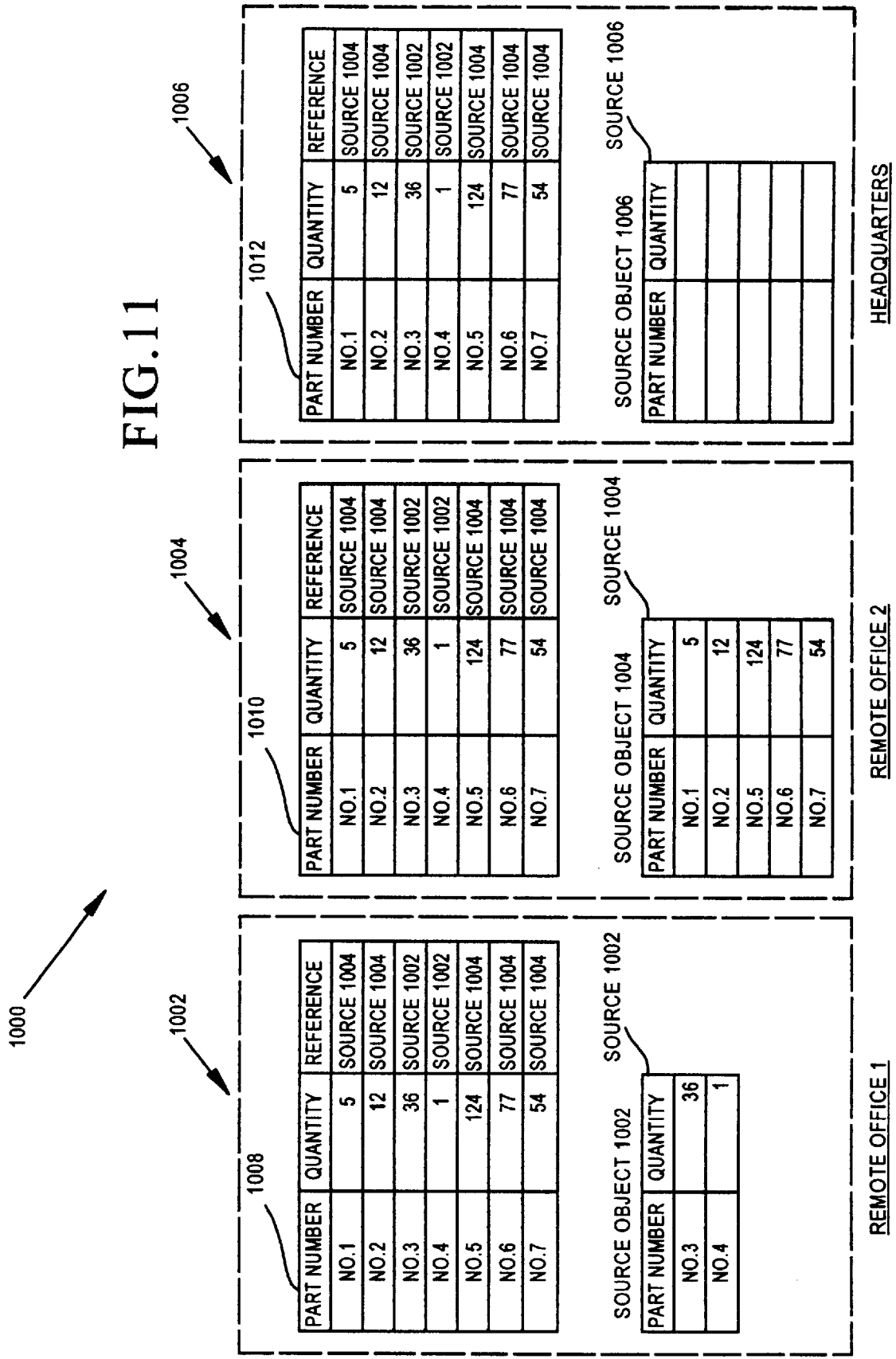

FIGS. 10 and 11 are diagrams illustrating operation of a distributed accounting and inventory system on an intranet 1000 according to one embodiment of the present invention. In FIG. 10, the intranet 1000 includes three different physical locations 1002, 1004, and 1006 including catalogs 1008, 1010, and 1012, respectively. Each location 1002–1006 also includes a source of objects (not shown in FIG. 10) that corresponds to an inventory of items at that location. The sources objects or sources for the locations 1002, 1004, 1006 are designated sources 1002, 1004, and 1006, respectively, in records of the respective catalogs 1008–1012. In the example of FIG. 10, the source 1006 is empty (i.e., no inventory items at location 1006). Each of the catalogs 1008–1012 is a catalog of object references to objects in the source at the corresponding location and to objects at the other locations. For example, the catalog 1010 at location 1004 includes a record for part no. 1, which is part of the inventory or source 1004 at this location. The catalog 1010 further includes an object reference, as indicated by the arrow 1014, for part no. 3, which is part of the inventory or source 1008 at location 1002. The catalog 1010 does not store a duplicate copy of the information in the record for part no. 3, but instead merely stores a reference to that object.

FIG. 11 is another diagram of the intranet 1000 expressly illustrating the sources 1002–1006 on the locations 1002–1006, respectively. The source 1006 is shown as containing no objects, such as may be the situation where the location 1006 is at a headquarters of a corporation. The sources 1002 and 1004 each include objects or inventory items, such as where these locations are remote offices of the corporation. This example illustrates that records for objects are not duplicated on each location 1002–1006, but instead object references in each of the catalogs 1008–1012 point to objects stored in remote sources.

The intranet 1000 provides several advantages in accounting or inventory control applications, and others. A conventional intranet requires the centralization of the catalog for purposes of control. The intranet 1000 separates the control of the physical inventory (objects in the sources 1002–1006) from accounting control. Since the whole intranet includes only objects and object references, then central reporting and planning can occur to the location 1006, but such reporting merely corresponds to data being read from the remote locations 1002, 1004, and no data is modified. In the intranet 1000, each location 1002–1006 functions as both a server and a client, and minor latency between the locations is not critical because within each location accounting and physical control remain linked. Latency need be considered only where authority to sell or transfer inventory (objects in the sources 1002–1006) is separate from the physical control of the inventory.

With the intranet 1000, the author of an object has physical control over that object and thus may decide what objects are to be exposed for searching by other locations. As a result, the intranet 1000 is well suited for high-security management systems that typically require elaborate security procedures to prevent unauthorized duplication of data. For example, assume there are 200 remote information generators (offices, salespeople, etc.). With the intranet 100, data access to information in the objects is maintained through the use of the references available to both the central location and the remote.

The intranet 1000 also provides a more effective means to organize and describe organizational data, creating a much more flexible environment for data retention handling. A data retention handling system has two primary goals: 1) eliminate obsolete data to prevent confusion with current data and reduce storage requirements; and 2) reduce liability. Typically, hierarchical storage management ("HSM") systems have been used for these purposes. A HSM system stores frequently-used or relatively new files on high-speed, immediately available, and most expensive storage media.

Older files or files that are not as frequently used are stored on "near-line" storage media that may consist of automatically mounted tape drives or CD-ROMs. Old files or files that are almost never used are stored off-line on tape or other inexpensive high-capacity media. Some files may eventually be deleted if they fall within certain parameters of usage, type, or age. The intranet 1000 overcomes these potential difficulties of a HMS system. For example, in the intranet 1000 duplicate copies of records are not maintained at each location, thereby eliminating the need for hierarchical storage media to provide the required access to stored records.

The agent 204 may also generate ratings for objects stored on the associated sites so that users may filter their searches based upon the generated ratings. For example, in one embodiment, an owner of a web site provides a rating of his site, such as a "G," "R," or "X" rating. In addition, the web host, on which the agent 204 runs, also provides a rating that the host believes applies to the site. The agent 204 then parses the pages on the site and looks for adult content "trigger" words, such as "XXX" or "XXX-Rated." If the agent 204 finds enough occurrences of such trigger words, the agent "flags" the web site for review to determine the correct rating for the site. To rate the site, the agent 204 compares the words in the web pages to words in a list of ratings values. The list of ratings values may be, for example, words that are generally found on adult web sites, such as profane and sexually explicit words. The list of ratings values may be generated by a human or may be automatically generated by the agent 204. To automatically generate the list, the agent 204 could, for example, parse known adult web sites. Such known adult web sites could be identified by determining those sites in the catalog that include the phrases "adult content" or "X-rated." Once these sites are identified, the agent parses the pages and determines frequently used words on such pages, and may also determine the frequency with which such words occur on these pages. The frequently used words and associated frequencies are then compiled to form the list of ratings values. After flagging web sites for review, the review may be either through human review of the web site or through automated review performed by the agent 204. In automated review of flagged web sites, the agent 204 could, for example, determine the frequency of occurrence of words in the list of ratings values, and then set the rating of the web site as a function of the frequency. For example, if the frequency is greater than some threshold T1, the web site is rated "R," and if greater than a second threshold T2, where T2>T1, the site is rated "X."

One proposed system for rating web pages on the Internet is described in A Best Practices Model by Members of the Information Society Project at Yale Law School, J. M. Balkin, Beth Simone Noveck, Kermit Roosevelt (Jul. 15, 1999), which may be found at http://webserver.law.yale.edu/infosociety/. In this proposed system, three layers are implemented to provide for rating web pages. The first layer includes a basic vocabulary of, for example, thirty to sixty terms that are used in rating a web page by a first party, typically the site owner containing the web page. The second layer includes rating templates developed to reflect a particular ideology. Third parties, such as the NAACP or Christian Coalition, would develop such templates to reflect a particular value system. The templates would include terms in the basic vocabulary being categorized and scalar values assigned to each item to reflect the value system. Finally, in layer three individuals could customize or modify a template to suit their individual values. For example, a template developed by the Christian Coalition could be further modified to include scalar values for web sites designated as racist by the NAACP.

The indexing system 200 could utilize such a rating system to perform filtering of search results at the central server 202. For example, user's browsers could be registered with the central server 202, and part of this registration would include selection of a template and any desired modifications to the selected template. Thereafter, whenever the user's browser applies a search query to the central server 202 the browser registration is identified and the search results generated in response to the query are "filtered" according to the template and any template modifications associated with the registered browser.

The indexing system 200 also may perform adult-content locking. In conventional search engines, adult-content web sites are automatically provided in response to applied search queries. The only way for a user to filter adult-content is through a filter on his browser. Thus, current search engines are "opt-in" only in that the search engine does not preclude adult-content pages from being returned in response to applied search queries. Conversely, in one embodiment of the indexing system 200, the user is automatically opted out of receiving adult-content web pages in response to applied search queries. The user must reverse this default "opt-out" status and elect receive adult-content web pages in the system 200. This could be done, for example, by registering a browser with the system 200 so that when the registered browser is identified adult-content web sites will be returned in response to applied search queries. Alternatively, a machine level lock using the computer or machine identification, such as the CPU or Windows identification number, could be utilized. In this approach, regardless of the browser being utilized on the computer, adult-content is either returned or not returned in response to applied search queries. This approach may be particularly desirable for parents who want to preclude their children from accessing adult-content since a child cannot merely use a new browser on the same machine and thereby circumvent the filter the parent has on his or her browser.

The indexing system 200 may also perform ranking of web pages having references in the central index. First, the agent 204 may perform positional and contextual rankings for particular words in the web pages on a site. The positional rankings assign a ranking value to a word based upon, for example, the location of the word in the web page and the position of the word relative to other words in the page. The contextual ranking is determined using contextual information about the site contained in the brochure 206. For example, if a word in a web page corresponds to a category as listed in the brochure 206 (see Table 2), the word will be assigned a higher ranking. In addition to rankings generated by the agent 204, the central server 202 also generates rankings for the central index. For example, the central server 202 may generate rankings based upon whether a page is a source or reference to the desired data. Rankings may also be determined based upon user input such as the usage or popularity of a site as measured by how often the site is linked as the source site in other sites, or through positive comments entered by users about the context or ranking of a site. All the methods of ranking just described are know as static rankings, meaning that the ranking is determined before a particular search query is applied.

In addition to static rankings at the central server 202, the central server may also perform dynamic ranking of search results. Dynamic rankings are a function of the applied search query, and are not predetermined and independent of the query. For example, if the applied search query is "red barn," the word "barn" is probably more important than "red" so search results including the word "barn" will have their ranking increased relative to those containing only the word "red." Furthermore, ratings could be applied to search queries to create another type of dynamic ranking at the central server 202. Finally, a user may select which ones of the previous methods of rankings should be applied in ranking search results generated in response to his applied query. For example, a user could specify that his search results are to be ranked only on the basis of popularity, or only on the basis of positional and contextual rankings and the applied search query. Another example for the use of dynamic ranking is using the information in the brochure 206, the search results can be ranked dynamically based on the geographic distance from the searcher.

A Java-based implementation of the software elements of the indexing system 200 is now described according to one embodiment of the present invention. We look at several elements from a simple requirements analysis through use cases to package details in class diagrams. These elements are summarized below in Table 13 and each element will be described in more detail below.

TABLE 13

| | |
|---|---|
| Use Cases | This section tries to elaborate system requirements from a use case perspective. |
| Server Architecture | This section shows the high-level server architecture we will need. |
| Data Structures | This section covers key data structures required by the system. |
| Algorithms | This section covers a few critical algorithms used in the system. |
| Packages | This section breaks out Java packages and required classes into componentized elements. |

In order to identify the way users will approach the system, use cases are presented and briefly explored. Each of these represents a role played by individuals. A single individual may play multiple roles. The objective of this section is to clarify system requirements and user-based objectives. A brief summary of explored roles is shown below in Table 14.

TABLE 14

| Name | Description |
|---|---|
| Authenticated Users | Most users need to be authenticated, so this role is used to clarify this requirement. |
| Web Site Owner | This role relates to someone who has content on a web site that they manage. |
| Web Host Administrator | This role assumes ownership of administrative privileges on a host site that may support multiple content developers. |
| Web Searcher | Most of the people who use the search engine will be looking for information in the Internet. |
| Search Engine Administrator | Someone needs to manage the system. |
| Customer & Technical Support | Support provided for basic users and registered users. |
| Impression Sales | Some revenue will come from banner adds and URL impression sales. |
| Partnership Manager | Some revenue will come from portals and remote hosting partnerships. |

Each of these elements will now be further described. First, most users, with the exception of individuals using the search engine to find information on the Internet, will need to be authenticated, as illustrated in FIG. 12.

Figure 12:
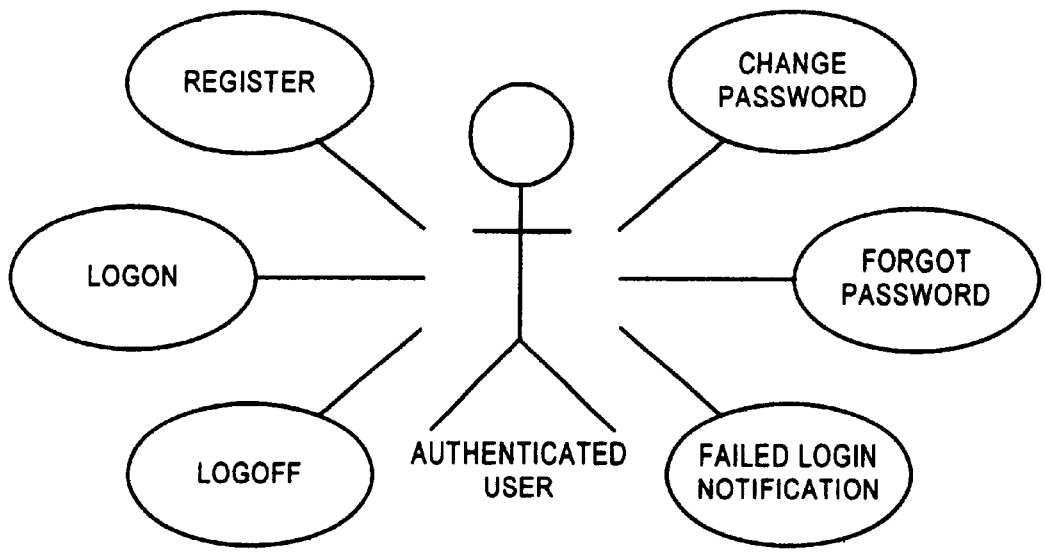
FIGS. 12–44 are figures illustrating components of the indexing system of FIG. 2 for a Java-based implementation of the indexing system according to one embodiment of the present invention.

Referring to FIG. 12, the operations that need to be supported to authenticate users include those shown in Table 15.

TABLE 15

| Case | Description |
|---|---|
| Register | This requires the entry of sufficient information for ActiveIndexing records. Brochure users can register themselves and have restricted access only to their own records. ActiveIndexing staff will be registered by a system administrator. |
| Logon | Allows the user to access the part of their system they have permission to access. |
| Logoff | Ensures the user is no longer active on this system. |

A web site owner may be a content developer that owns a web site and develops content for that web site. Such a person may be hosting their own site but is often simply deploying content on another entity's machine. In this role, the owner does not administer the hardware/software and manages only site content as illustrated in FIG. 13.

Figure 13:
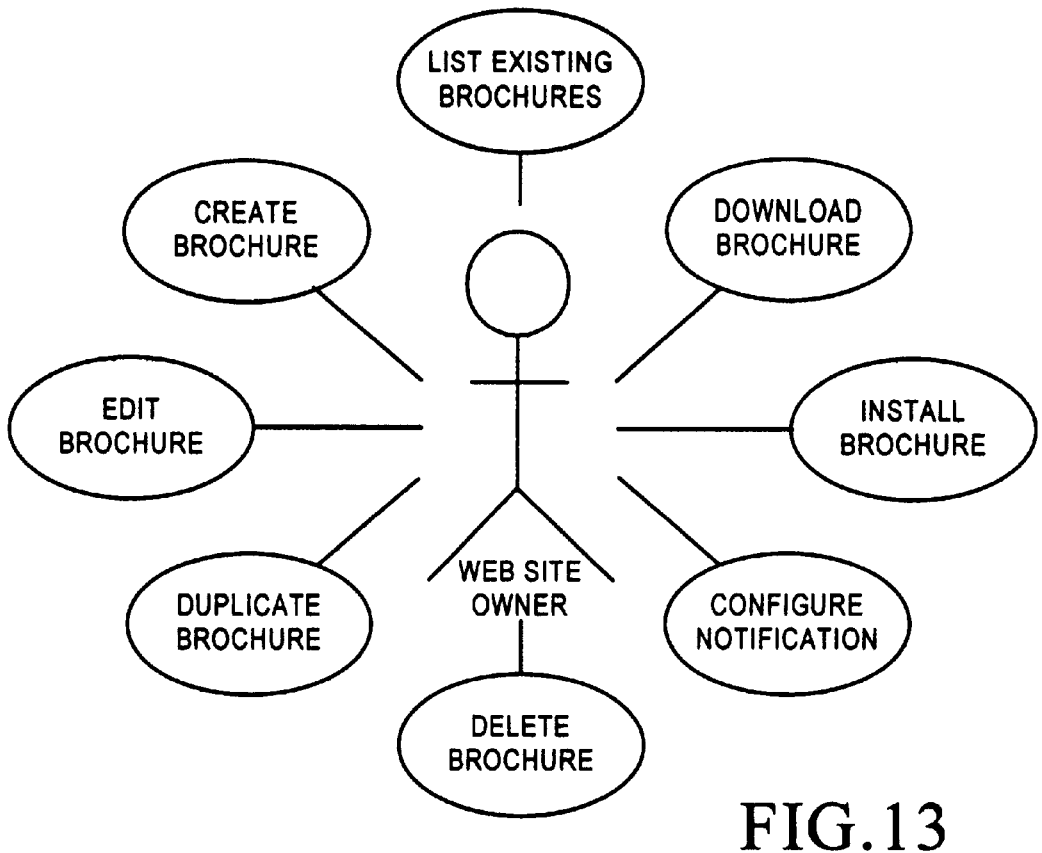

Referring to FIG. 13, the operations that need to be supported include those shown below in Table 16.

TABLE 16

| Case | Description |
|---|---|
| List Existing Brochures | Provides a selection list of existing brochures previously created by this user. |
| Create Brochure | Create a new brochure, name it and fill out a form to describe site content. |
| Edit Brochure | Created brochure can be edited to keep information current or to correct errors. |
| Duplicate Brochure | An existing brochure can be used as a starting point for a new brochure. It must be given a new name when duplication occurs. |
| Delete Brochure | An outdated brochure can be removed from the database. |
| Download Brochure | A brochure must be downloaded to the user's system in the format required for deployment. |
| Install Brochure | A brochure must be installed on the web site after it has been downloaded. |
| Configure Notification | Notification is sent to the user when the agent updates the index or when brochures are scanned by the update manager. The user can choose the level of notification they receive. |

A web host administrator manages a physical web site and has system administrator privileges. They can install and manage software on the system.

Figure 14:
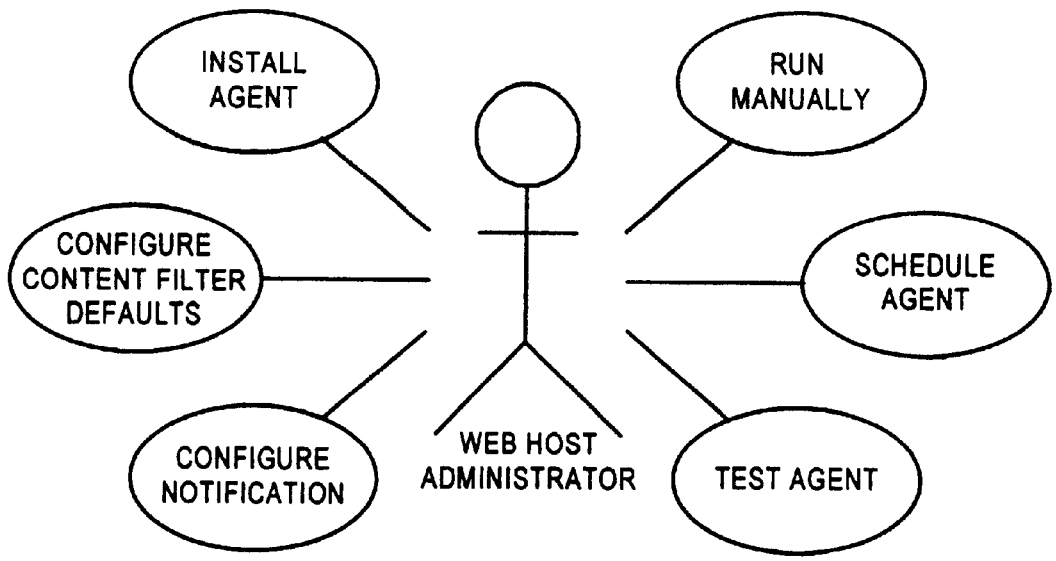

Referring to FIG. 14, the operations that need to be supported by a web host administrator including those shown below in Table 17.

TABLE 17

| Case | Description |
|---|---|
| Install Agent | The ActiveIndexing agent can be downloaded and installed by the system administrator. |
| Configure Content Filter Defaults | URLs associated with specific site addresses are assigned default content filters to avoid site filter fraud. |
| Configure Notification | Notification can be sent based on exceptions only or all event notification events are sent by email. |
| Test Agent | To ensure proper installation, the administrator will want to run some kind of simple test that confirms successful installation. |
| Schedule Agent | To run the agent nightly, the administrator may want to change the existing schedule to a time of day most suited to their usage patterns. |
| Run Manually | The agent may be run manually at any time. |

The role of the web searcher is the end user of the system, which operates for free on the Internet, or any other future global communications network, since revenue is brought in through other entities. A web searcher expects to use the system to find things and navigate through their findings.

Figure 15:
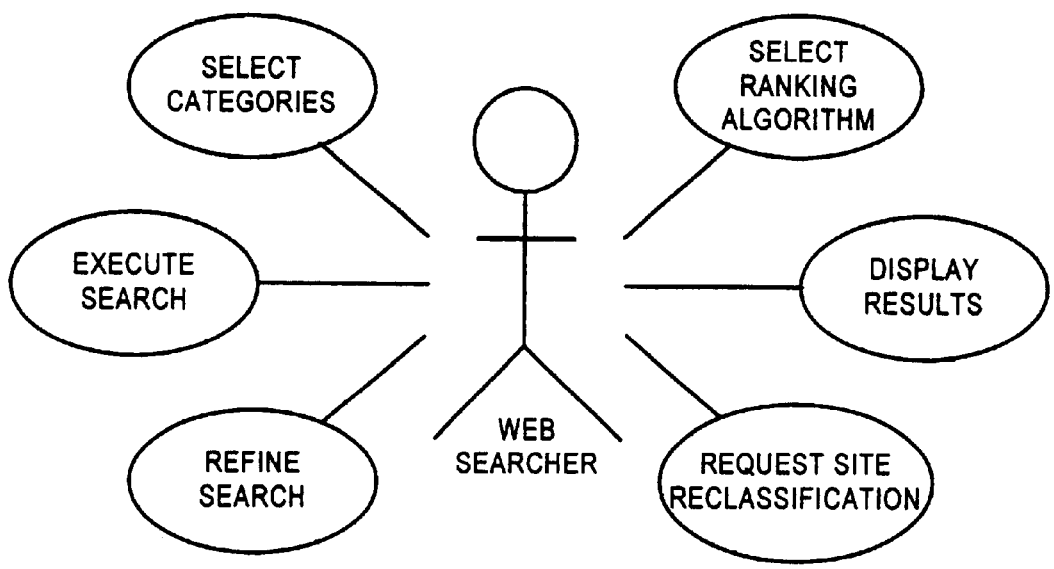

Referring to FIG. 15 operations that need to be supported by a web searches including those shown in Table 18.

TABLE 18

| Case | Description |
| --- | --- |
| Select Categories | High-level categories are presented for user selection. |
| Execute Search | This means entering one or more keywords and executing the actual search. |
| Refine Search | After a preliminary search, additional options are made available to narrow the search to more targeted information. |
| Select Ranking Algorithm | Once the number of hits in the result set has been reported, the user can choose the algorithm to rank results by. |
| Display Results | After selecting a ranking algorithm, the user can display results. After seeing the first result page, the user can choose to continue to the next page or go back at will. |
| Request Site Reclassification | If one of the resulting page hits from a search appears questionable to a user, they may sent a request that we reclassify the site. This is especially important with adult content mistakenly found in non-adult searches. |

A search engine administrator ("SEA") is the individual(s) who manages the ActiveIndexing system. The SEA may add hardware, configure software, and take subsystems down for maintenance. They are responsible for keeping things running and have some fairly clear requirements.

Figure 16:
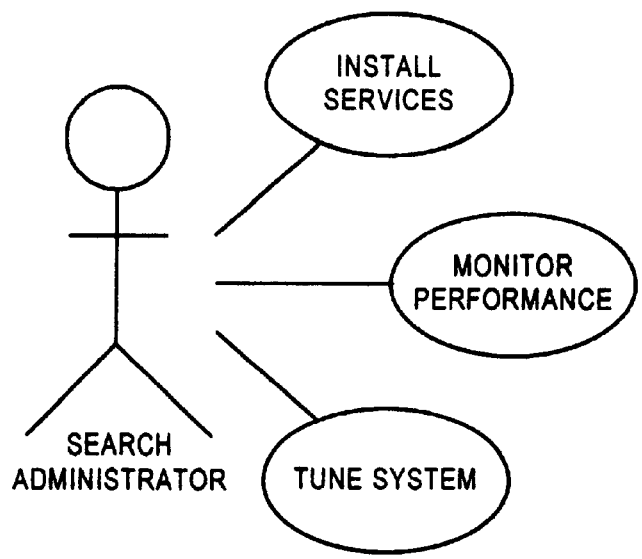

Referring to FIG. 16 operations that need to be supported by a web host administrator including those shown below in Table 19.

TABLE 19

| Case | Description |
| --- | --- |
| Install Services | The Jini services that make up the service will need to be installed on suitable hardware platforms. |
| Monitor Performance | This may range from network traffic to router performance but relates to the software in that metrics must be provided to help administrators gauge performance of each subsystem. |
| Tune System | An easy way to change parameters must be provided. |

The system 200 must also include customer and technical support that assists users requesting information or assistance, such as a customer. Most average users can get some level of free e-mail service. The Web Site Owner and Host Site Administrators are the individuals who may require the most support.

Figure 17:
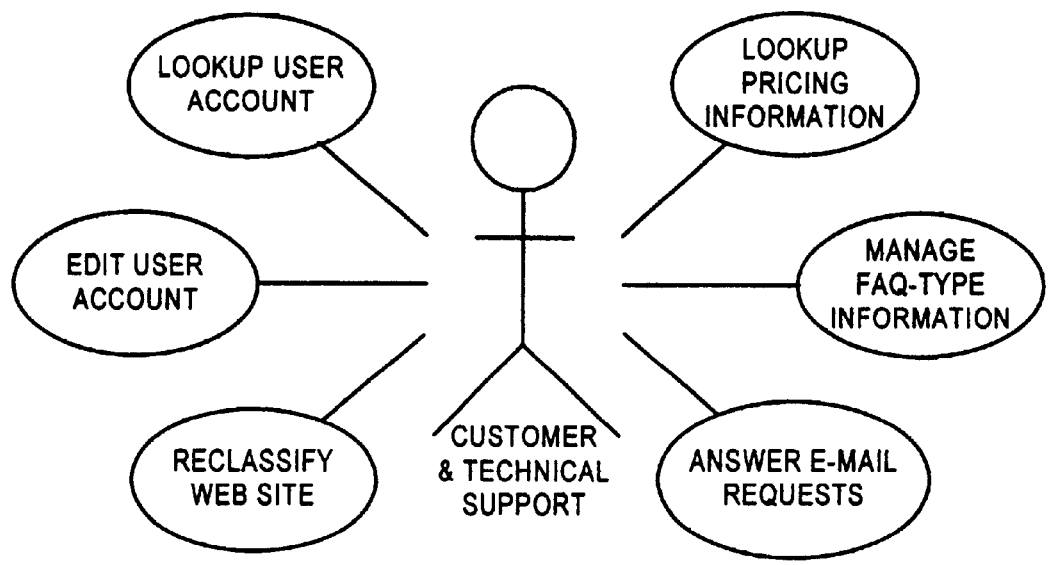

Referring to FIG. 17, the operations that need to be supported by a web host administrator including those shown below in Table 20.

TABLE 20

| Case | Description |
| --- | --- |
| Lookup User Account | Users requiring assistance will have to be recorded and found in the system database if they are registered. |
| Edit User Account | Some changes to the user profile may require support intervention. |
| Reclassify Web Site | When users request site reclassification, action must be taken by the support team to determine whether a change need to be made or not. |
| Lookup Pricing Information | Some common information will need to be readily available. |

TABLE 20-continued

| Case | Description |
| --- | --- |
| Manager FAQ-Like Information Answer E-Mail Requests | Support cost can be dramatically reduced when the support team can manage help-related content online. Most of the free support provided by the company is likely to be e-mail based. |

The nest element of Table 14 is impression sales. Search engines derive much revenue from banner add sales and an individual will have to administer this aspect of the system. Such a person will be given authentication information for logon by a system administrator.

Figure 18:
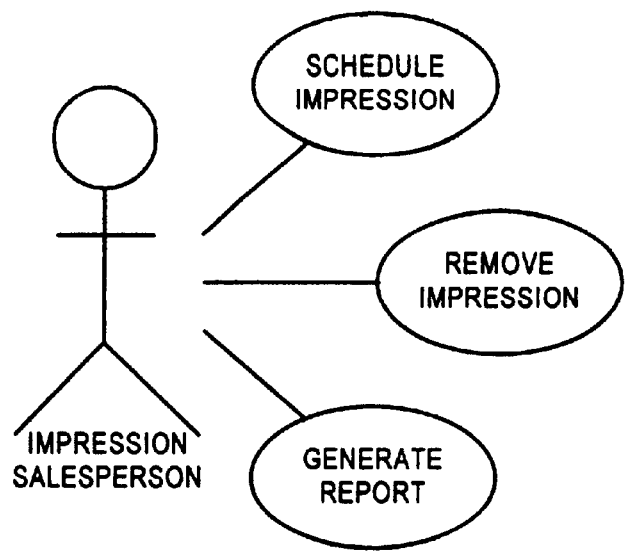

Referring to FIG. 18, the operations that need to be supported by a web host administrator including those shown below in Table 21.

TABLE 21

| Case | Description |
| --- | --- |
| Schedule Impression | Impressions run on rotation schedule and need to be assigned to a suitable rotation. They will tend to run between specified windows and/or account for a fixed number of impressions. |
| Remove Impression | After an impression runs, the property may need to be removed from the system. |
| Generate Report | Numerous reports will be required, including billing, individual customer banner logs, etc. |

A prime vehicle for search engine revenue is portal-hosted sites. A partnership manager, which is the final element of Table 14, is responsible for managing relationships and revenue generation for the company.

Figure 19:
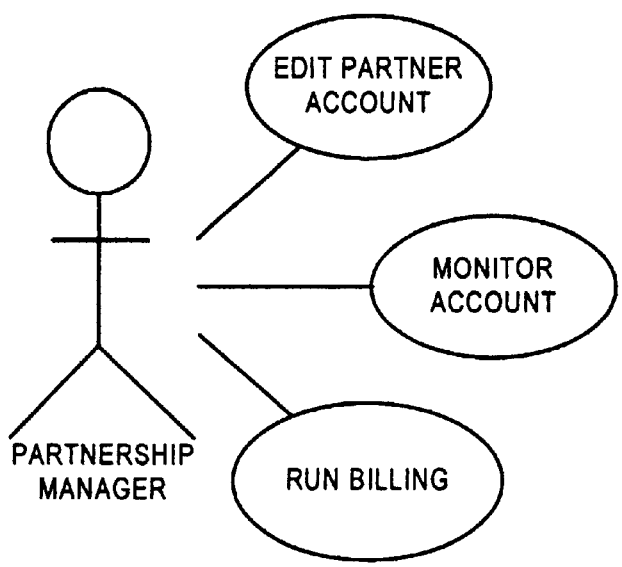

Referring to FIG. 19, the operations that need to be supported by a web administrator including those shown in Table 22.

TABLE 22

| Case | Description |
| --- | --- |
| Edit Partner Account | A partner's account will have to be created, revised or removed by the partnership manager. |
| Monitor Account | There is a need to be able to see the current status of an account, listing rotation schedules, bilabial timelines, etc. |
| Run Billing | The revenue generation part of the cycle may be run by another individual but relates directly to this role and is listed here for convenience. |

The server architecture of the system 200 will now be described. The server architecture provides a number of services which support the management and use of index information. The system is divided into several components which can be run on different machines, as needed, in a truly distributed architecture. The design must scale well and be self-healing wherever possible. To make this possible, Jini technology plays an important role in the architecture and services are exposed using that infrastructure. As components are brought online, they advertise that their existence to the local Jini lookup service. This information is automatically propagated to services who need access to other services and handshaking brings elements into the Jini community as they are announced. If non-critical parts of the system become unavailable, the system is able to compensate by distributing load to other machines hosting the necessary services.

A load balancer allows round-robin distribution of incoming traffic to web servers and the agent listener. The web servers provide user services like account registration, agent downloads, brochure management, and search capabilities. The AgentListener is a secure socket listener that manages agent connections. One of the components is a UserAccessService, which controls access to the BrochureService. Users can make queries on the search index. These are handled by the QueryDispatchManager, which delegates subqueries to appropriate IndexSegmentServices. Incoming information from agents is added to the MessageQueueService and popped off by the UpdateManagerService, which coordinates information in the BrochureService to ensure we have the latest updates. Agent-collected changes are added and/or removed in the MasterIndexService.

Figure 20:
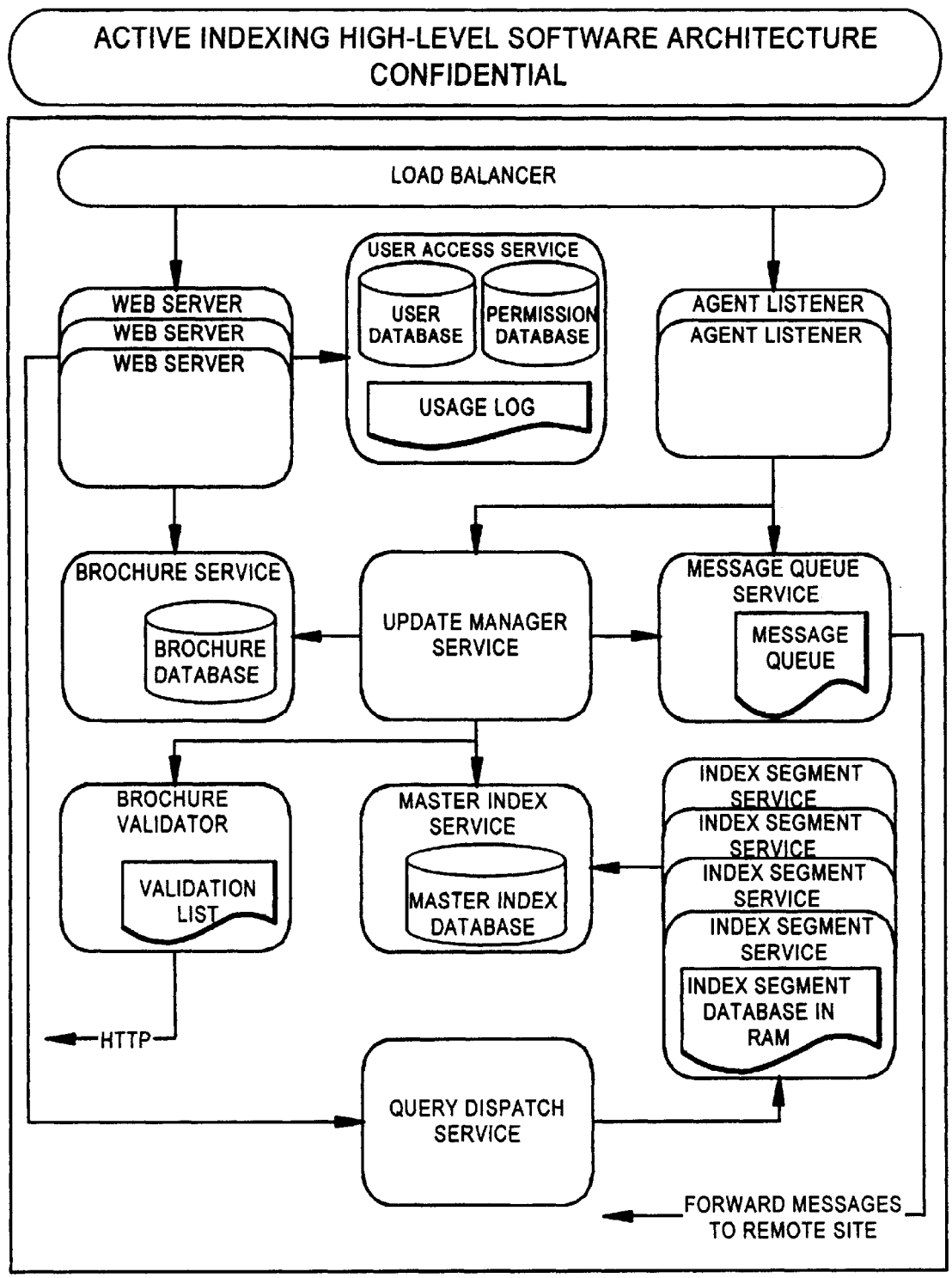

FIG. 20 shows request/response flow with the direction of arrows. The intent is to make clear who is asking for the execution of respective services. The web server, serving up static and dynamic content through Servlets and Java Server Pages, can communicate with the UserAccessService, BrochureService and the QueryDispatchService, but nothing else. The AgentListener can talk to the UpdateManagerService and the MessageQueueService only. An IndexSegmentService is able to initialize itself by asking from information from the MasterIndexService. Finally, the UpdateManagerService can talk to the BrochureService, MessageQueue service and the MasterIndexService. Its job is to keep the MasterIndexService up to date by processing incoming agent messages.

Because we are using Jini, the order in which services are brought up can determine which other services can operate, but does not restrict that order in any way. If an UpdateManagerService is unavailable, for example, the system will not process updates from the message queue, but processing will resume as soon as the UpdateManagerService is brought up again. As long as more than one instance of a given service is available, the system can discover those services automatically, as they are brought online. An IndexSegmentService is associated with a given IndexSegmentRange, which determines the prefix character range for the index content.

When an IndexSegmentService is brought online, it automatically becomes available to the QueryDispatchService. If one of these services are reinitialized periodically, the update will be completely transparent, so long as other IndexSegmentService cover the same IndexSegmentRange. This might be a single server or may be distributed arbitrarily across a number of IndexSegmentService instances. So long as a QueryDispatchService instance is available to the web servers, and sufficient IndexSegmentService instances are available to cover the full range of possible tokens, the system is capable of executing queries.

The data structures are critical to the correct operation of a complex system. The following description outlines the more important structures that represent the means by which subsystems may interact or store their information persistently in the system 200.

Persistent information is stored in a database or in temporary files on the system 200. The database tables relate to each other as shown in FIG. 21 in the following manner.

Figure 21:
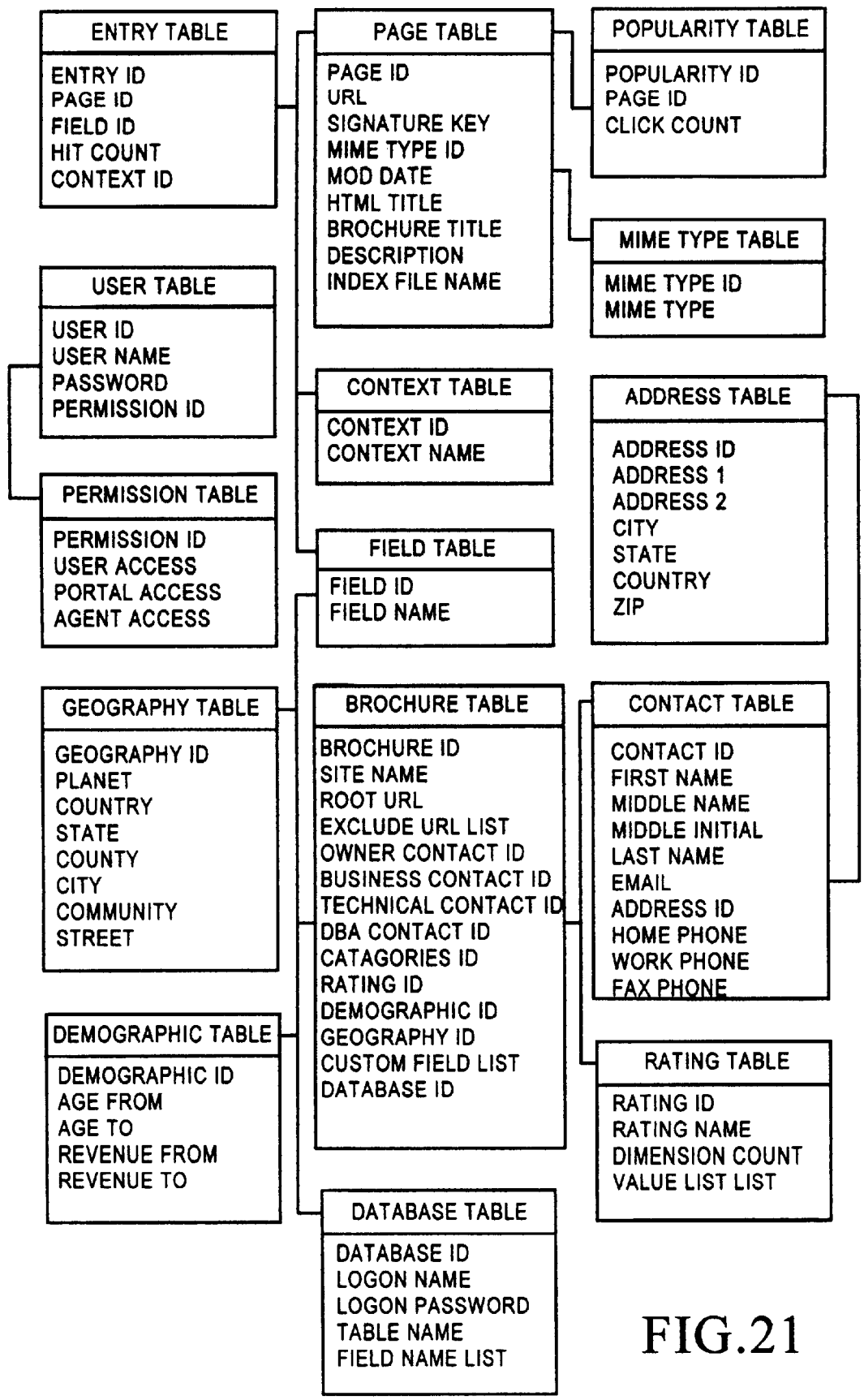

The following tables specify the data dictionary for each of the tables illustrated in FIG. 21. Referring to FIG. 21, the EntryTable stores individual entries in the index. Each entry is associated with a specific page, field and context as shown in Table 23. The EntryTable references the PageTable, FieldTable and ContextTable.

TABLE 23

| Field | Type | Key | Description |
|---|---|---|---|
| EntryID | LONG | Primary | This is the primary key for the EntryTable. It is an auto-increment integer value that is unique across the system. |
| PageID | LONG | Foreign | This is a foreign key pointing to the PageTable's primary key. |
| FieldID | LONG | Foreign | This is a foreign key pointing to the FieldTable's primary key. |
| HitCount | INT | None | An integer value recording the number of times the entry was encountered for the indicated page. |
| ContextID | LONG | Foreign | This is a foreign key pointing to the ContextTable's primary key. |

The PageTable of FIG. 21 stores information relating directly to pages that are indexed by the system, as shown below in Table 24. The PageTable does not reference any other tables.

TABLE 24

| Field | Type | Key | Description |
|---|---|---|---|
| PageID | LONG | Primary | This is the primary key for the PageTable. It is an auto-increment integer value that is unique across the system. |
| URL | VARCHAR | None | URL for the page on the hosting site. |
| SignatureKey | TEXT (20) | None | Signature key (MD5) for the indexed page. |
| MimeType | LONG | None | This is a foreign key pointing to the MimeTypeTable's primary key. |
| ModDate | DATE | None | Date the page was modified according to the operating system on which it was indexed. |
| HTMLTitle | VARCHAR | None | Title of the page, as defined in the HTML tags |
| BrochureTitle | VARCHAR | | Title of the page, as inherited from a brochure that includes the page in its processing. |
| Description | VARCHAR | None | Description of the page content. Either the first N words or a description placed explicitly in a brochure for this page. |
| IndexFileName | VARCHAR | None | File name for the index used by an agent on the local system. |

The FieldTable of FIG. 21 allows us to tokenize individual words, phrases or idioms that are indexed as shown below in Table 25 in more detail. The FieldTable does not reference any other tables.

TABLE 25

| Field | Type | Key | Description |
|---|---|---|---|
| FieldID | LONG | Primary | This is the primary key for the FieldTable. It is an auto-increment integer value that is unique across the system. |
| FieldName | TEXT (64) | None | This is the name associated with the primary key. |

The ContextTable of FIG. 21 defines possible contexts for indexing. These represent a short list such as HEAD, BODY and META for HTML pages. See Table 26. The ContextTable does not reference any other tables.

TABLE 26

| Field | Type | Key | Description |
|---|---|---|---|
| ContextID | LONG | Primary | This is the primary key for the ContextTable. It is an auto-increment integer value that is unique across the system. |
| ContextName | TEXT (32) | None | This is the name associated with the primary key. |

The PopularityTable of FIG. 21 stores statistical information about the popularity of given pages, based on how often the page was selected after a search. This information is used when the user chooses popularity-based ranking at result display time. The popularity table is shown in more detail in Table 27. The PopularityTable references the PageTable.

TABLE 27

| Field | Type | Key | Description |
|---|---|---|---|
| PopularityID | LONG | Primary | This is the primary key for the PopularityTable. It is an auto-increment integer value that is unique across the system. |
| PageID | LONG | Foreign | This is a foreign key pointing to the PageTable's primary key. |
| ClickCount | LONG | None | The number of times we have recorded users clicking through this page on the search engine site. |

The MimeTypeTable of FIG. 21 stores mime types which are frequently referenced and, therefore, normalized. See Table 28. The PageTable references the MimeTypeTable.

TABLE 28

| Field | Type | Key | Description |
|---|---|---|---|
| MimeTypeID | LONG | Primary | This is the primary key for the MimeTypeTable. It is an auto-increment integer value that is unique across the system. |
| MimeType | VARCHAR | None | This is a standard mime type descriptor in text form. |

The UserTable of FIG. 21 stores information about an authenticated user so that they can log on and off the system with varying degrees of permission. See Table 29 for more detailed description of the UserTable. The UserTable references the PermissionTable.

TABLE 29

| Field | Type | Key | Description |
|---|---|---|---|
| UserID | LONG | Primary | This is the primary key for the UserTable. It is an auto-increment integer value that is unique across the system. |
| UserName | TEXT | None | This is the user name use at logon time. |
| Password | TEXT | None | This is an MD5 hash of the user's password for runtime comparison. |
| PermissionID | LONG | Foreign | This is a foreign key pointing to the PermissionTable's primary key |

The PermissionTable of FIG. 21 is shown in more detail in Table 30. This table stores access permission variants, each variant then being associated with a user. The PermissionTable does not reference any other tables.

TABLE 30

| Field | Type | Key | Description |
|---|---|---|---|
| PermissionID | LONG | Primary | This is the primary key for the PermissionTable. It is an auto-increment integer value that is unique across the system. |
| UserAccess | BOOLEAN | None | A boolean flag that determines if the entity can access User-related functionality. |
| PortalAccess | BOOLEAN | None | A boolean flag that determines if the entity can access Portal-related functionality. |
| AgentAccess | BOOLEAN | Foreign | A boolean flag that determines if the entity can access Agent-related functionality. |

The BrochureTable of FIG. 21 stores information related to electronic brochures. The BrochureTable does reference the FieldTable, ContactTable, GeographyTable, DemographicTable, RatingTable, and DatabaseTables.

TABLE 31

| Field | Type | Key | Description |
|---|---|---|---|
| BrochureID | LONG | Primary | This is the primary key for the BrochureTable. It is an auto-increment integer value that is unique across the system. |
| SiteName | TEXT (64) | None | Name of site to be indexed. |
| RootURL | VARCHAR | None | URL for the root of the site structure to be indexed with this brochure. |
| ExcludeURLList | VARCHAR | None | List of URL within this structure to be excluded. |
| OwnerContactID | LONG | Foreign | This is a foreign key pointing to the ContactTable's primary key. |
| BusinessContactID | LONG | Foreign | This is a foreign key pointing to the ContactTable's primary key. |
| TechnicalContactID | LONG | Foreign | This is a foreign key pointing to the ContactTable's primary key. |
| DBAContactID | LONG | Foreign | This is a foreign key pointing to the ContactTable's primary key. |
| CategoriesID | LONG | Foreign | This is a foreign key pointing to the CategoriesTable's primary key. |
| RatingID | LONG | Foreign | This is a foreign key pointing to the RatingTable's primary key. |
| DemographicID | LONG | Foreign | This is a foreign key pointing to the DemographicTable's primary key. |
| GeographyID | LONG | Foreign | This is a foreign key pointing to the GeographyTable's primary key. |
| CustomFieldList | VARCHAR | None | List of user-defined fields to be indexed by the agent. |
| DatabaseID | LONG | Foreign | This is a foreign key pointing to the DatabaseTable's primary key, |

The ContactTable of FIG. 21 is shown in more detail in Table 32. This table stores personal contact information for various roles in the system. The ContactTable references the AddressTable.

TABLE 32

| Field | Type | Key | Description |
| --- | --- | --- | --- |
| ContactID | LONG | Primary | This is the primary key for the ContactTable. It is an auto-increment integer value that is unique across the system. |
| ContactFirstName | TEXT (64) | None | First name for this person. |
| ContactMiddleInitial | CHAR | None | Middle initial for this person. |
| ContactLastName | TEXT (64) | None | Last name for this person. |
| ContactEMail | TEXT (128) | None | Mail address for this person. |
| AddressID | LONG | Foreign | This is a foreign key pointing to the AddressTable's primary key |
| ContactHomePhone | PHONE | None | Home phone number for this person. |
| ContactWorkPhone | PHONE | None | Work phone number for this person. |
| ContactFaxPhone | PHONE | None | Fax phone number for this person. |

The GeographyTable of FIG. 21 is shown in more detail in Table 33. This table stores information related to the geographical target market for a given brochure. The GeographyTable does not reference any other tables.

TABLE 33

| Field | Type | Key | Description |
| --- | --- | --- | --- |
| GeographyID | LONG | Primary | This is the primary key for the GeographyTable. It is an auto-increment integer value that is unique across the system. |
| TargetCountry | TEXT (64) | None | Target market country. |
| TargetState | TEXT (64) | None | Target market state. |
| TargetCounty | TEXT (64) | None | Target market county. |
| TargetCity | TEXT (64) | None | Target market city. |
| TargetCommunity | TEXT (64) | None | Target market community name. |
| TargetStreet | TEXT (64) | None | Target market street. |

The DemographicTable of FIG. 21 is shown in more detail in Table 34. This table stores information related to the demographic target market for a given brochure. The DemographicTable does not reference any other tables.

TABLE 34

| Field | Type | Key | Description |
| --- | --- | --- | --- |
| DemographicID | LONG | Primary | This is the primary key for the DemographicTable. It is an auto-increment integer value that is unique cross the system. |
| AgeFrom | INT | None | Demographics minimum age. |
| AgeTo | INT | None | Demographics maximum age. |
| RevenueFrom | MONEY | None | Demographics minimum revenue. |
| RevenueTo | MONEY | None | Demographics maximum revenue. |

The RatingTable of FIG. 21 is shown in more detail in Table 35. The table stores information related to ratings associated with a given brochure. The RatingTable does not reference any other tables.

TABLE 35

| Field | Type | Key | Description |
| --- | --- | --- | --- |
| RatingID | LONG | Primary | This is the primary key for the RatingTable. It is an auto-increment integer value that is unique across the system. |
| RatingName | EXT (64) | None | Name of this ratings system. |
| DimensionCount | INT | None | Number of dimensions in the rating system. |
| ValueListList | VARCHAR | | List of values for each dimension. |

The DatabaseTable of FIG. 21 is shown in more detail in Table 36. The table stores database scanning information that allows the agent to index database content using JDBC. The DatabaseTable does not reference any other tables.

TABLE 36

| Field | Type | Key | Description |
| --- | --- | --- | --- |
| DatabaseID | LONG | Primary | This is the primary key for the DatabaseTable. It is an auto-increment integar value that is unique across the system. |
| LogonName | TEXT (64) | None | User name used to logon to the database system. |
| LogonPassword | TEXT (64) | None | Password used to logon to the database system. |
| TableName | TEXT (64) | None | Database table to be indexed. |
| FieldNameList | VARCHAR | None | List of field names to be indexed. |

The AddressTable of FIG. 21 is shown in more detail in Table 37. The table stores address information to avoid duplication in other tables. The AddressTable does not reference any other tables.

TABLE 37

| Field | Type | Key | Description |
| --- | --- | --- | --- |
| AddressID | LONG | Primary | This is the primary key for the AddressTable. It is an auto-increment integer value that is unique across the system. |
| Address1 | VARCHAR | None | First line of address. |
| Address2 | VARCHAR | None | Second line of address. |
| AddressCity | TEXT (64) | None | City in which the address is located. |
| AddressState | VARCHAR | None | State in which the address is located. |
| AddressCountry | TEXT (64) | None | Country in which the address is located. |
| AddressZIP | TEXT (32) | None | ZIP code or other postal code for the address. |

The system 200 includes a number of critical algorithms, and the more important ones are now outlined below. These and other required algorithms will be understood by those skilled in the art.

The QueryDispatchService of FIG. 20 uses a simple algorithm to optimize for speed and minimize traffic across the network. The Algorithm includes the following steps:
  1. Parse a Query into separate elements, based on standard boolean operators.
  2. For each element, get a hit count from an appropriate IndexSegmentServer.
  3. From low count, moving up, get a PageID list from each IndexSegmentServer.

4. By standard boolean order precedence, create the UNION or INTERSECTION of unique PageID hits.

5. When the user decides to view the results, sort the result set by ranking algorithm after pulling each PageID record for the result set.

Figure 22:
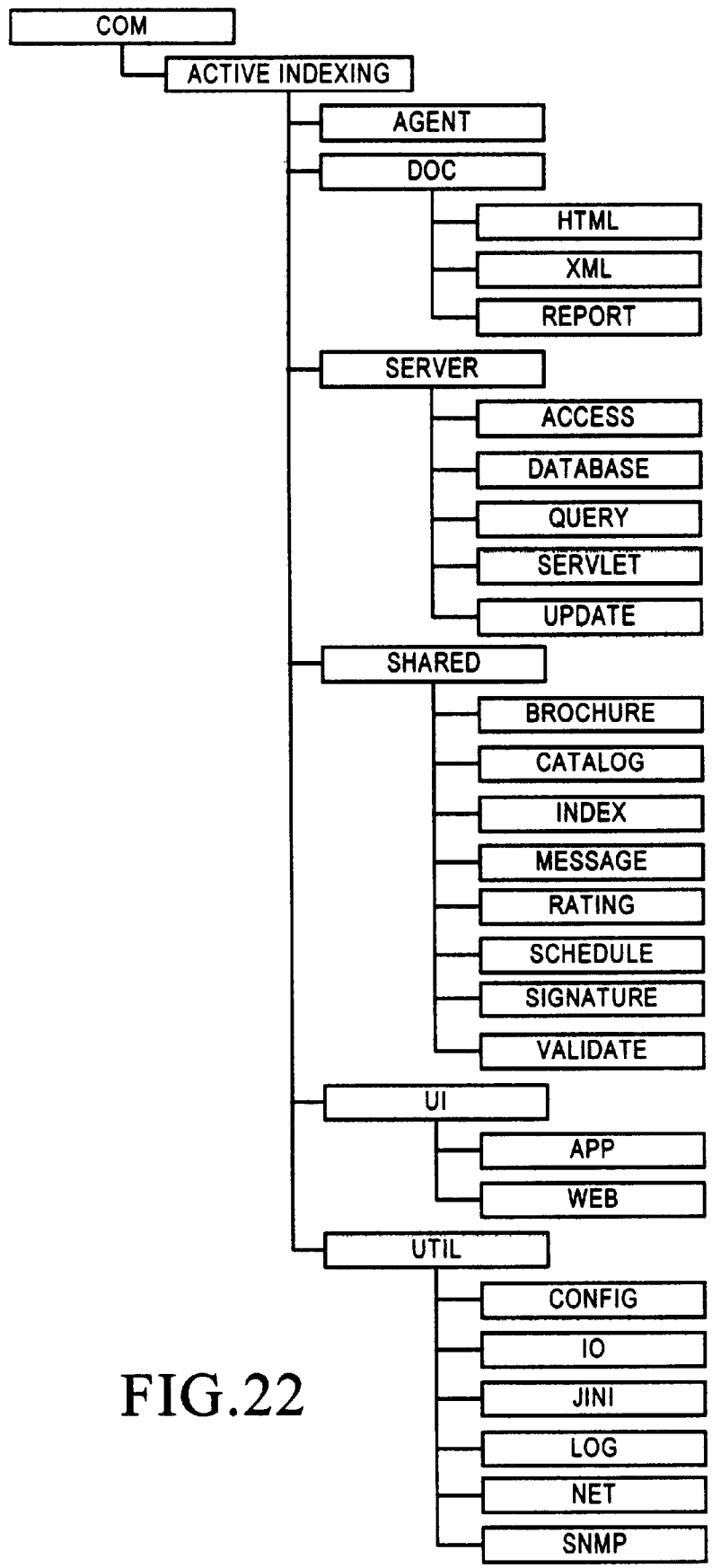

The packages presented in FIG. 22 are directly associated with services, components, or conceptual groupings in the system 200. Major services are represented by their own package, with supporting classes included. Components are given separate packages where applicable. Some services and components accomplish the same tasks and are, naturally, in the same package. Supporting classes, such as database, networking and servlets are grouped into conceptual packages for clarity.

Note that the packages are currently presented in alphabetical order, but may be reorganized in a later revision to reflect the three tiered nature of the architecture of the system 200. Low level utility packages should be listed first, followed by component/manager packages, Jini service packages, and finally independent applications.

Table 38 below illustrates the packages arranged alphabetically for reference.

TABLE 38

| Name | Package | Description |
| --- | --- | --- |
| Access | com.activeindexing.server.access | Contains classes related to the UserAccessService. |
| Agent | com.activeindexing.agent | Contains the agent application logical control classes. |
| Brochure | com.activeindexing.shared.brochure | Contains classes related to brochure handling. |
| Catalog | com.activeindexing.shared.catalog | Contains classes related to the agent CatalogManager. |
| Config | con.activeindexing.util.config | Contains classes related to |
| Database | com.activeindexing.server.database | Contains classes related to database access and record handling. |
| HTML | com.activeindexing.doc.html | Contains classes related HTML tokenizing and parsing. |
| Index | com.activeindexing.shared.index package | Contains the IndexSegmentService and related index support classes. |
| Jini | com.activeindexing.util.jini | Contains classes related to |
| I/O | com.activeindexing.io package | Contains utility classes related to input/output operations. |
| Log | com.activeindexing.log | Contains classes related to the log files. |
| Message | com.activeindexing.shared.message | Contains classes related to the MessageQueueService |
| Net | com.activeindexing.net | Contains utility classes related to networking. |
| Query | com.activeindexing.server.guery | Contains classes related to the QueryDispatchService. |
| Rating | com.activeindexing.shared.rating | Contains classes related to system configuration file handling. |
| Report | com.activeindexing.doc.report | Contains classes related to report documents. |
| Schedule | com.activeindexing.shared,schedule | Contains classes related to the ScheduleManager |
| Servlet | com.activeindexing.server.servlet | Contains classes related to Servlets and web servers. |
| Signature | com.activeindexing.shared.signature | Contains classes related to the file signatures and hash calculations. |
| Snmp | com.activeindexing.util.snmp | Contains classes related to SNMP (Simple Network Management Protocol). |
| Update | com.activeindexing.server.update | Contains classes related to the UpdateManagerService. |
| Validate | com.activeindexing.shared.validate | Contains classes related to data validation. |

TABLE 38-continued

| Name | Package | Description |
| --- | --- | --- |
| XML | com.activeindexing.doc.xml | Contains classes designed to help work with the DOM (Document Object Model) and SAX interfaces |

The packages shown in Table 38 separate functionality groups into logical divisions of labor. A more complete description of each package follows. In each description, we include a UML class diagram and a table describing each class in more detail. The final, detailed class specification may use the JavaDoc approach. A graphical representation of the packages in the system 200 is shown in FIG. 23.

Figure 23:
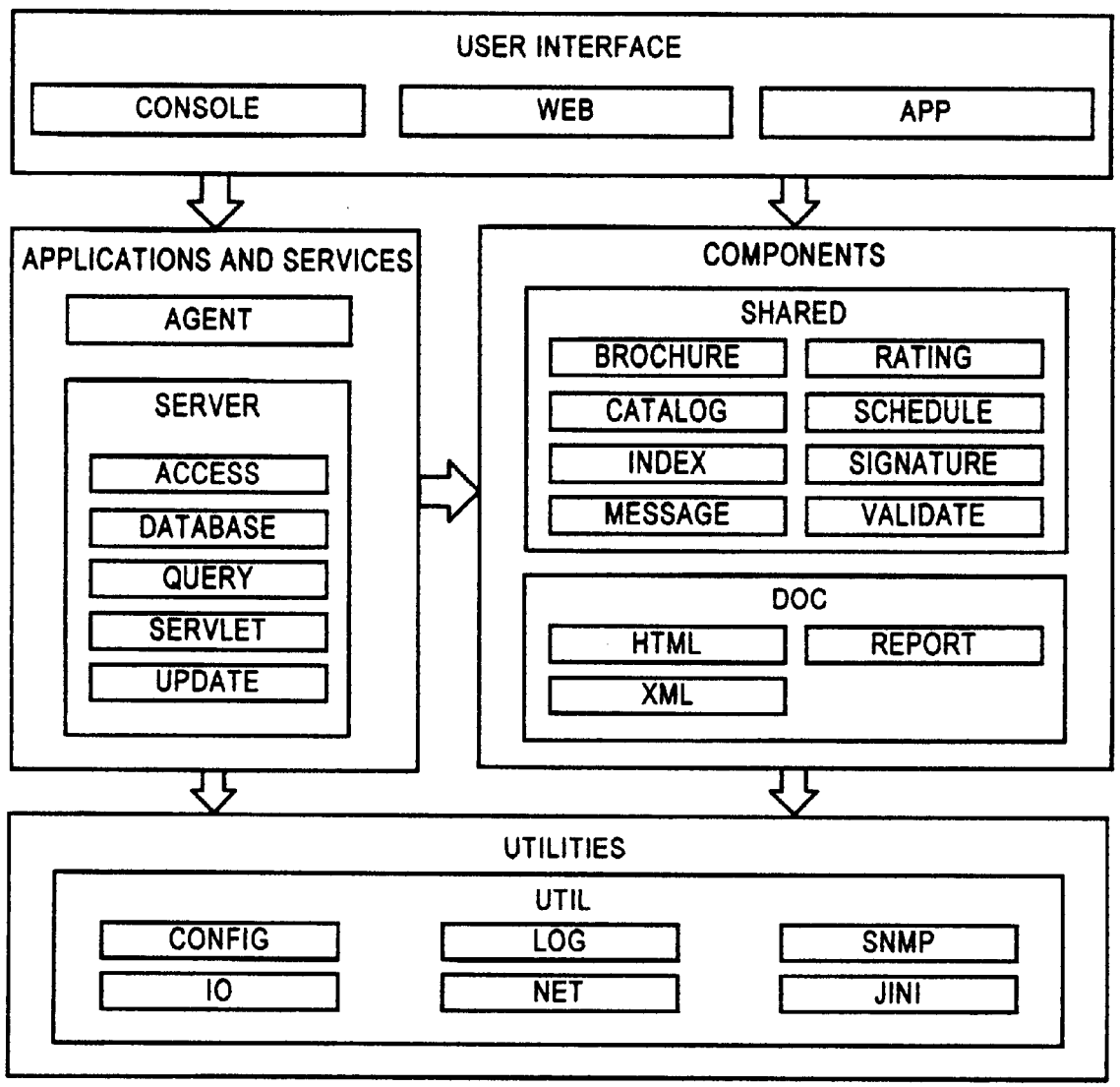

In FIG. 23, packages are categorized in three ways. They are either low-level utility packages, components, applications and services or user interface elements. Support packages, like the database, catalog, html and xml packages, provide a foundation for other program functionality. A few of the services, the message and index services, for example, are grouped as shared because several of their classes provide functional capabilities between both the agent and server elements. The brochure package is also shared. The application and service level packages construct the agent and the server-side Jini services. Taken together, the classes in these packages function together as a complete, integrated, distributable system.

Referring to FIG. 23 and Table 38, user interface elements are grouped into the following packages. The com.activeindexing.ui.app package contains classes related to console-based interfaces.

The com.activeindexing.ui.app package contains classes related to web-based user interfaces and contains classes related to application user interfaces.

Figure 24:
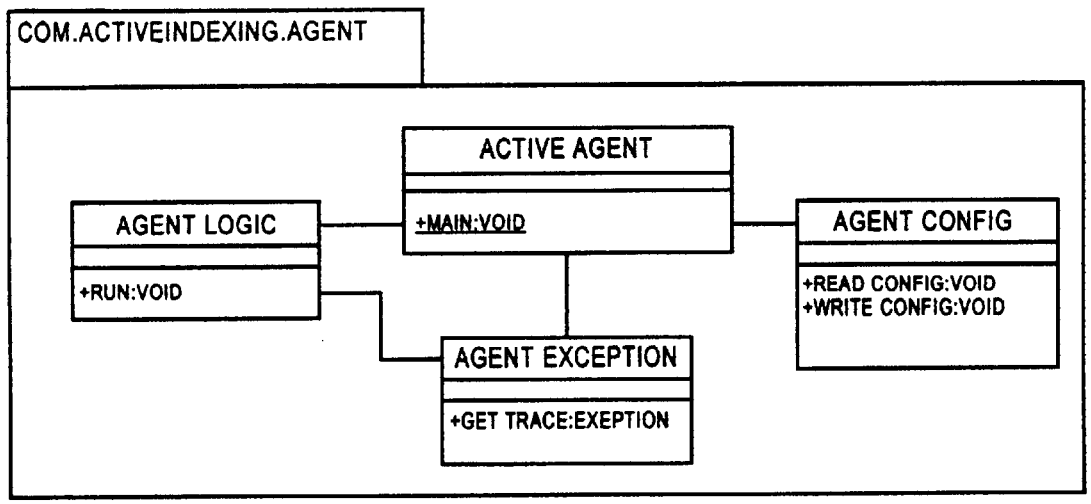

The agent 204 has its own package as shown in FIG. 24. The agent 204 has its own package primarily for distribution reasons.

The agent package, com.activeindexing.agent contains classes related to the host agent.

The following Table 39 describes each of these classes for the agent 204 package in more detail.

TABLE 39

| Class | Description |
| --- | --- |
| ActiveAgent | This is the main application entry point for the ActiveIndexing Agent. The main clause may be called by an native executable as in the example provided in the Java Development Kit. |
| AgentLogic | This is where the agent logic resides and can be modified. Subclasses can be used to provide alternate flow, so individual functions delegated to other packages must be given their own protected methods to support this. |
| AgentConfig | This is an abstraction for the agent configuration file that provides element validation. |
| AgentException | Any exceptions thrown by the agent will be wrapped by this class. |

Referring to FIG. 23, the collection of server of packages provides high level server-side Jini services to the system.

Figure 25:
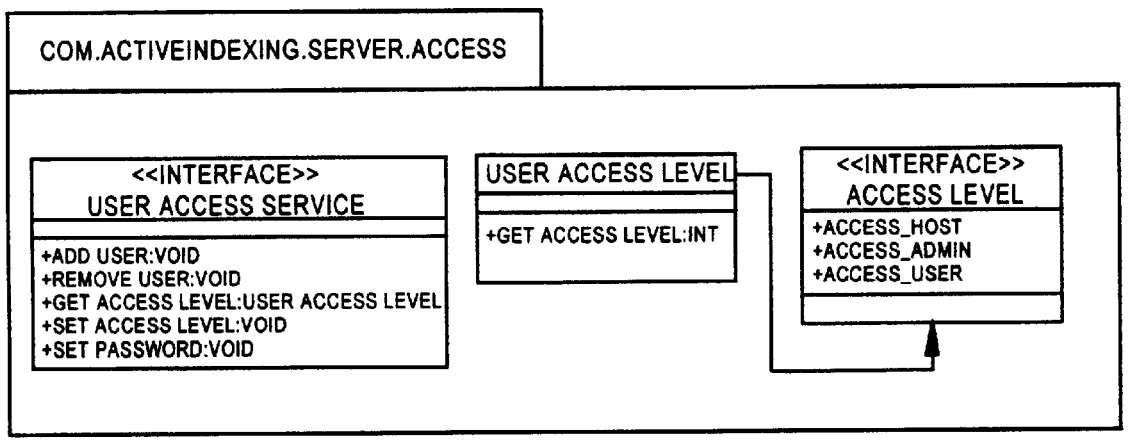

FIG. 25 illustrates the com.activeindexing.server.access package contains, which classes related to the UserAccessService.

The following Table 40 describes each of the classes of FIG. 25 in more detail.

TABLE 40

| Class | Description |
|---|---|
| UserAccessService | Provides a mechanism for general user access management. |
| UserAccessLevel | Encapsulates a user's access level, which may be a collection bit values from the AccessLevel interface. |
| AccessLevel | Bit values for access declared as integers in an interface for inclusion in other classes. |

Figure 26:
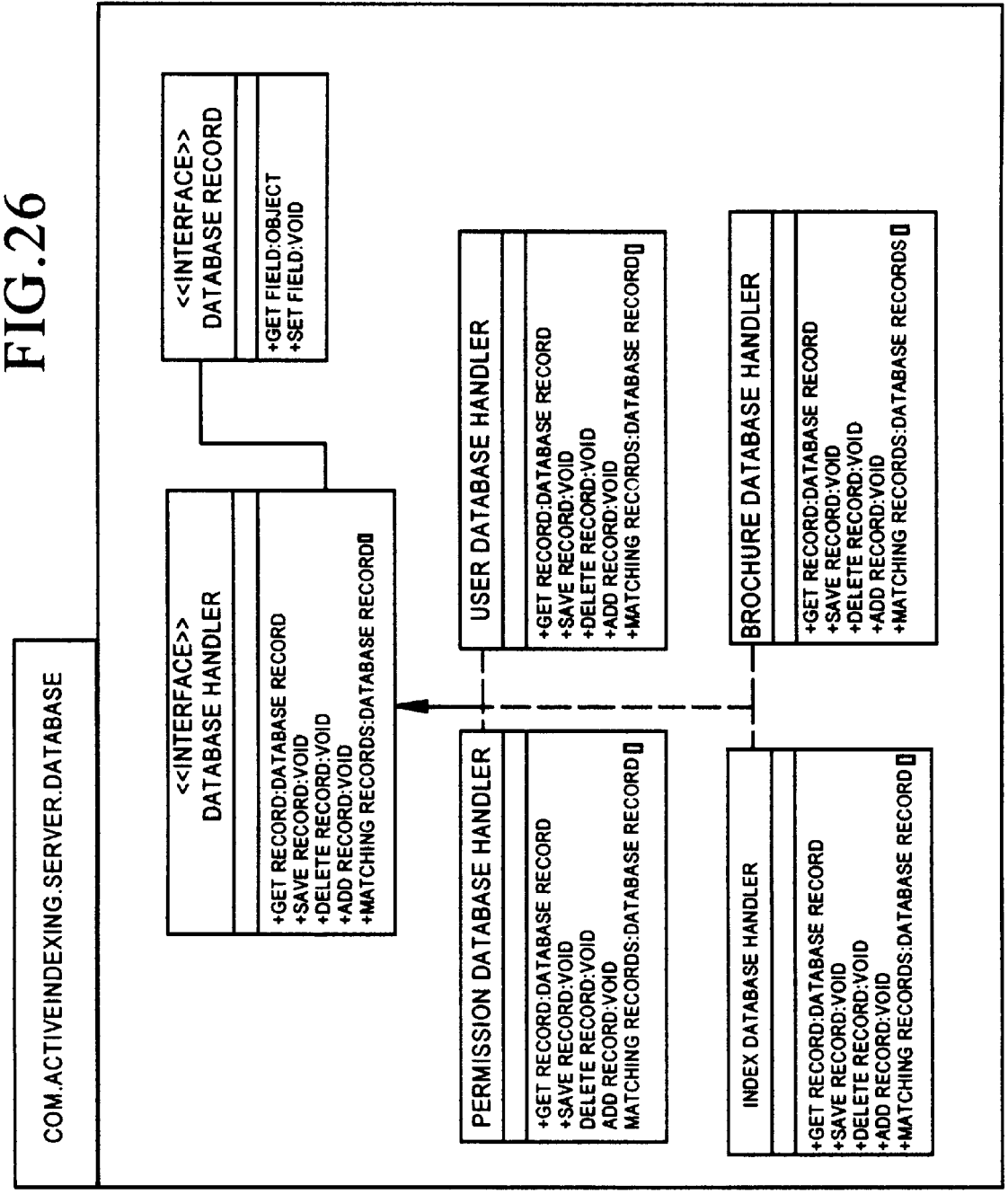

The com.activeindexing.server.database package of FIG. 23 contains classes related to database access and record handling and is shown in more detail in FIG. 26.

The following Table 41 describes each of the classes in FIG. 26 in more detail.

TABLE 41

| Class | Description |
|---|---|
| DatabaseRecord | This is an abstraction for representing database records in object form. It is designed as a generic container similar to a ResultSet but intended to store a single record at a time. |
| DatabaseHandler | This interface defines a database handler role which is responsible for accessing individual records in a database. Records can be read, save and deleted, added and found. |
| PermissionDatabaseHandler | Concrete implementation of the DatabaseHandler interface to support permission records. |
| UserDatabaseHandler | Concrete implementation of the DatabaseHandler interface to support user records. |
| IndexDatabaseHandler | Concrete implementation of the DatabaseHandler interface to support index records. |
| BrochureDatabaseHandler | Concrete implementation of the DatabaseHandler interface to support brochure records. |

Figure 27:
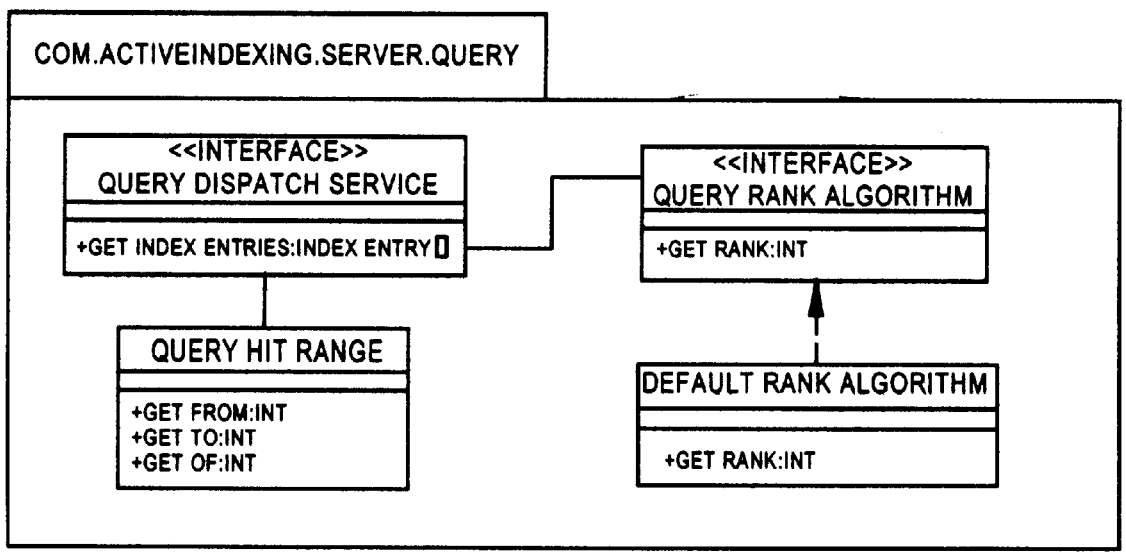

Referring to FIG. 23, the com.activeindexing.server.query package contains classes related to the QueryDispatchService, as shown in more detail in FIG. 27.

The following Table 42 describes each of the classes of FIG. 27 in more detail.

TABLE 42

| Class | Description |
|---|---|
| QueryDispatchService | This Jini service provides query dispatch and result ranking behavior. The dispatching of a query involves deciding which index segment service will handle the request. Results are correlated and sorted by ranking. |
| QueryHitRange | Page presentations are typically done in sets of 10 to 20 results. The output from a single request does not required more than a range of outputs, so this class allows us to process page navigation-style requests for result sets. |
| QueryRankAlgorithm | This interface defines the methods that must be implemented by any ranking algorithm in the system. |
| DefaultRankAlgorithm | This is the default ranking algorithm. |

The com.activeindexing.server.servlet package contains classes related to Servlets and web servers, as shown in more detail in FIG. 27.

The following Table 43 describes each of the classes of FIG. 27 in more detail.

TABLE 43

| Class | Description |
|---|---|
| UserManagerServlet | This servlets manages user records in the database, providing an HTML interface for reading, editing and saving records. |
| BrochureManagerServlet | This servlets manages brochure records in the database, providing an HTML interface for reading, editing and saving records. |
| QueryManagerServlet | This servlets manages queries and results sets, providing an interface for searching and viewing search results. |
| BannerManagerServlet | This servlets manages banner advertising, rotation schedules and impression logging. |
| AdministrationServlet | This servlets provides an interface for remote administration. |

Figure 28:
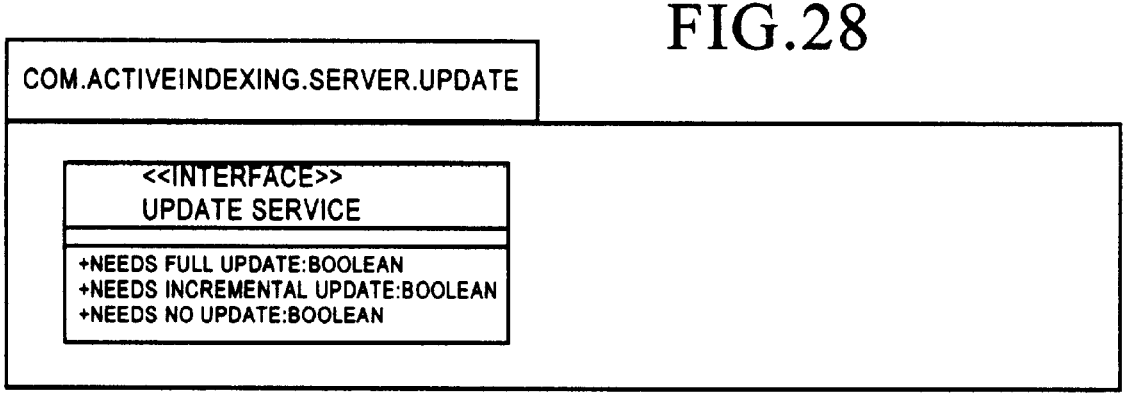

The com.activeindexing.server.update package of FIG. 23 contains classes related to the update manager, as shown in more detail in FIG. 28.

The following Table 44 describes each of the classes of FIG. 28 in more detail.

TABLE 44

| Class | Description |
|---|---|
| UpdateService | Jini service class for handling the update subsystem. |

Referring to FIG. 23, the shared package contains elements which can act as components within the system, used by one or more services or applications.

Figure 29:
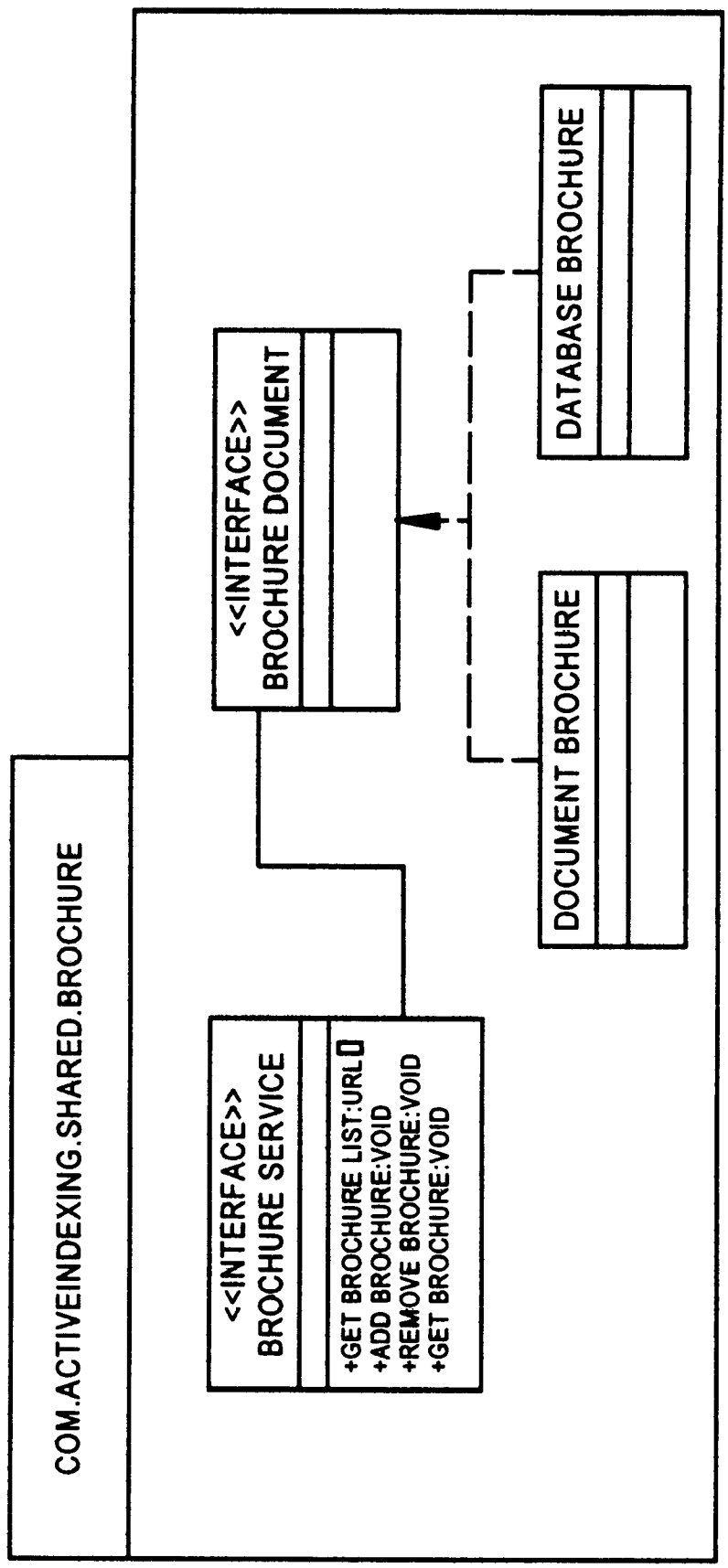

The com.activeindexing.shared.brochure package is shown in more detail in FIG. 29 and contains classes related to Brochure handling.

The following Table 45 describes each of the classes of FIG. 29 in more detail.

TABLE 45

| Class | Description |
|---|---|
| BrochureService | This is an implementation of a service that provides access to brochures on the server. It is used by the servlets to provide brochure management services and by the update manager to verify content. |
| BrochureDocument | A brochure document is an XML representation of a brochure. |
| DocumentBrochure | A document brochure applies to html documents. |
| DatabaseBrochure | A database brochure applies to databases on the target machine. |

Figure 30:
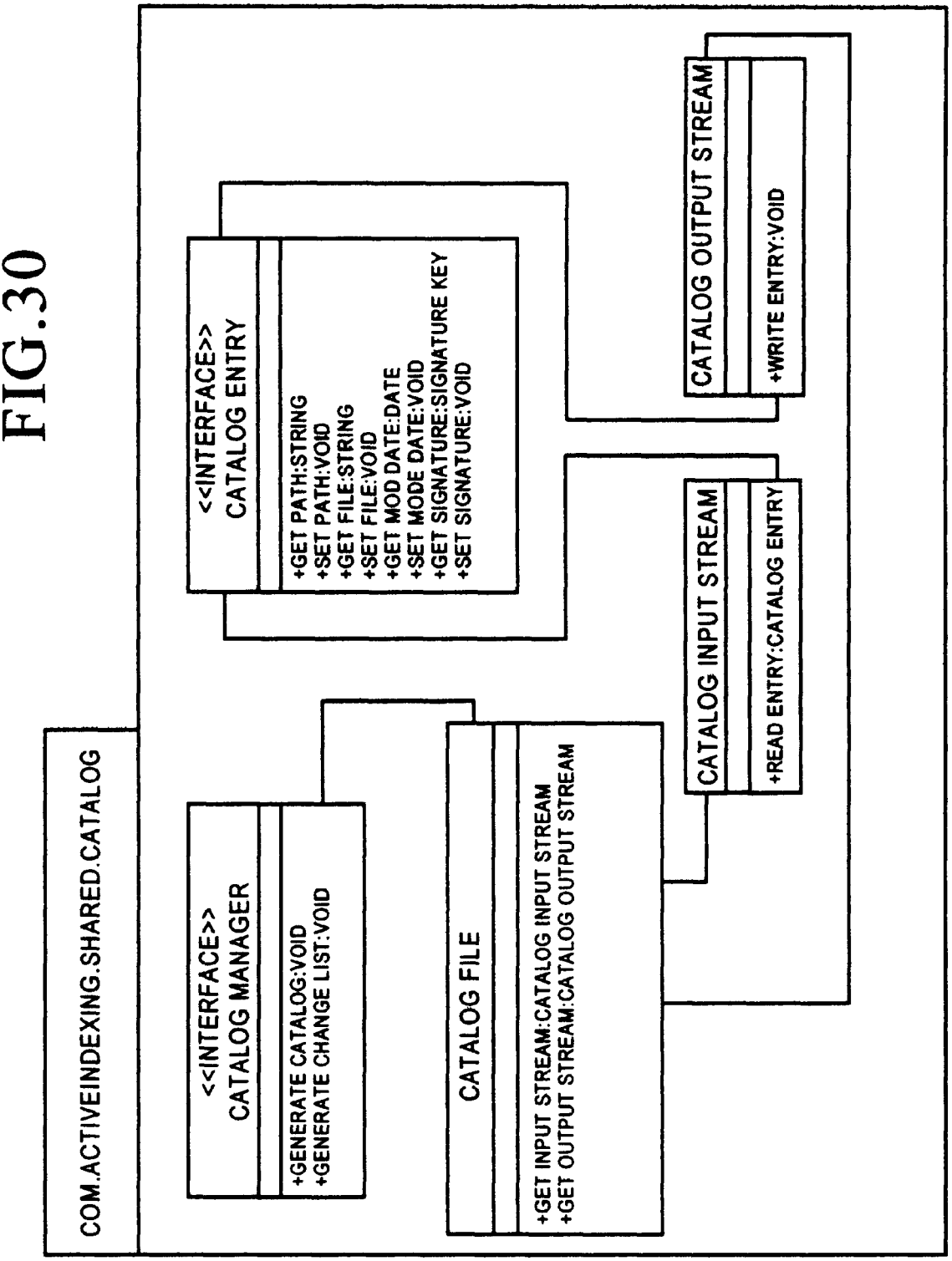

The com.activeindexing.shared.catalog package of FIG. 23 contains classes related to the agent CatalogManager, and is shown in more detail in FIG. 30.

The following Table 46 describes each of the classes of FIG. 30 in more detail.

TABLE 46

| Class | Description |
|---|---|
| CatalogManager | This interface defines what it means to be a file catalog manager. This role is responsible for handling high-level file history-based change detection. Several catalog files representing previous and current file system traversals, as well as addition, deletion and modification lists are handled by this class. |

TABLE 46-continued

| Class | Description |
| --- | --- |
| CatalogFile | This class is an abstraction that allows easier manipulation of catalog files of the different types listed above. Each catalog file is associated with input and output streams, as defined below. |
| CatalogEntry | A catalog entry stores file information, including path, file name, modification date, and signature for comparison and reporting reasons. |
| CatalogInputStream | This is an input stream that makes it possible to easily read CatalogEntry objects. |
| CatalogOutputStream | This is an output stream that makes it possible to easily write CatalogEntry objects. |

Figure 31:
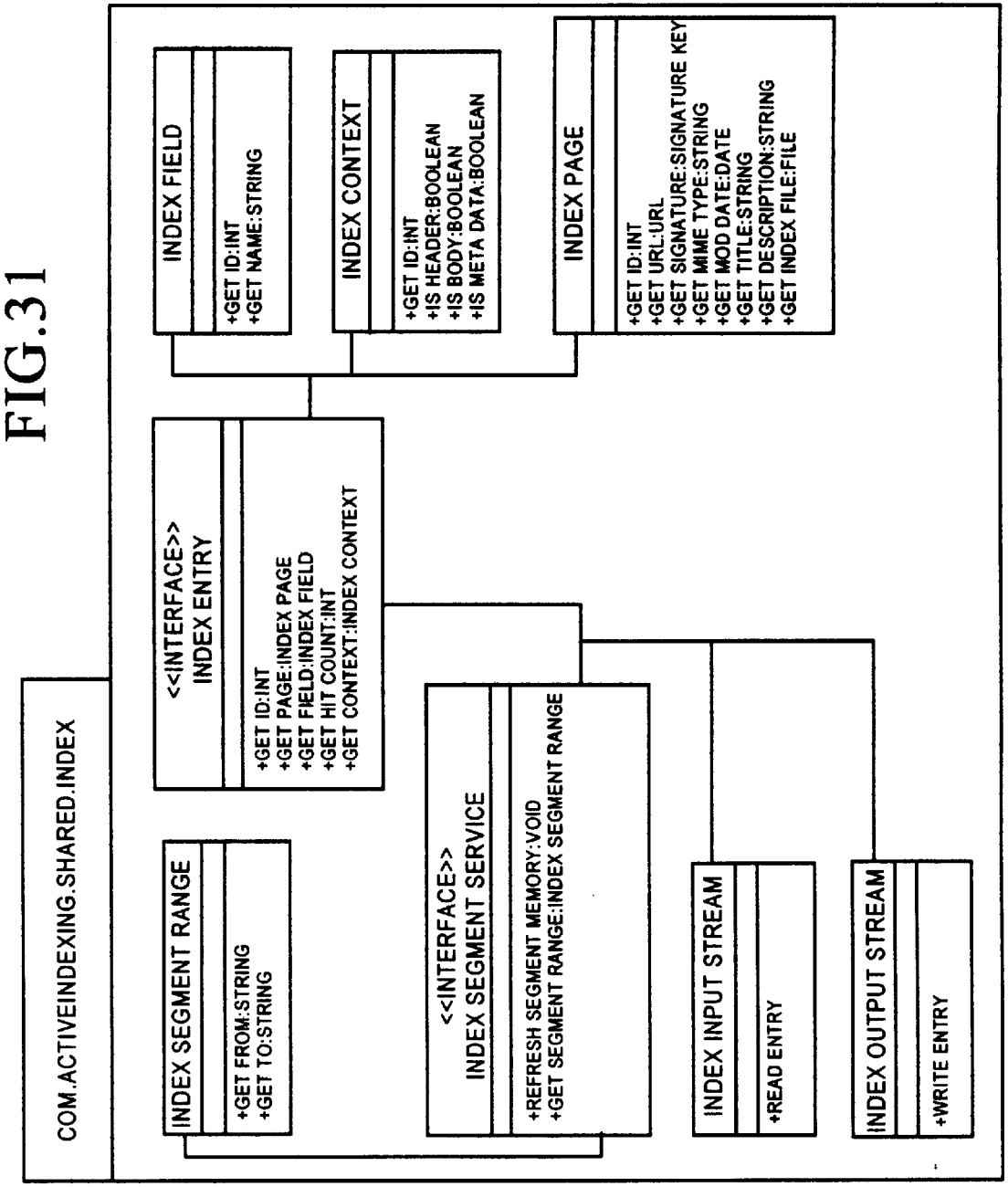

The com.activeindexing.shared.index package of FIG. 23 contains classes related to indexing and includes the IndexSegmentService as shown in more detail in FIG. 31.

The following Table 47 describes each of the classes of FIG. 31 in more detail.

TABLE 47

| Class | Description |
| --- | --- |
| IndexSegmentService | An index segment is a pieces of the master index constrained to a range of entries for performance optimization. A range is defined by the IndexSegmentRange class and the index is kept in memory. This class exposes a Jini service for dynamic availability reasons. |
| IndexEntry | An index entry contains an identifier, reference to a content page, field reference, hit count and context flags. |
| IndexField | A field entry contains only an identifier and text name. It is used for database normalization by the index entries. |
| IndexPage | A page reference contains a document identifier, URL to the indexed page, a signature key, mime type, modification date, title, description and index file reference. |
| IndexContext | A context defines a position where the index entry was found, either i the title, meta information or in the body of the document. |
| IndexInputStream | This stream provides utility functionality to make it easier to read index objects from an input device. |
| IndexOutputStream | This stream provides utility functionality to make it easier to write index objects to an output device. |
| IndexSegmentRange | This class encapsulates a segment range, which is defined by two string values representing the from and to tokens. |

Figure 32:
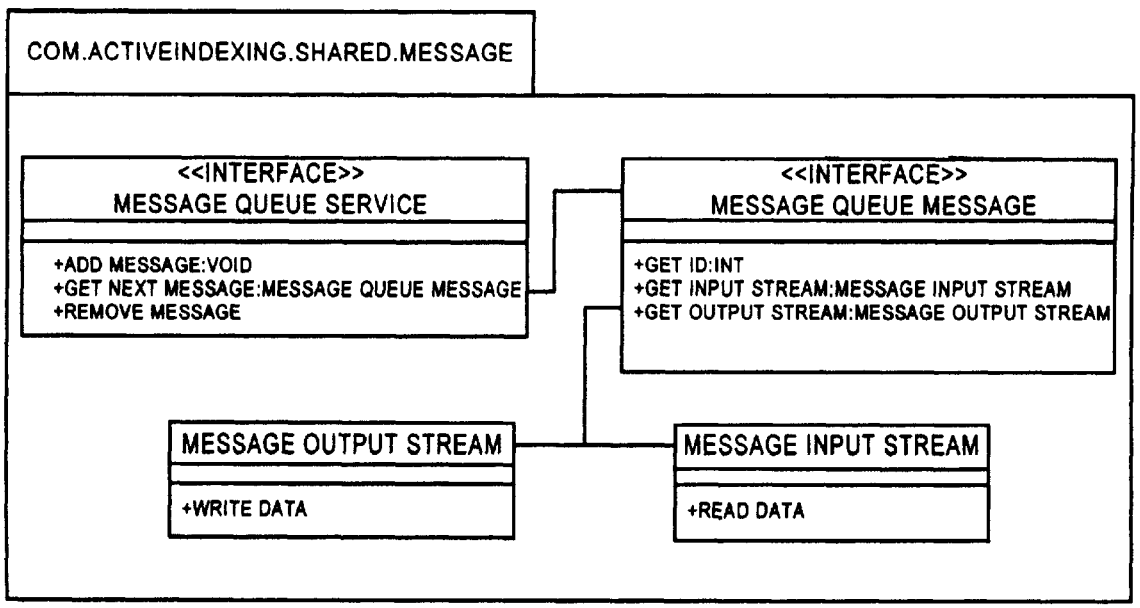

The com.activeindexing.shared.message package of FIG. 23 contains classes related to the MessageQueueServiceas shown in more detail in FIG. 32.

The following Table 48 describes each of the classes of FIG. 32 in more detail.

TABLE 48

| Class | Description |
| --- | --- |
| MessageQueueService | This interface defines what it means to implement a message queue service. It is presented to the outside world as a Jini service. |
| MessageQueueMessage | This class represents a message placed in the message queue. |
| MessageInputStream | Because messages may contain more information that should be moved around in a single chunk, a message object contains a reference to the message content file, which is accessible through this input stream. |

TABLE 48-continued

| Class | Description |
| --- | --- |
| MessageOutputStream | This class provides output access to the message content file. |

Figure 33:
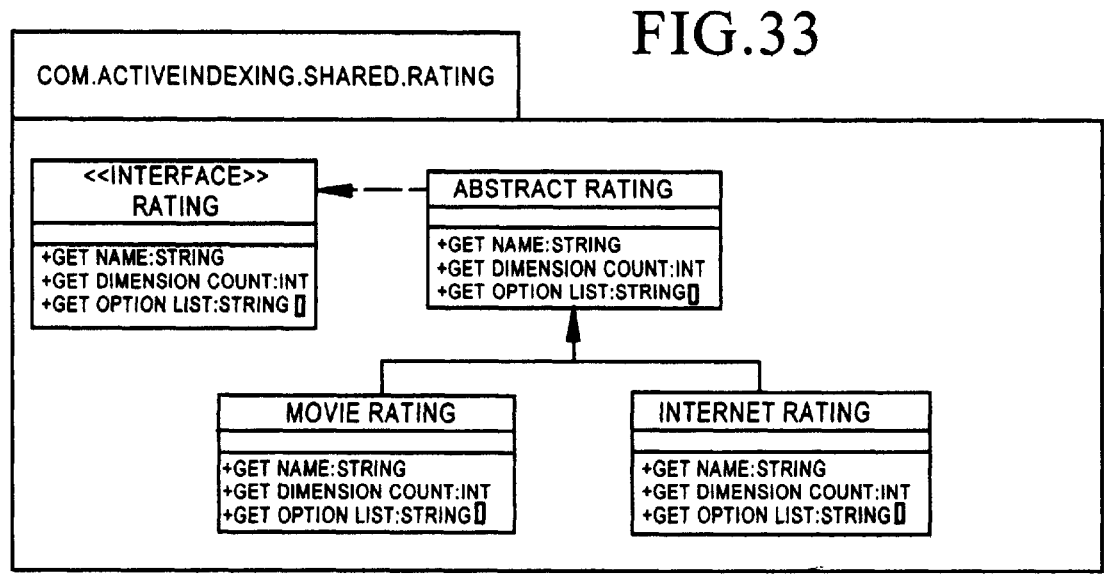

The com.activeindexing.shared.rating package of FIG. 23 contains classes related to rating systems, as shown in more detail in FIG. 33.

The following Table 49 describes each of the classes of FIG. 33 in more detail.

TABLE 49

| Class | Description |
| --- | --- |
| Rating | Interface defining methods required to operate as a rating class. |
| AbstractRating | Abstract class which implements common behavior and internal methods useful in implementing rating classes. |
| MovieRating | Movie rating class offers two option dimensions (G, PG, R, X . . . and Sex, Violence . . . ). The set of options is retrieved using the indexed getOptionList method. |
| InternetRating | This class is a place-holder for future ratings systems. |

Figure 34:
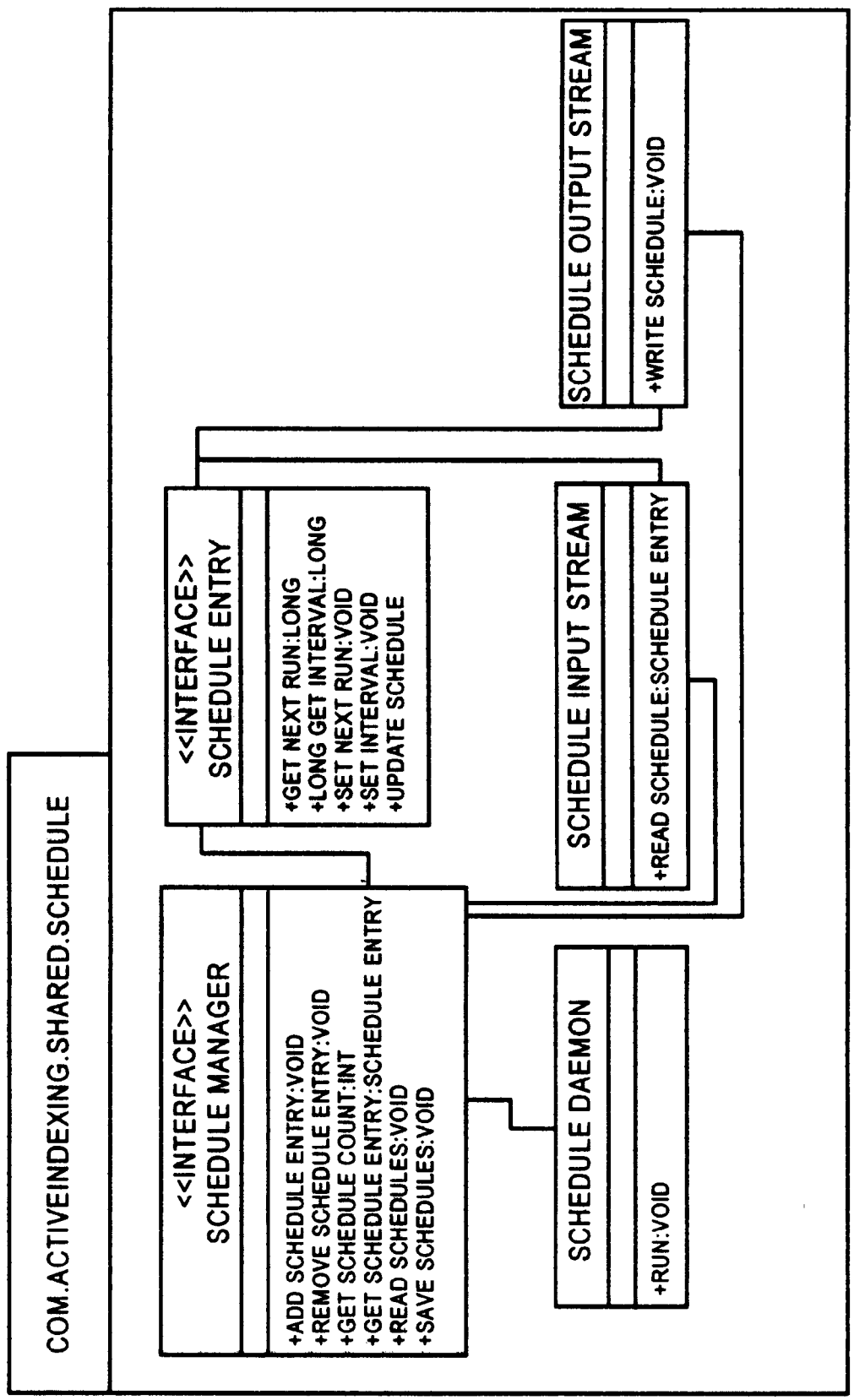

The com.activeindexing.shared.schedule package of FIG. 23 contains classes related to the ScheduleManager, as shown in FIG. 34 in more detail.

The following Table 50 describes each of the classes of FIG. 34 in more detail.

TABLE 50

| Class | Description |
| --- | --- |
| ScheduleManager | This class implements a scheduling system and provides support for multiple schedules and triggers. |
| ScheduleDaemon | This is the daemon thread that watches for scheduled events. |
| ScheduleEntry | A schedule entry contains a next run time and an interval for subsequent triggers. The daemon can check for the next run time and act if the time is surpassed. The schedule can then be updated, based on the interval requested, for subsequent runs. |
| ScheduleInputStream | This stream facilities reading schedule entries from an input device. |
| ScheduleOutputStream | This stream facilities writing schedule entries to an output device. |

The com.activeindexing.shared.signature package of FIG. 23 contains classes related to the file signatures and hash calculations, as shown in more detail in FIG. 34.

The following Table 51 describes each of the classes of FIG. 34 in more detail.

TABLE 51

| Class | Description |
| --- | --- |
| SignatureKey | This is an interface that defines what it means to be a signature key. The design maximizes flexibility, allowing the system to support pluggable signature key algorithms. |
| MD5SignatureKey | This is a concrete implementation of the SignatureKey interface that supports the MD5 Message Digest 5) algorithm. |
| SHASignatureKey | This is a concrete implementation of the SignatureKey interface that supports the SHA (Secure hash Algorithm) algorithm. |

TABLE 51-continued

| Class | Description |
| --- | --- |
| SignatureCalculator | This is an interface that defines what it means to calculate a signature for specified algorithms. The interface is designed to support pluggable algorithms and alternative implementations which may have different performance characteristics. |
| MD5SignatureCalculator | This is a concrete implementation if the SignatureCalculator interface with support for the MD5 algorithm. |
| SHASignatureCalculator | This is a concrete implementation if the SignatureCalculator interface with support for the SHA algorithm. |

Figure 35:
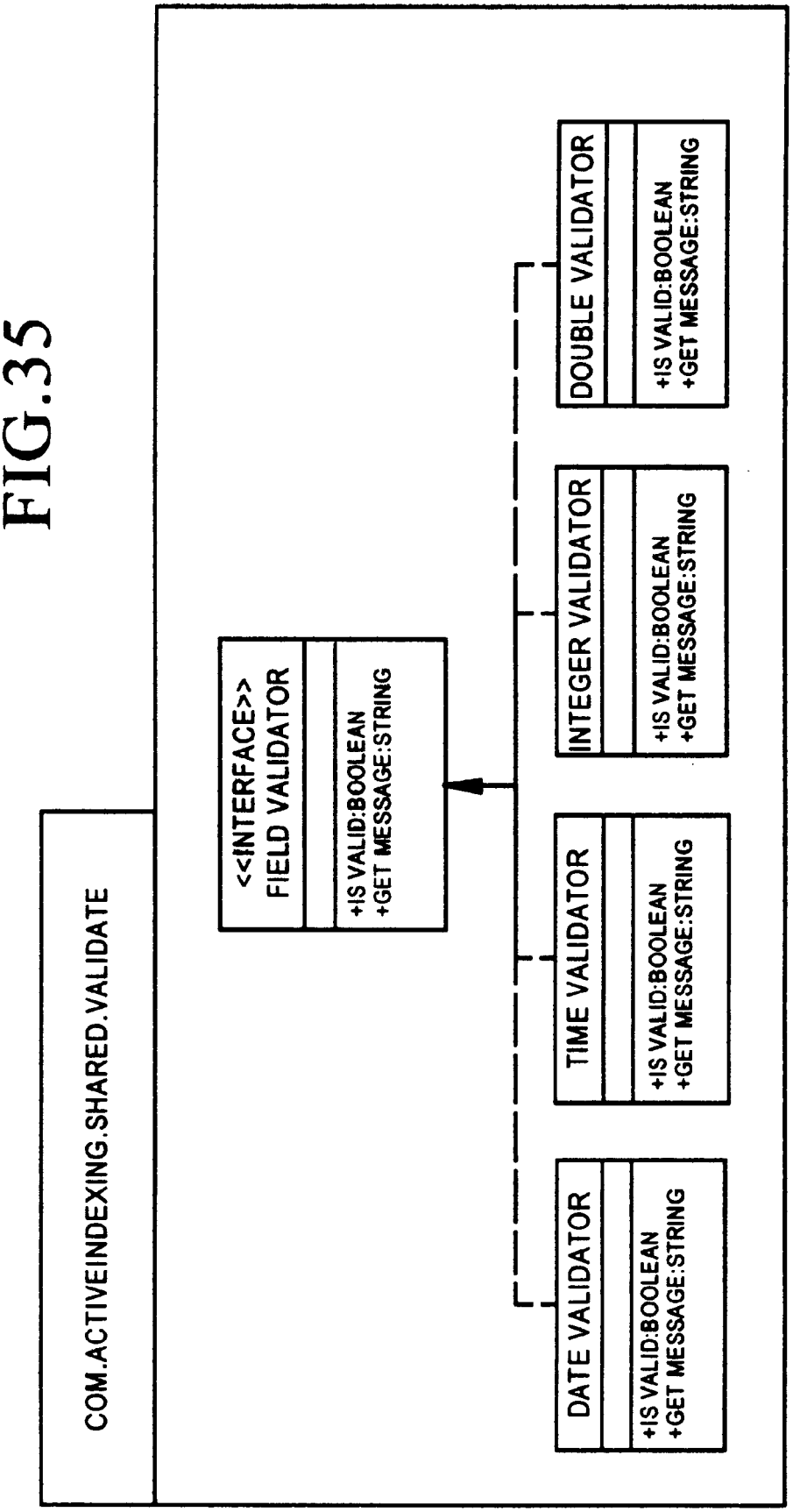

The com.activeindexing.shared.validate package of FIG. 23 contains classes related to field validation, as shown in more detail in FIG. 35.

The following Table 52 describes each of the classes of FIG. 35 in more detail.

TABLE 52

| Class | Description |
| --- | --- |
| FieldValidator | This is an interface that defines what it means to be a field validator. |
| DateValidator | This is a concrete implementation of the FieldValidator interface that validates date data. |
| TimeValidator | This is a concrete implementation of the FieldValidator interface that validates time data. |
| IntegerValidator | This is a concrete implementation of the FieldValidator interface that validates integer data. |
| DoubleValidator | This is a concrete implementation of the FieldValidator interface that validates double data. |

Figure 36:
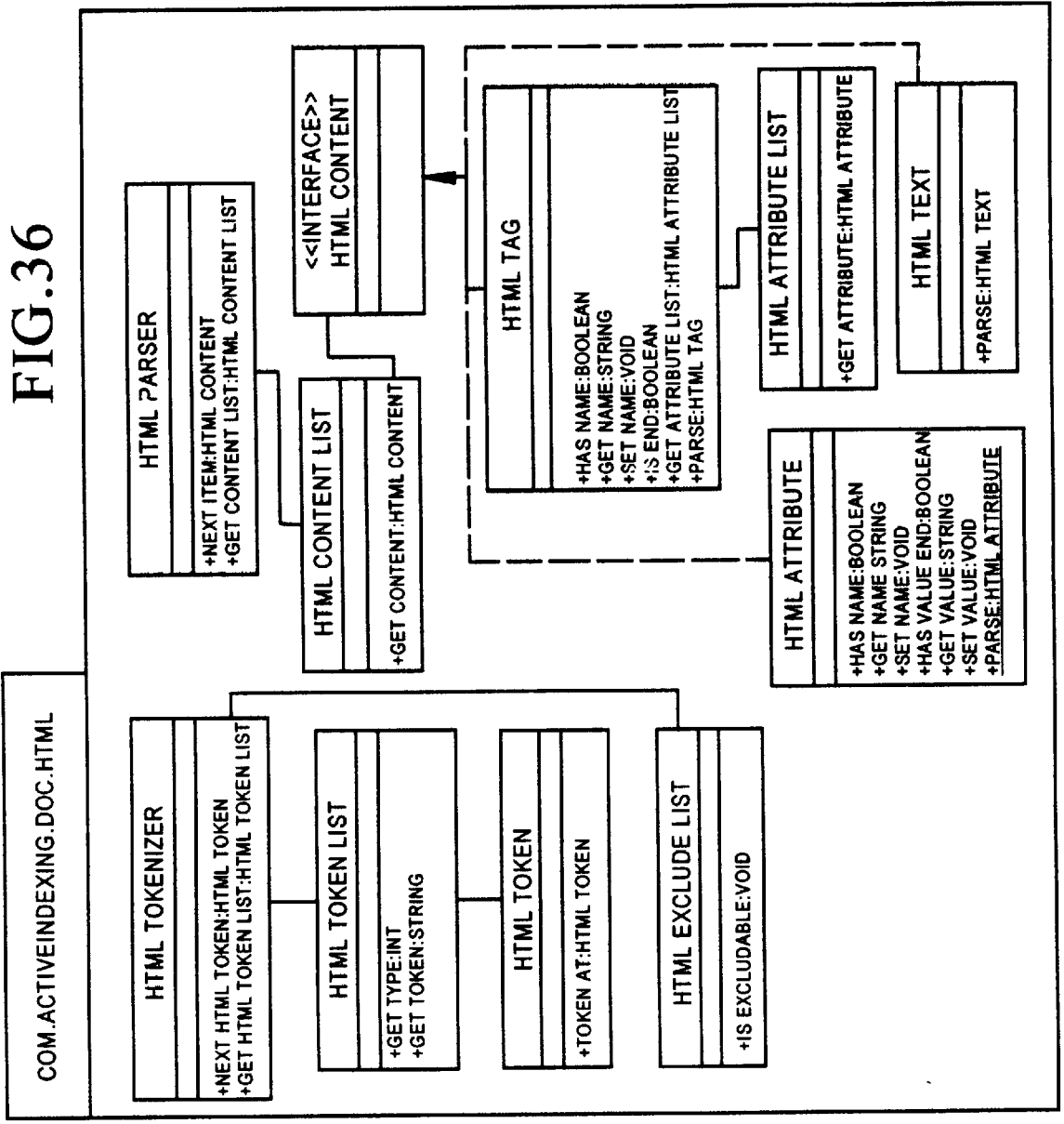

Referring to FIG. 23, the document-related packages, com.activeindexing.doc.html, contains classes related to HTML tokenizing and parsing, as shown in more detail in FIG. 36.

The following Table 53 describes each of the classes of FIG. 36 in more detail.

TABLE 53

| Class | Description |
| --- | --- |
| HTMLTokenizer | This class implements the HTML tokenizing engine. |
| HTMLToken | This is a simple container for tokens which stores a type with a string value for the token. |
| HTMLTokenList | This is a List implementation that stores HTMLToken objects. |
| HTMLParser | This class implements the HTML parsing engine. |
| HTMLContent | This is an interface that defines a content element produced by the HTMLParser. Concrete implementations for this interface are the HTMLTag, HTMLAttribute and HTMLText classes. |
| HTMLContentList | This is a List implementation that stores HTMLContent objects. |
| HTMLTag | Concrete implementation of the HTMLContent interface which stores HTML tag information. |
| HTMLAttribute | Concrete implementation of the HTMLContent interface which stores tag attribute information. |
| HTMLAttributeList | This is a List implementation that stores HTMLAttribute objects. |
| HTMLText | Concrete implementation of the HTMLContent interface which stores HTML text content. |
| HTMLExcludeList | Local-drive exclusion list interface, uses the internationalization resource properties to determine what human-readable language is being processed. |

Figure 37:
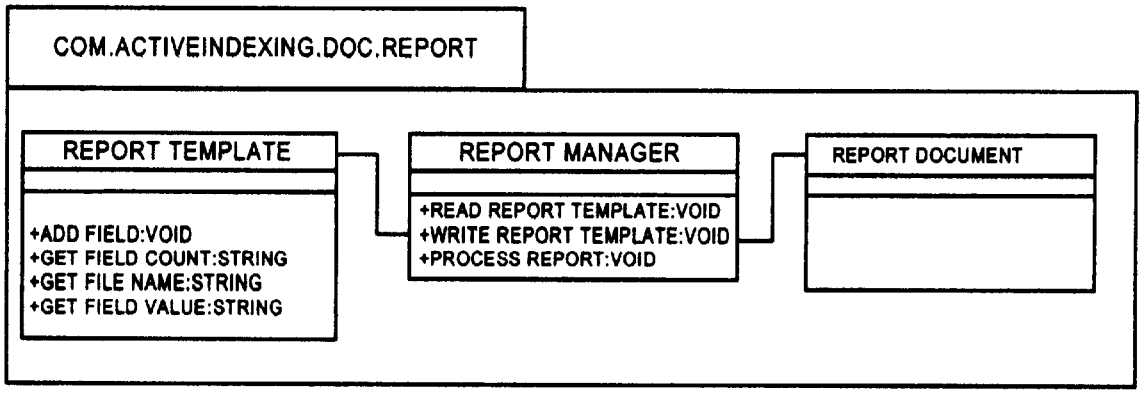

The com.activeindexing.doc.report package of FIG. 23 contains classes related to reporting, as shown in more detail in FIG. 37.

The following Table 54 describes each of the classes of FIG. 37 in more detail.

TABLE 54

| Class | Description |
| --- | --- |
| ReportTemplate | Template defining document format for reports, including field placement information and header, footer specifications. |
| ReportManager | High level control class for generating reports. |
| ReportDocument | Report document definition. |

Figure 38:
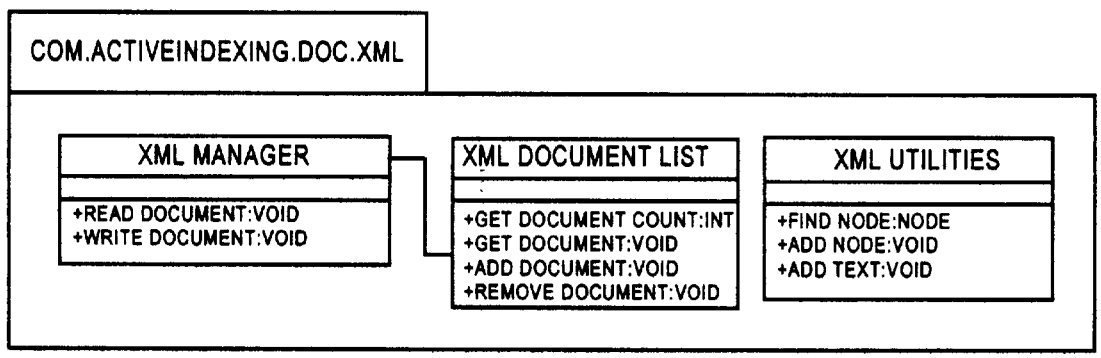

The XML package of FIG. 23, com.activeindexing.doc.xml, contains classes related to XML file management as shown in more detail in FIG. 38.

The following Table 55 describes each of the classes of FIG. 38 in more detail.

TABLE 55

| Class | Description |
| --- | --- |
| XMLManager | This class provides access to high-level document control for reading and writing DOM objects. |
| XMLDocumentList | This Class provides a mechanism for handling collections of XML documents. |
| XMLUtilities | There are numerous operations which are common but not straight forward with the Document Object Model. This class provides a collection of methods to make working with DOM object easier. |

The utility package of FIG. 23 contain low-level utility packages which can be used by any other package.

Figure 39:
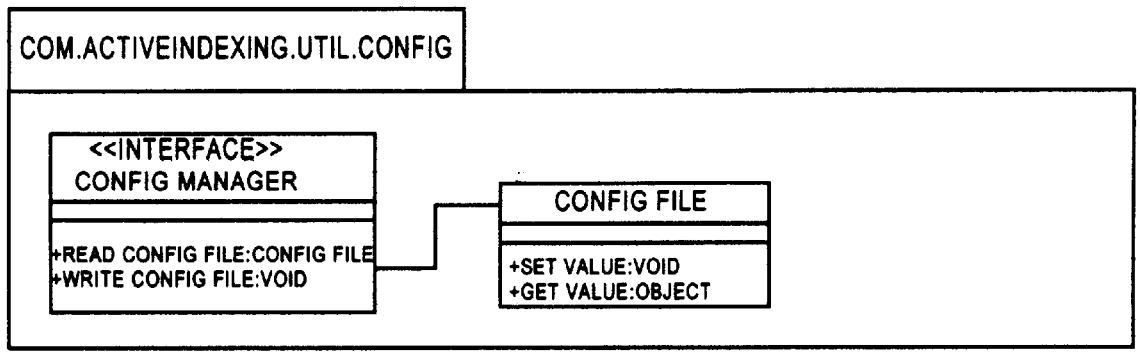

The config package, com.activeindexing.util.config, contains classes related to configuration file handling, as shown in more detail in FIG. 39.

The following Table 56 describes each of the classes of FIG. 39 in more detail.

TABLE 56

| Class | Description |
| --- | --- |
| ConfigManager | This class manages the loading and saving of configuration files. |
| ConfigFile | A configuration file is an extended Properties object with content validation. |

Figure 40:
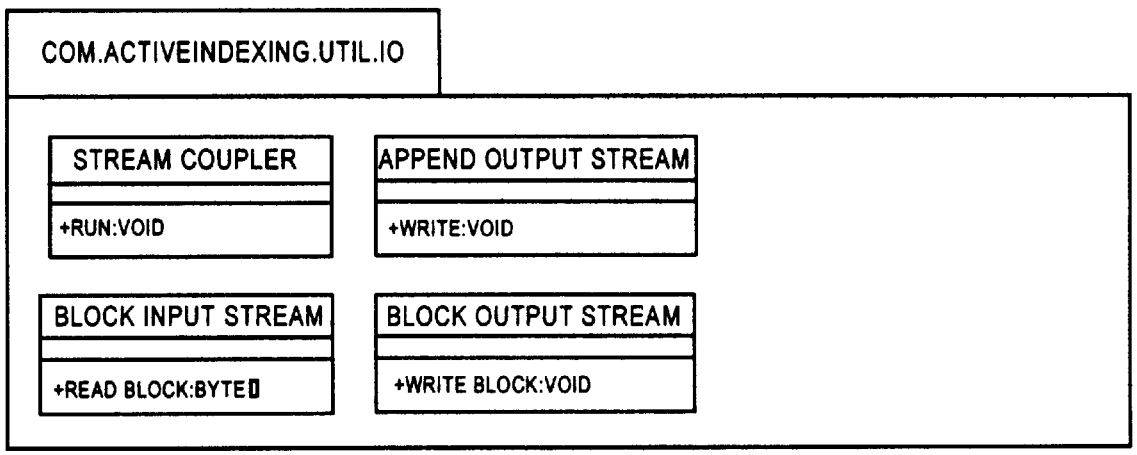

The I/O package of FIG. 23, com.activeindexing.util.io, contains utility classes related to input/output operations as shown in more detail in FIG. 40.

The following Table 57 describes each of the classes of FIG. 40 in more detail.

TABLE 57

| Class | Description |
| --- | --- |
| StreamCoupler | This class is a runnable thread that couples input and output streams together. It is a general utility class that lets a programmer glue streams together without needing to pay attention to the mechanics of copying individual bytes or buffers. This class can also be used outside a thread by calling the run method directly. |
| AppendOutputStream | Simple output stream that seeks the end of file when open and starts writing at that point. |
| BlockInputStream | Input stream to handle block data. Blocks are byte streams with a block size integer prefix. |
| BlockOutputStream | Output stream to handle block data. Blocks are byte streams with a block size integer prefix. |

Figure 41:
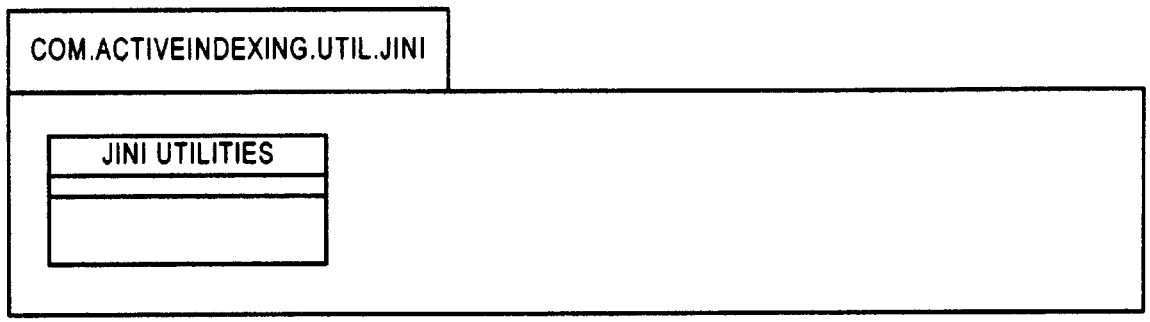

The jini package of FIG. 23, com.activeindexing.util.jini, contains classes related to Jini services as shown in more detail in FIG. 41.

The following Table 58 describes each of these classes in more detail as shown in more detail in FIG. 41.

TABLE 58

| Class | Description |
| --- | --- |
| JiniUtilities | Utility calls to simplify Jini service development. |

Figure 42:
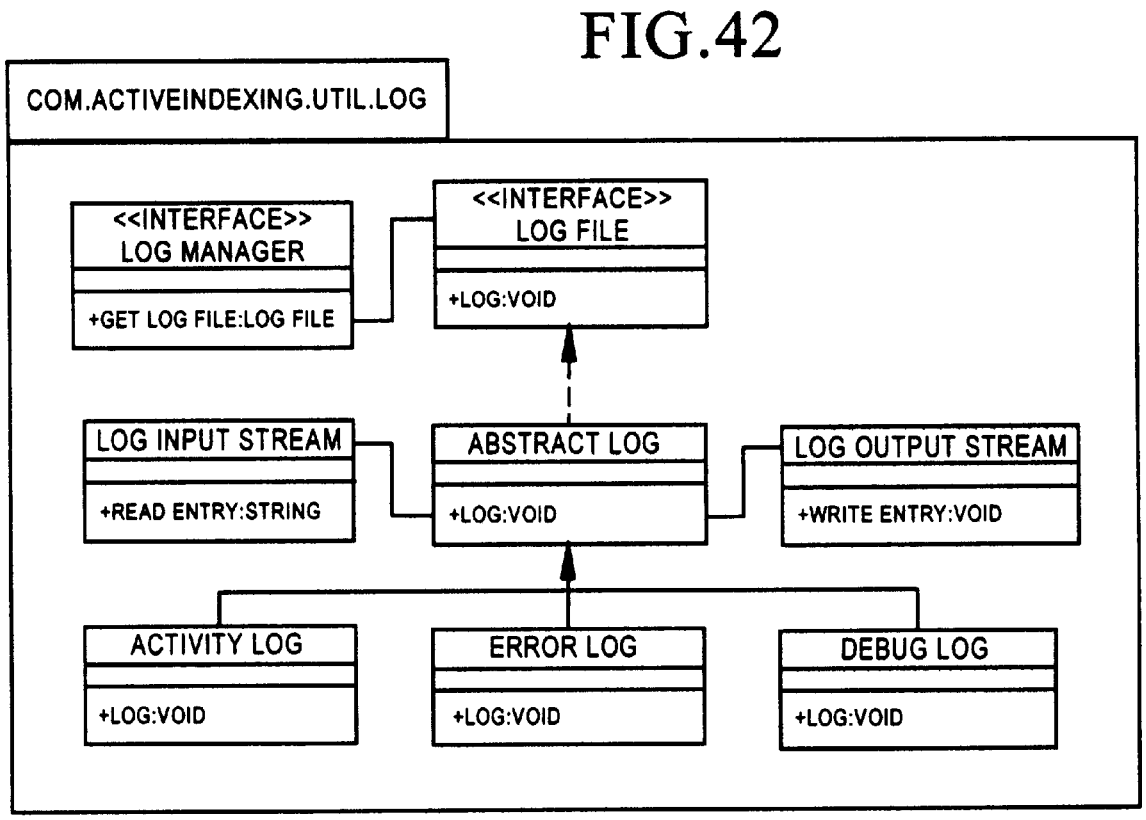

The log package of FIG. 23, com.activeindexing.util.log, contains classes related to the log files, as shown in more detail in FIG. 42.

The following Table 59 describes each of the classes of FIG. 42 in more detail.

TABLE 59

| Class | Description |
| --- | --- |
| LogManager | This class is provides high-level access to the log file system and acts as a log file factory. Access to instances is done through static calls so this functionality is available throughout the program without requiring references to this class to be passed around. |
| LogFile | This interface declares the contract to be executed by a log file and imposes required methods on any class that implements the role. |
| AbstractLog | This class provides basic functionality that can be inherited by subclasses for convenience. Since log files tend to implement the same behavior and only minor specificity, this reduces the need for replicated code. |
| LogInputStream | This class is used primarily for log analysis, making it easy to read log entries. |
| LogOutputStream | Heavily used by the login mechanism, this class provides specialized append behavior for logging. When opened, the stream automatically positions itself at the end of the file. |
| ActivityLog | The activity log is intended to log activities of interest to anyone monitoring the system. |
| ErrorLog | The error log addresses problems that deserve attention. |
| DebugLog | The debug log is present for more extensive traces useful in the debugging process. |

Figure 43:
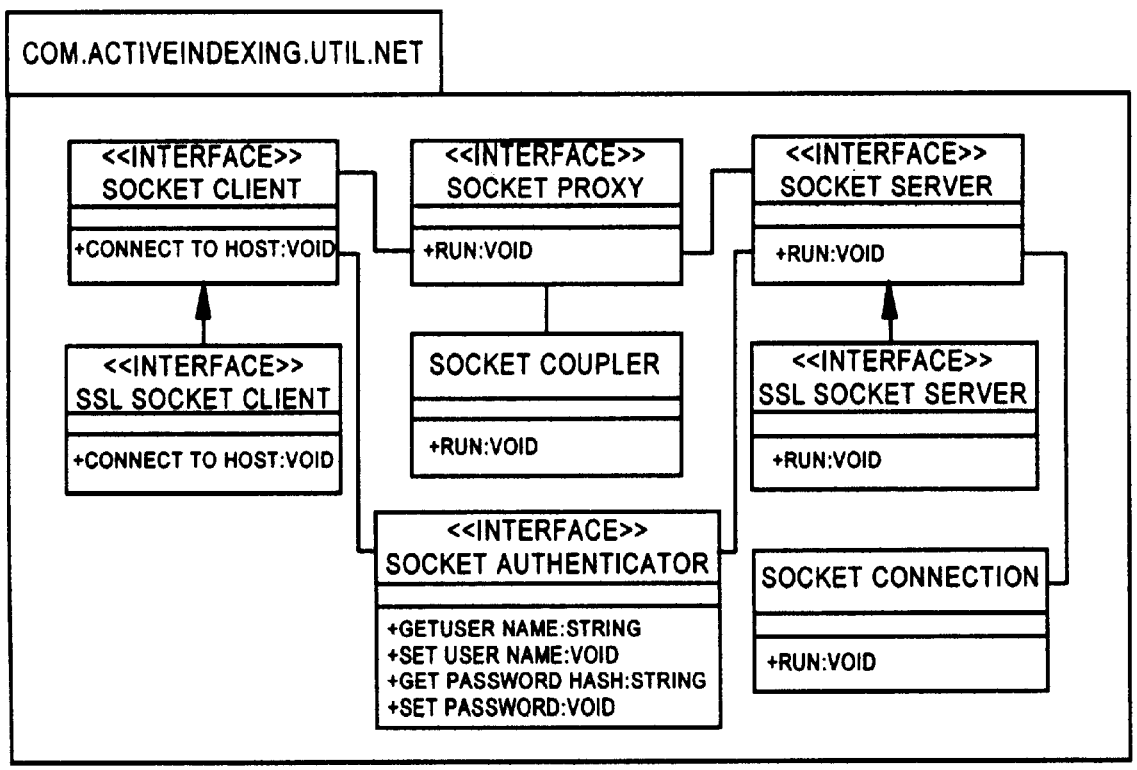

The network package of FIG. 23, com.activeindexing.util.net, contains utility classes related to networking, as shown in more detail in FIG. 43.

The following Table 60 describes each of the classes of FIG. 43 in more detail.

TABLE 60

| Class | Description |
| --- | --- |
| SocketClient | This class implements a client socket abstraction which can be run in its own thread fro communication with a socket server. All transactions take place across asynchronous input/output TCP connections. |
| SSLSocketClient | This class extends the SocketClient, providing secure communication across SSL. |
| SocketServer | This class implements a socket server which waits for connections on a given port and spawns asynchronous handlers in different threads for processing. It can be run a as daemon. |
| SSLSocketServer | This class extends the SocketServer, providing secure communication across SSL. |
| SocketConnection | A socket connection provides asynchronous connectivity for the socket server. There is a socket connection thread for every connected client on the server. |

TABLE 60-continued

| Class | Description |
| --- | --- |
| SocketCoupler | This class connects an client socket with a server socket in an asynchronous thread, useful in implementing proxy behavior. |
| SocketProxy | A socket proxy acts like both a client and server, forwarding traffic to another host. Useful when tunneling through firewalls or the like. |
| SocketAuthenticator | This is a simple authentication mechanism required to be sure we're not talking to a stranger. |

Figure 44:
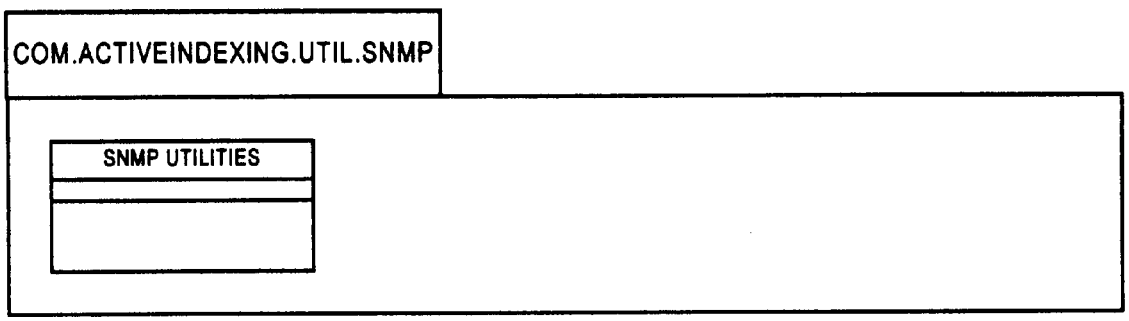

The snmp package of FIG. 23, com.activeindexing.util.snmp, contains classes related to the Simple Network management Protocol, as shown in more detail in FIG. 44.

The following Table 61 describes each of the classes of FIG. 44 in more detail.

TABLE 61

| Class | Description |
| --- | --- |
| SnmpUtilities | Utility methods for handling Simple Network Management Protocol. |

The above description does not include user interface, the XML subsystem, transactions for change requests, or a message format, but one skilled in the art will understand suitable implementations for each of these components.

Figure 45:
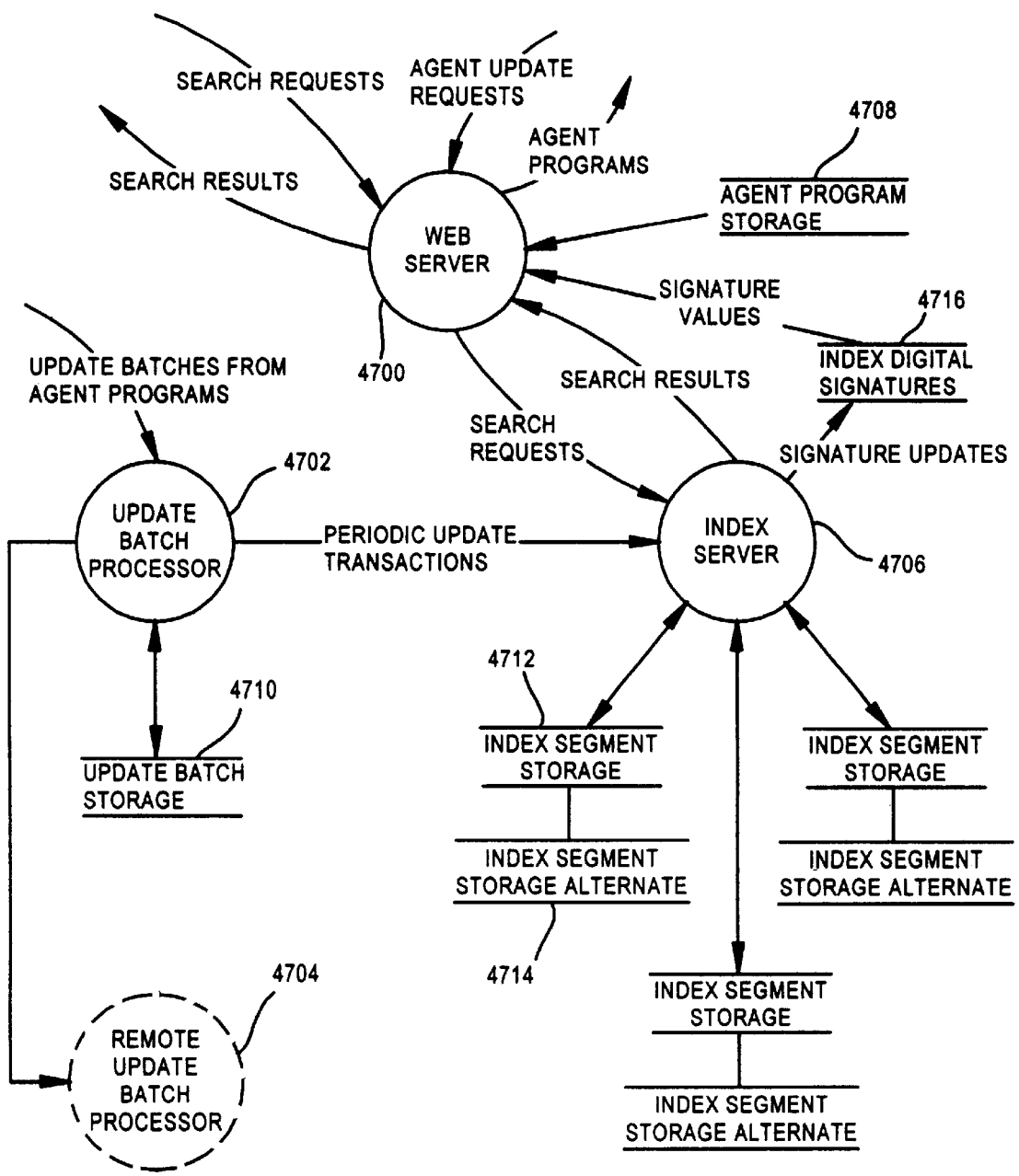
FIG. 45 is a functional data flow diagram illustrating an alternative embodiment of the central cataloging site of FIG. 2.

FIG. 45 is a functional data flow diagram illustrating an alternative embodiment of the central cataloging site of FIG. 2. In FIG. 45, a web server 4700 is the main gateway for all agent 204 program update requests, agent program downloads, and search requests. An update batch processor 4702 receives, stores, and applies update batches created by remote agents 204, and also transmits copies of the batches to redundant remote catalog sites. A remote update batch processor 4704 receives, and applies batches received from a master catalog site to a local index server for the purposes of redundancy. An index server 4706 stores all search index information in a series of database segments, and creates result sets from queries applied to it as a result of search requests received by the web server 4700.

The system of FIG. 45 includes an agent program storage area 4708 containing copies of agent 204 programs and the digital signatures of those programs for the various host operating systems which use agents to generate web site updates. An update batch storage area 4710 contains the received update batches transmitted by agent programs 204 on remote hosts, and these batches are deleted after processing. An index segment storage area 4712 contains a subset of the total index database for the index server 4706. For example, a single segment might contain the keyword fields for all of the keywords beginning with the letter "A". Typically, these storage areas will be placed on high-speed RAID storage systems. An index segment storage twin area 4714 is identical to the storage area 4712. The purpose of the twin area 4714 is to provide access to existing index information while the corresponding index segment storage area is being updated. This permits updates to be applied to a segment without requiring record locking. The index server 4706 is simply notified as to which segment areas are available for search processing.

Once updated, the area 4712 or 4714 becomes available again. An index signature storage area 4716 that stores the current digital signature of the index for a particular site serviced by an agent 204 on a remote host.

In operation of the system of FIG. 45, the agent program, upon starting on a remote host, will query the web server 4700 to determine if the local agent program digital signature matches that of the agent program digital signature stored at the catalog site. If the local agent 204 program determines that the digital signatures of the agent programs do not match, the agent program will retrieve a new copy of itself from the web servers 4700 and restart itself after performing the appropriate local operations. Before commencing local processing, the agent program 204 checks the digital signature of the existing site index on the catalog site with the digital signature of the site stored locally. If the two signatures match, a differential transmission of catalog information will occur. Otherwise, the entire catalog will be regenerated and transmitted, and the catalog site will be instructed to delete any existing catalog entries for the site. Once a differential or full catalog update has been generated, the agent program 204 contacts the update batch processor 4702 at the catalog site and transmits' the contents of the update. Upon receiving confirmation of receipt, the agent program 204 performs clean up and post-processing operations, then suspends itself until the next processing cycle.

The update processor 4702 periodically updates the index segments on the index server 4706. All updates received are applied as batches to retain data integrity on the index server 4706. The update processor 4702 separates update information as required to match the segments on the index server 4706, then updates each segment storage area 4712 and each segment storage twin area 4714. While a segment storage area 4712, 4714 is being updated, its counterpart is available for search request processing. Once all updates have been applied, the digital signature of the index for the site is updated in the index signature storage area 4716 and the batch is deleted from the update batch storage area 4710.

In processing search requests, the web servers 4700 receive and interpret the search requests from remote portals or web browsers. Each search request is preprocessed to divide the request into sub-requests as required for each index segment, then the index server 4706 is requested to perform search queries on each relevant segment. More than one index segment may be queried simultaneously. The index server 4706 determines which index segment storage areas 4712, 4714 are available for use, applies the search request, and transmits the results to the web server 4700 which, in turn, collects and collates all search results and transmits these results back to the requesting system in a formatted manner.

According to another embodiment of the agent 204, the agent calculates a value representing the distance and text between objects and thereby determines which objects at a site are most likely to relate to each other. At the catalog site, these relationship values are combined with the relationship values from other sites to create a relationship value table. This relationship value table represents the likelihood of an object occurring together with another object. This table may be used to refine searches and create relevance ranking.

It is to be understood that even though various embodiments and advantages of the present invention have been set forth in the foregoing description, the above disclosure is illustrative only, and changes may be made in detail, and yet remain within the broad principles of the invention. Therefore, the present invention is to be limited only by the appended claims.

What is claimed is:

1. A method of constructing a catalog of object references from objects stored within a network, the network including a plurality of interconnected computers with one computer storing the catalog and being designated a cataloging site and each of the other computers storing a plurality of objects and being designated a source site, the method comprising:

running on each source site a program which assembles meta data about objects stored on the source site;

transmitting the assembled meta data from each source site to the cataloging site, the assembled meta data being transmitted at a scheduled time that is a function of resource availability on at least one of the source site and the cataloging site; and processing the transmitted data at the cataloging site to generate a catalog of object references.

2. The method of claim 1 wherein each item of transmitted meta data is accompanied by a command to the cataloging site instructing the cataloging site what to do with the item of meta data.

3. The method of claim 1 wherein transmitting the assembled meta data comprises transmitting differential meta data indicating changes in current meta data relative to previous meta data.

4. The method of claim 1 wherein the program creates meta data only for selected objects on the site, the selected objects being selected using human input.

5. The method of claim 1 wherein the program creates meta data only for selected objects on the site, the selected objects being selected using a computer generated pattern.

6. The method of claim 1 wherein the scheduled time that is a function of resource availability on at least one of the source site and the cataloging site and human input.

7. A method for monitoring objects stored within a network to detect changes in one or more of the objects, the network including a plurality of interconnected computers with one computer assembling the results of monitoring and being designated a central site and each of the other computers storing a plurality of objects and being designated a source site, the method comprising:

running on each source site a program which processes objects stored on the source site, thereby generating for each processed object a digital signature which reflects data of the object which data consists of contents or meta data;

transmitting the generated signatures from each source site to the central site; and comparing each transmitted signature at the central site to a previously generated signature for the object from which the signature was derived to determine whether the data of the object has changed.

8. The method of claim 7 wherein the source site initiates running of the program on the source site.

9. The method of claim 7 wherein the central site initiates running of the program on the source site.

10. The method of claim 7 wherein objects on the source site that are monitored are accessible only from the source site.

11. The method of claim 7 wherein the signature for an object consists of information copied from a directory entry for the object.

12. The method of claim 7 wherein the signature for an object consists of a hash of contents of the object.

13. The method of claim 7 wherein the object from which a signature is generated consists of a collection of information about a set of objects on the site.

14. The method of claim 7 wherein each generated signature is accompanied by a command to the cataloging site instructing the cataloging site what to do with the generated signature.

15. A computer-readable medium containing a program for generating meta data for objects stored on a source site on a computer network, the network including a plurality of computers being designated respectively as source sites and a computer designated as a cataloging site that stores a catalog of object references to objects stored on the source sites, the program generating the object references by performing:

assembling meta data about objects stored on the source site; and transmitting the assembled meta data from the source site to the cataloging site for processing at the cataloging site to generate the catalog of object references, the assembled meta data being transmitted at a scheduled time that is a function of resource availability on at least one of the source site and the cataloging site.

16. The computer-readable medium of claim 15 wherein each item of transmitted meta data is accompanied by a command to the cataloging site instructing the cataloging site what to do with the item of meta data.

17. The computer-readable medium of claim 15 wherein transmitting the assembled meta data comprises transmitting differential meta data indicating changes in current meta data relative to previous meta data.

18. The computer-readable medium of claim 15 wherein the program creates meta data only for selected objects on the site, the selected objects being selected using human input.

19. A computer-readable medium containing a program for monitoring objects stored within a network to detect changes in one or more of the objects, the network including a plurality of interconnected computers with one computer assembling the results of monitoring and being designated a central site and each of the other computers storing a plurality of objects and being designated a source site, the program monitoring the objects by performing:

processing objects stored on the source site, thereby generating for each processed object a digital signature which reflects data of the object which data consists of contents or meta data; and transmitting the generated signatures from each source site to the central site for comparison of each signature at the central site to a previously generated signature for the object from which the signature was derived to determine whether the data of the object has changed.

20. The computer-readable medium of claim 19 wherein the source site initiates running of the program on the source site.

21. The computer-readable medium of claim 19 wherein the central site initiates running of the program on the source site.

22. The computer-readable medium of claim 19 wherein objects on the source site that are monitored are accessible only from the source site.

23. The computer-readable medium of claim 19 wherein the signature for an object consists of information copied from a directory entry for the object.

24. The computer-readable medium of claim 19 wherein the signature for an object consists of a hash of contents of the object.

25. The computer-readable medium of claim 19 wherein the object from which a signature is generated consists of a collection of information about a set of objects on the site.

26. The computer-readable medium of claim 19 wherein each item of transmitted meta data is accompanied by a command to the cataloging site instructing the cataloging site what to do with the item of meta data.

\* \* \* \* \*